(12) United States Patent
Furusho

(10) Patent No.: US 7,937,399 B2
(45) Date of Patent: May 3, 2011

(54) METHOD, INFORMATION PROCESSING APPARATUS, AND PROGRAM OF SEARCHING FOR, AGGREGATING AND SORTING TREES

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 441 days.

(21) Appl. No.: 11/814,705

(22) PCT Filed: Jan. 23, 2006

(86) PCT No.: PCT/JP2006/300940
§ 371 (c)(1),
(2), (4) Date: Dec. 16, 2008

(87) PCT Pub. No.: WO2006/080268
PCT Pub. Date: Aug. 3, 2006

(65) Prior Publication Data
US 2009/0106194 A1    Apr. 23, 2009

(30) Foreign Application Priority Data
Jan. 25, 2005  (JP) ................................ 2005-016373

(51) Int. Cl.
G06F 17/30    (2006.01)
G06F 7/00     (2006.01)
G06F 12/00    (2006.01)

(52) U.S. Cl. ........ 707/758; 707/796; 707/797; 707/801; 707/802

(58) Field of Classification Search .................. 707/705, 707/758, 769, 796, 797, 801, 802, 999.003, 707/999.102, 999.1
See application file for complete search history.

(56) References Cited

U.S. PATENT DOCUMENTS
6,029,170 A * 2/2000 Garger et al. ................... 1/1
(Continued)

FOREIGN PATENT DOCUMENTS
JP          64-008448          1/1989
(Continued)

OTHER PUBLICATIONS

Extensible Markup Lnaguage (XML) 1.0 (Third Edition), Feb. 2, 2004, http://www.w3.org/TR/2004/REC-xml-20040204/ (printed Dec. 15, 2008).
International Search Report issued in corresponding application No. PCT/JP2006/300940, completed Mar. 2, 2006 and mailed Mar. 14, 2006.

(Continued)

Primary Examiner — Charles Rones
Assistant Examiner — Alicia M Lewis
(74) Attorney, Agent, or Firm — Griffin & Szipl, P.C.

(57) ABSTRACT

A searching method for tree data structure topology employs an array generated as a search key array representing a tree serving as search key to represent a parent-child relationship between nodes. The array has the node identifier assigned to a parent node associated with a corresponding non-root node. Non-root nodes are nodes other than a root node, and the node identifier assigned to the parent node corresponds to the node identifier assigned to associated non-root nodes. An offset is applied to node identifiers in the search key array, the node identifiers to which offset is applied are compared with corresponding node identifiers contained in a portion in a C-P array, the portion determined according to the offset, and a vertex node list indicating a search result is stored, wherein the search result contains node identifiers included in a portion of the C-P array whose all nodes matched in comparison.

4 Claims, 58 Drawing Sheets

U.S. PATENT DOCUMENTS

| | | | |
|---|---|---|---|
| 6,301,583 B1* | 10/2001 | Zellweger | 715/810 |
| 6,381,605 B1* | 4/2002 | Kothuri et al. | 1/1 |
| 6,397,214 B1* | 5/2002 | Rogers | 707/602 |
| 6,853,992 B2* | 2/2005 | Igata | 707/741 |
| 2002/0004710 A1* | 1/2002 | Murao | 702/167 |
| 2006/0053122 A1* | 3/2006 | Korn et al. | 707/100 |
| 2008/0270435 A1* | 10/2008 | Furusho | 707/101 |
| 2008/0313196 A1* | 12/2008 | Furusho | 707/100 |
| 2009/0019067 A1* | 1/2009 | Furusho | 707/101 |
| 2009/0106289 A1* | 4/2009 | Furusho | 707/102 |
| 2009/0106298 A1* | 4/2009 | Furusho | 707/102 |
| 2010/0122178 A1* | 5/2010 | Konig et al. | 715/738 |

FOREIGN PATENT DOCUMENTS

| | | |
|---|---|---|
| JP | 02-148173 | 6/1990 |
| JP | 10-240741 | 9/1998 |
| JP | 2000-348038 | 12/2000 |
| JP | 2001-195406 | 7/2001 |
| JP | 2003-248615 | 9/2003 |

OTHER PUBLICATIONS

English translation of the International Preliminary Report on Patentability issued in corresponding application No. PCT/JP2006/300940.

* cited by examiner

Fig.2A

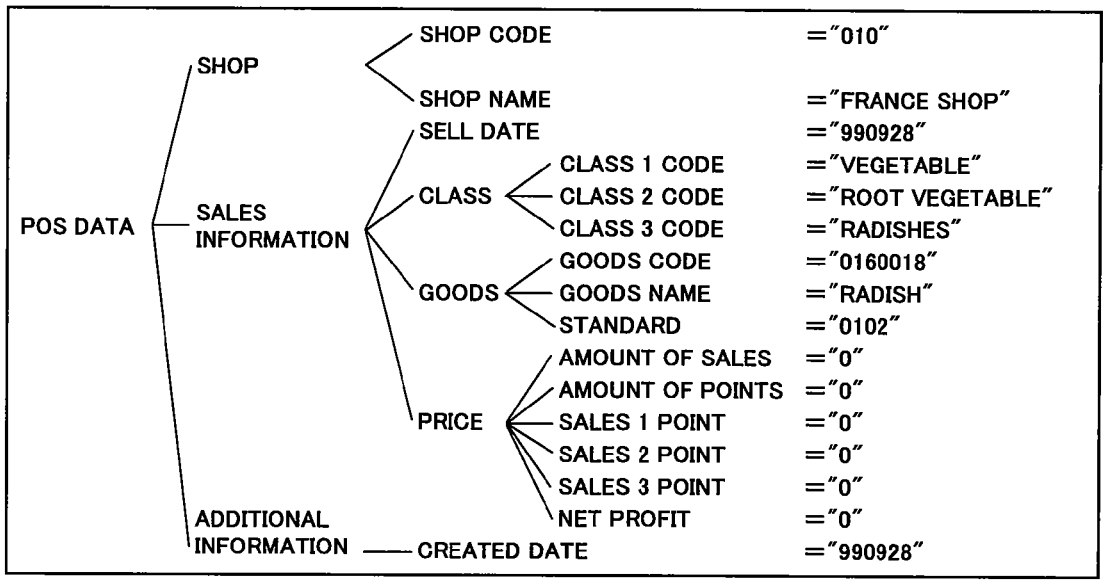

Fig.2B

```
<posdata>
    <shop>
        <shopCode>010</shopCode>
        <shopName>FRANCE SHOP</shopName>
    </shop>
    <salesInformation>
        <sellDate>990928</sellDate>
        <class>
          <class1 code="01">VEGETABLE</class1>
          <class2 code="01">ROOT VEGETABLE</class2>
          <class3 code="01">RADISHES</class3>
        </class>
        <goods>
          <goodsCode>"0160018"</goodsCode>
          <goodsName>RADISH</goodsName>
          <standard>0102</standard>
        </goods>
        <price>
          <amountOfSales>0</amountOfSales>
          <amountOfPoints>0</amountOfPoints>
          <sales1 point="0">0</sales1>
          <sales2 point="0">0</sales2>
          <sales3 point="0">0</sales3>
          <grossProfit>0</grossProfit>
        </price>
    </salesInformation>
    <additionalInformation>
        <createdDate>990928</createdDate>
    </additionalInformation>
</posdata>
```

Fig.6A
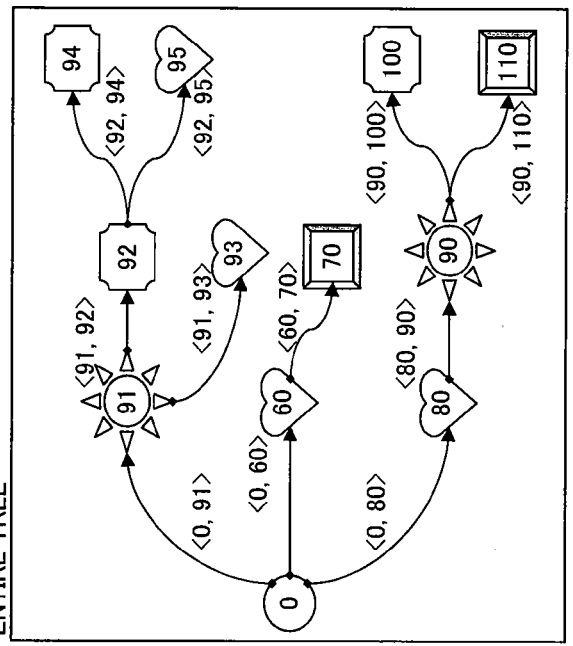
ID-BASED REPRESENTATION
Fig.6B
ID→No. CONVERSION TABLE
| 0 | → | 0 |
| 91 | → | 1 |
| 92 | → | 2 |
| 93 | → | 3 |
| 94 | → | 4 |
| 95 | → | 5 |
| 60 | → | 6 |
| 70 | → | 7 |
| 80 | → | 8 |
| 90 | → | 9 |
| 100 | → | 10 |
| 110 | → | 11 |
CONVERT
Fig.6C
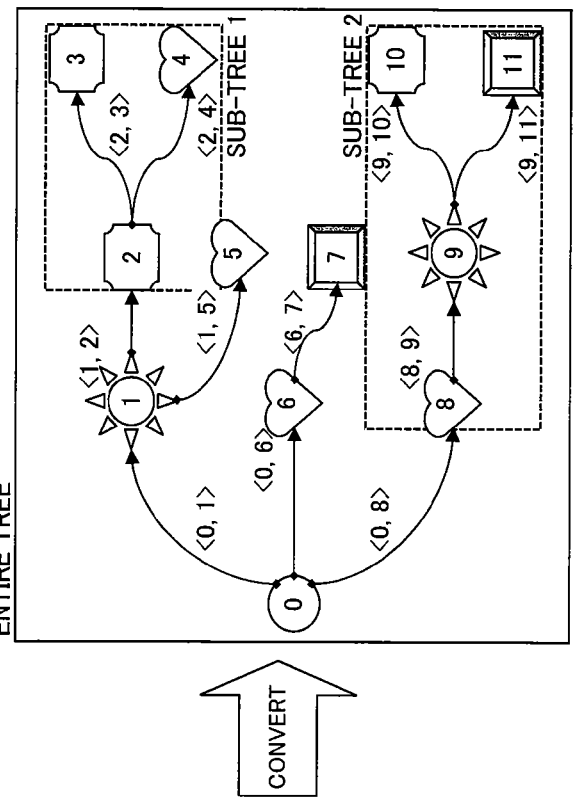
No.-BASED REPRESENTATION (DEPTH FIRST)

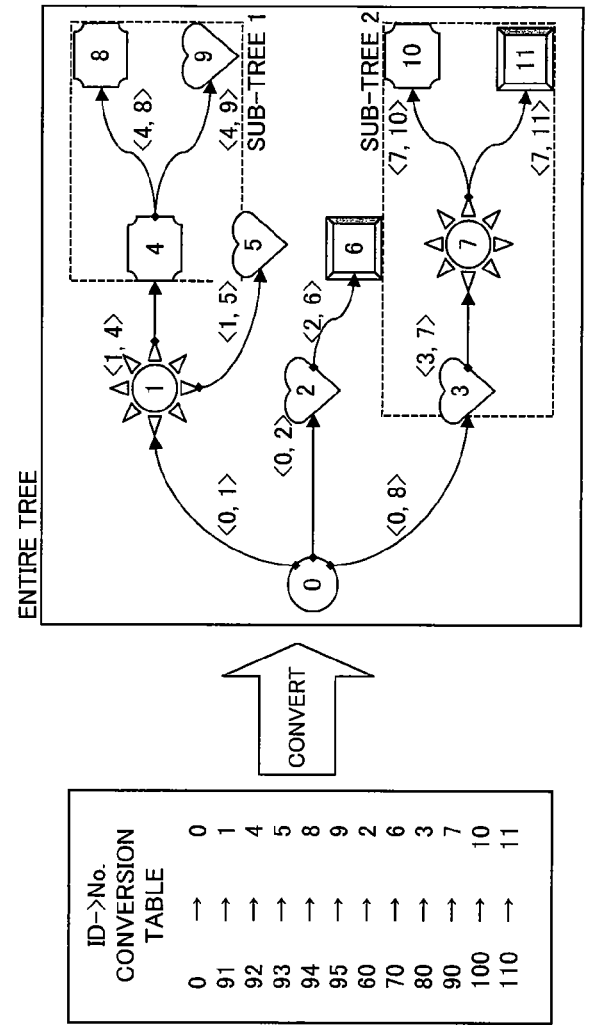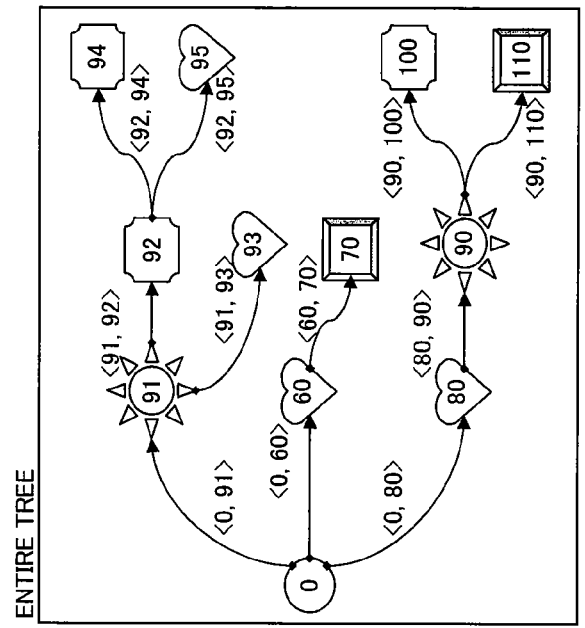

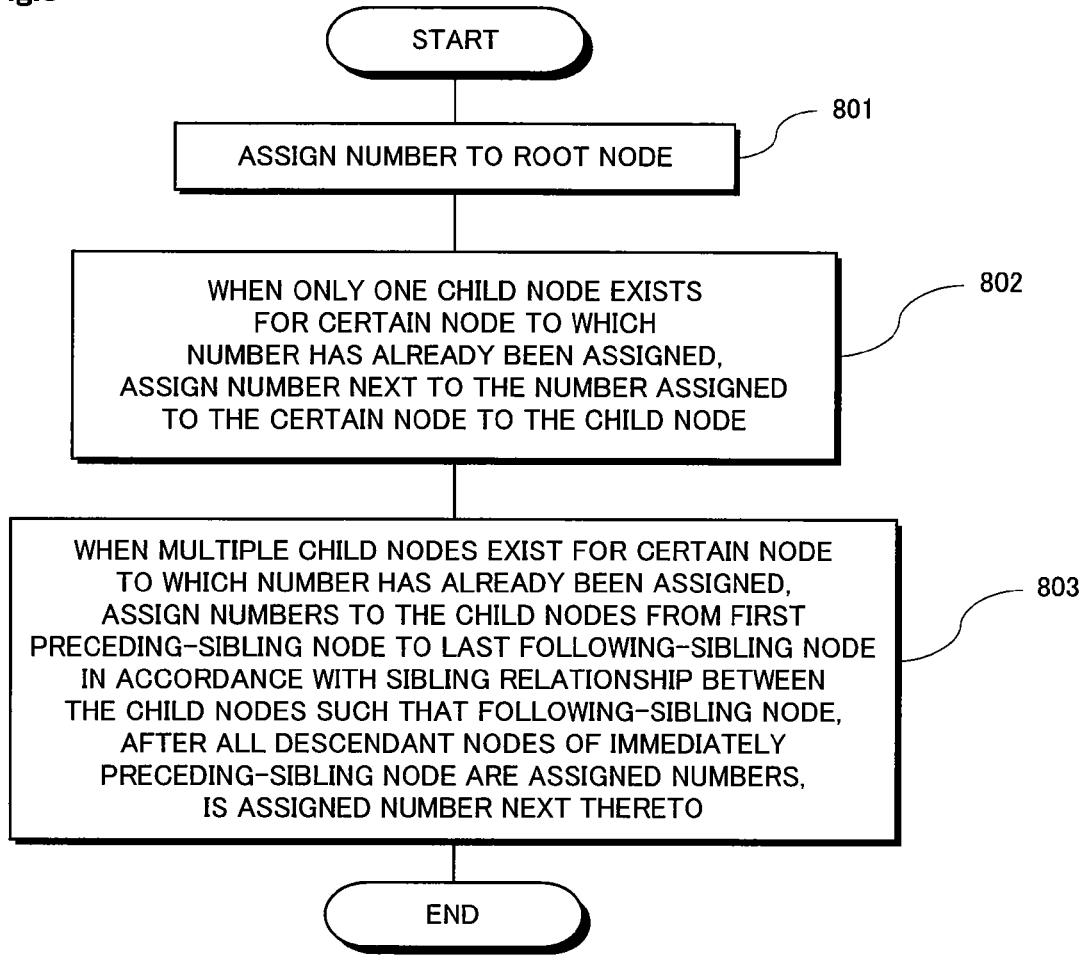

Fig.15A
VERTEX
NODE LIST
| 0 | 4 |
|---|---|
| 1 | 6 |
| 2 | 3 |
Fig.15B
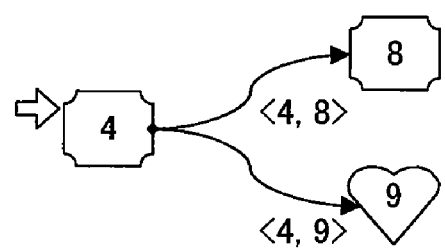
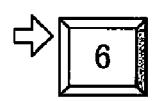
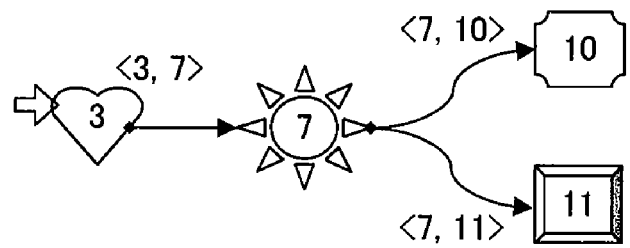

Fig.16A
VERTEX
NODE LIST
0 | 4
1 | 3
Fig.16B
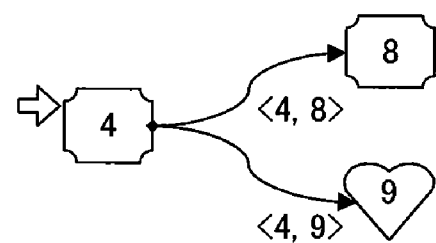
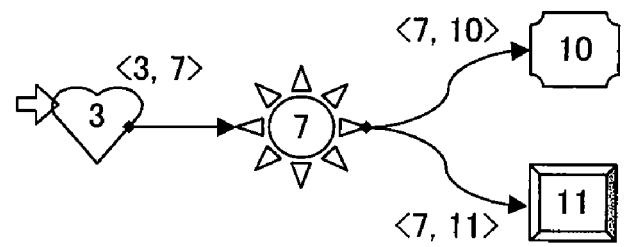

VERTEX
NODE LIST

| 0 | 4 | 3 |
|---|---|---|
| 1 | 6 | 1 |
| 2 | 3 | 4 |

1701  1702

VERTEX
NODE LIST

| | | |
|---|---|---|
| 0 | 6 | 1 |
| 1 | 4 | 3 |
| 2 | 3 | 4 |

1801  1802

Fig.19A
Fig.19B
Fig.19C
Fig.19D
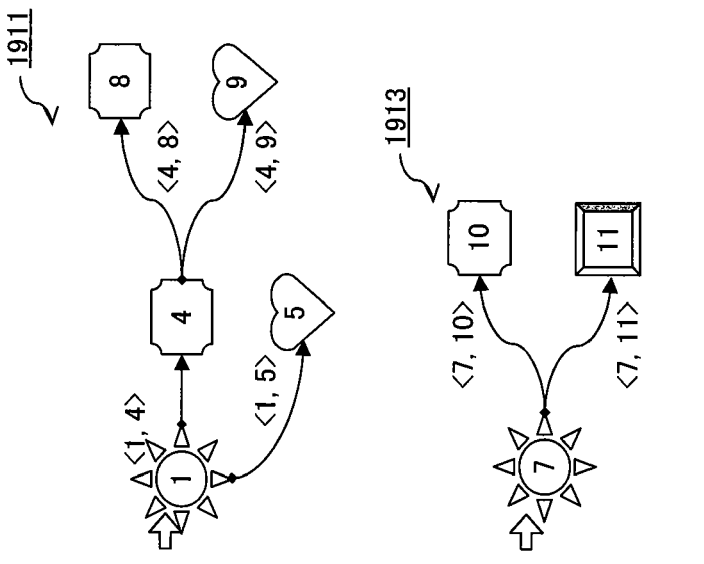
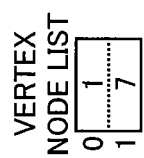
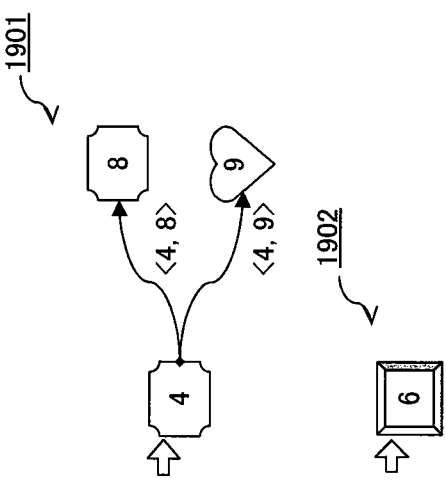
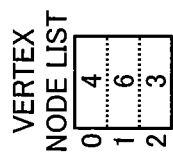

Fig.20A
VERTEX
NODE LIST
| 0 | 4 |
|---|---|
| 1 | 7 |
Fig.20B
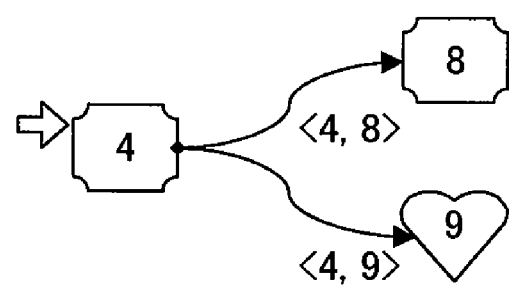
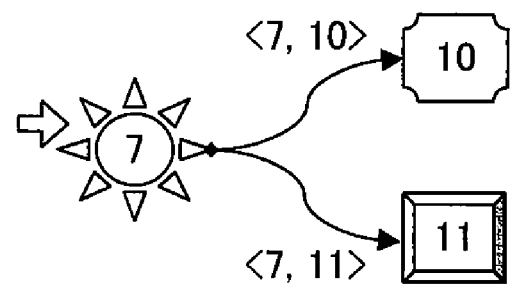

PARTIAL
TREE B

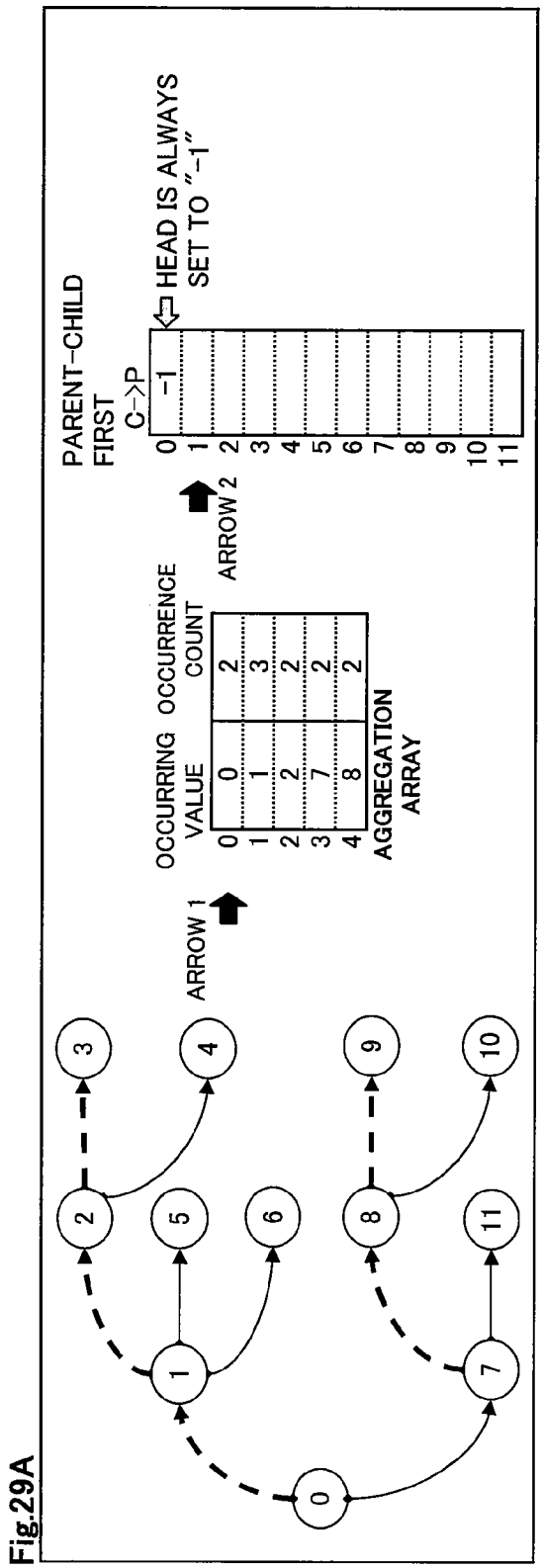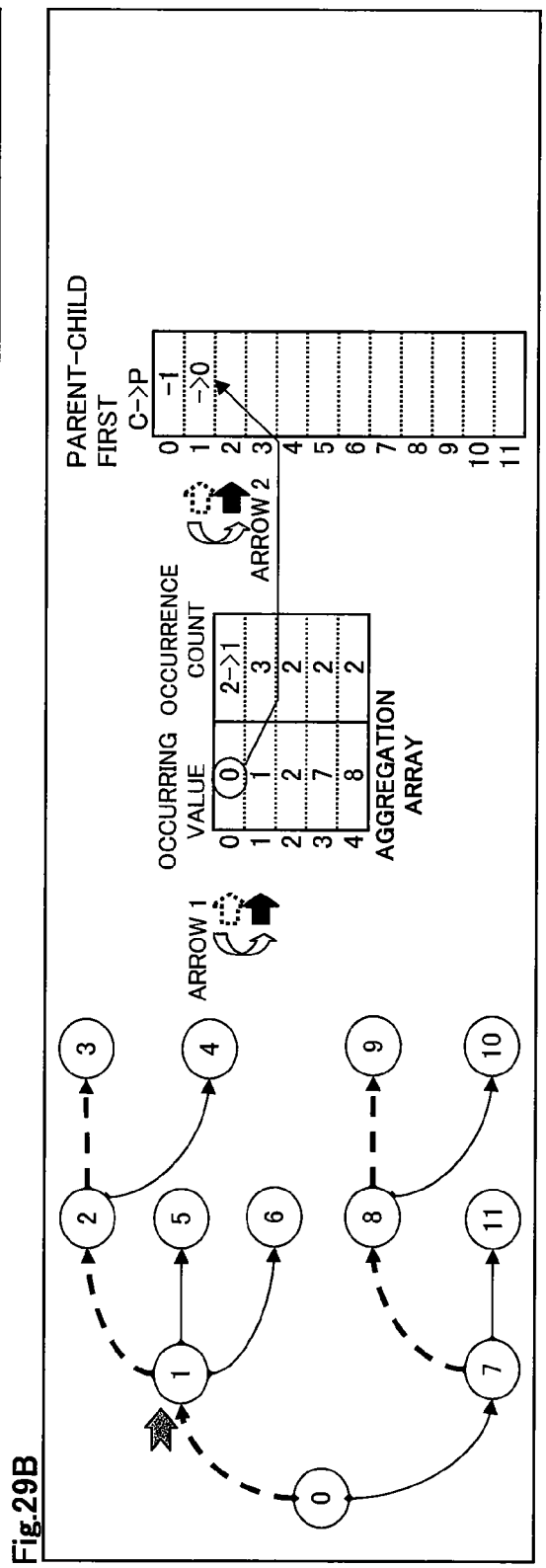

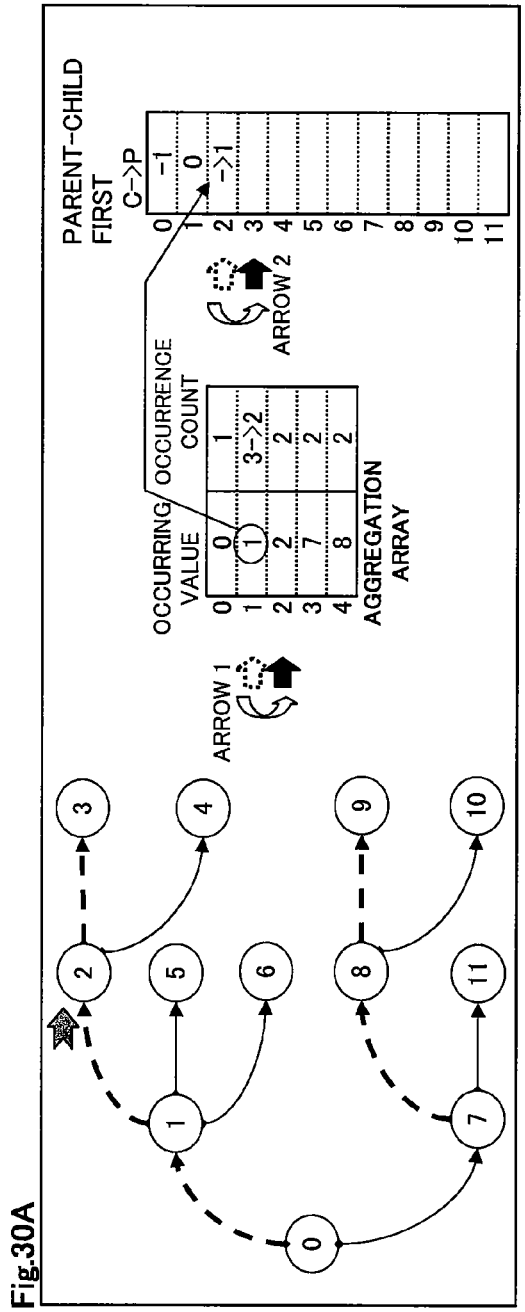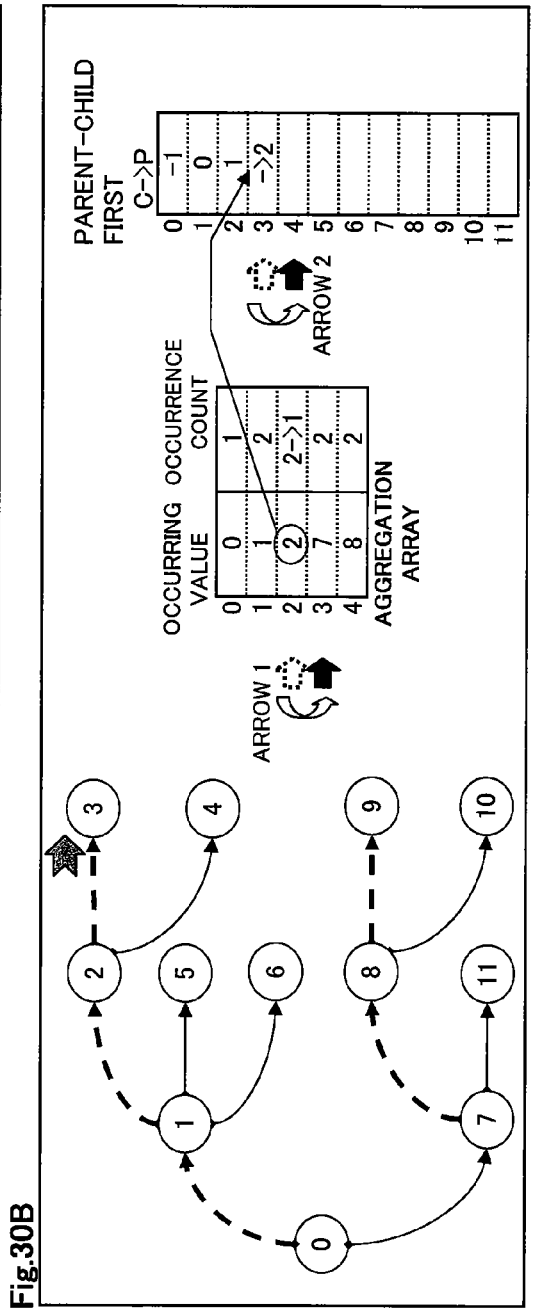

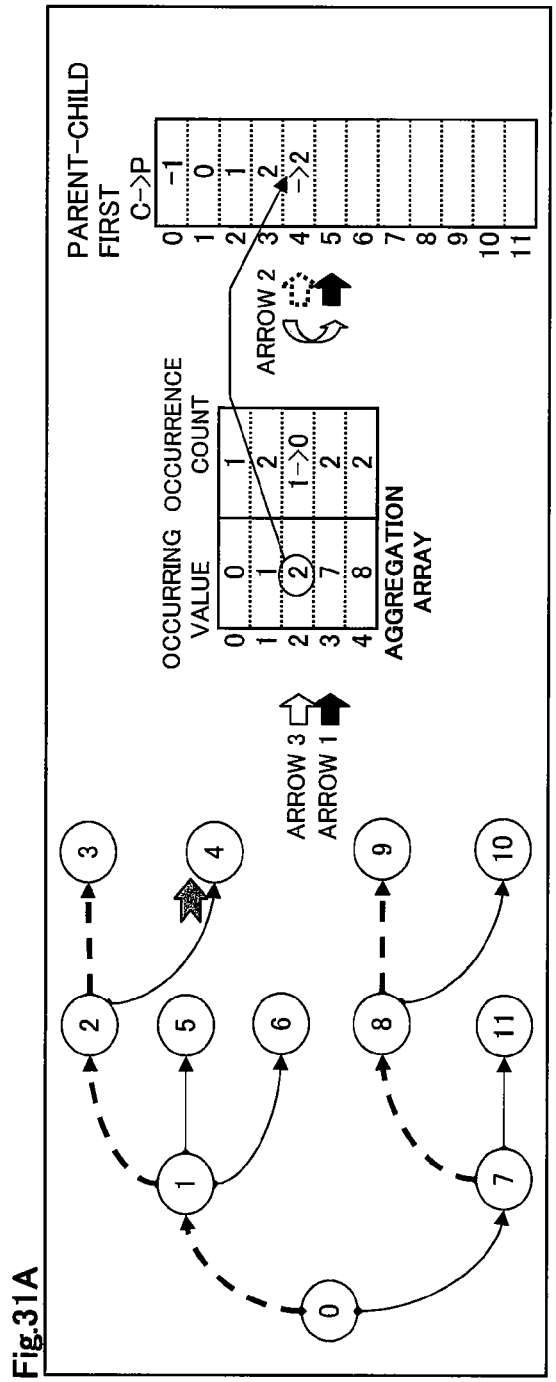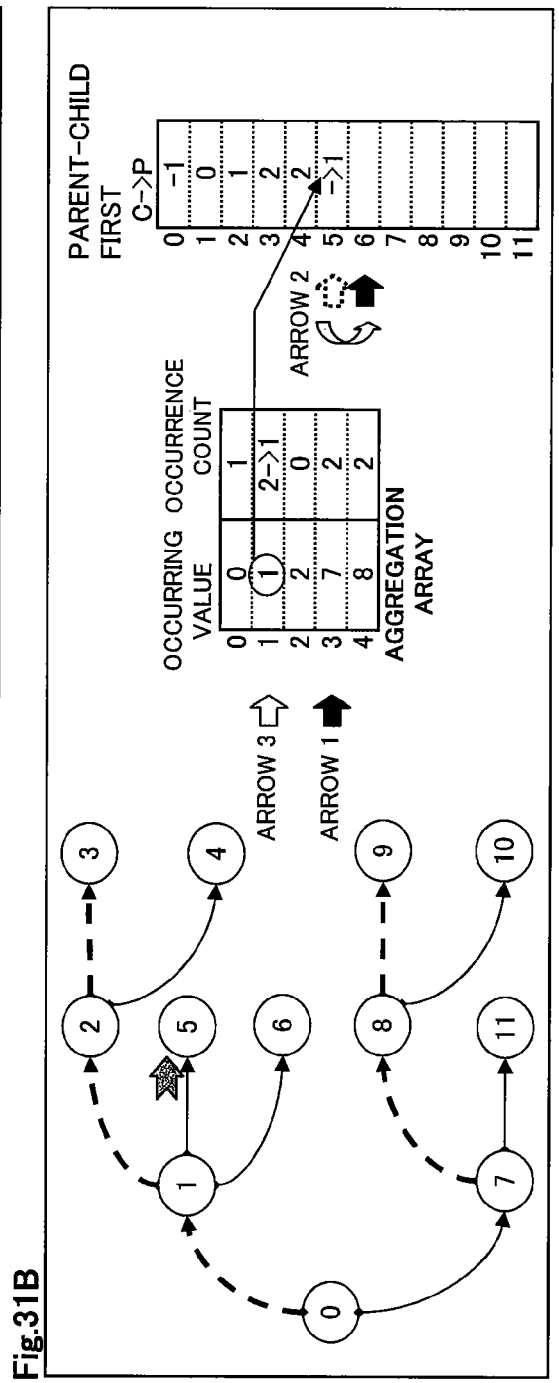
Fig.31A
Fig.31B

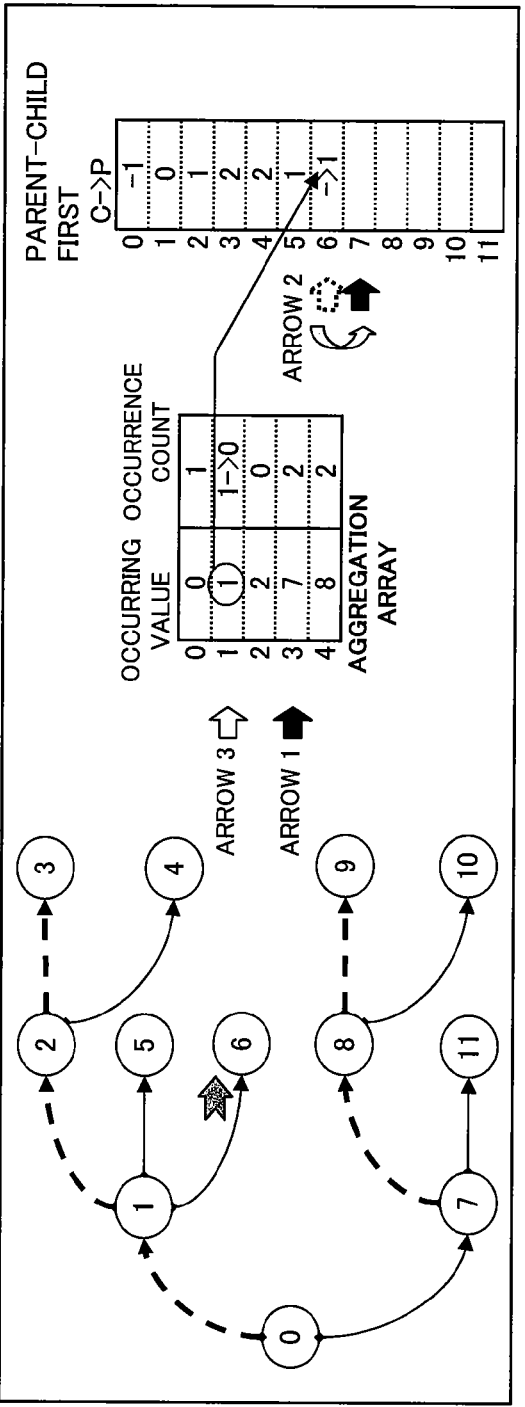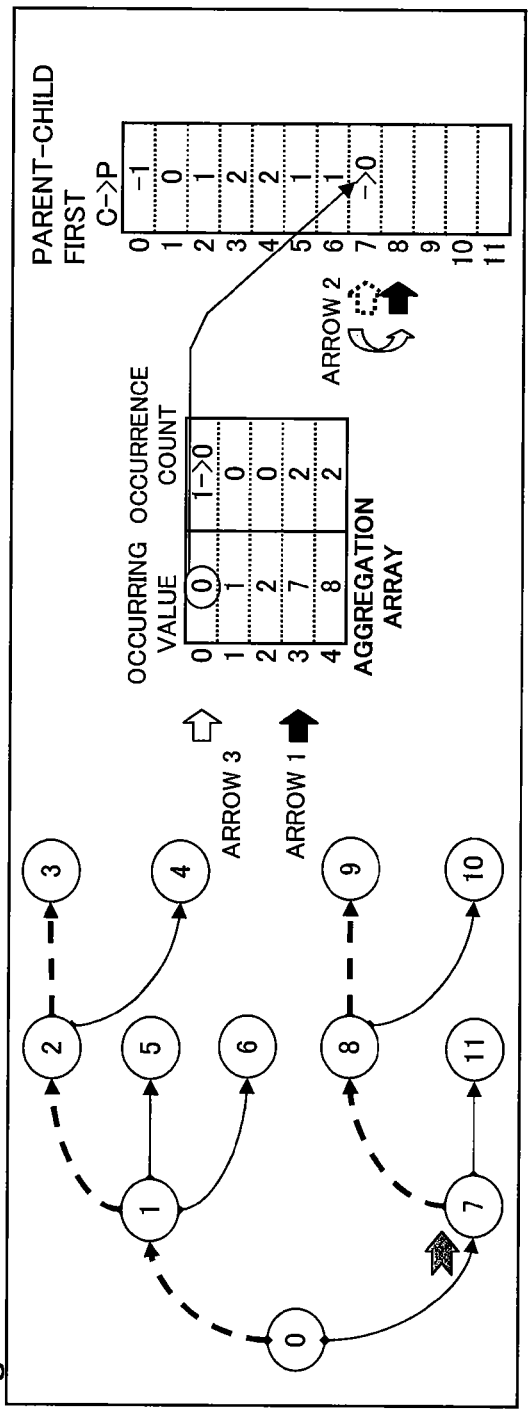

★ : VERTEX NODE

|  | (PARENT NODE NUMBER) | |  |
|---|---|---|---|
|  | OCCURRING VALUE | OCCURRENCE COUNT | |
| 0 | 0 | 2 | |
| 1 | 1 | 2 | |
| 2 | 2 | 2 | 2+2+1=5 |
| 3 | 4 | 1 | |
| 4 | 7 | 2 | |
| 5 | 8 | 1 | |
| 6 | 9 | 1 | |

|  | (PARENT NODE NUMBER) | |  |
|---|---|---|---|
|  | OCCURRING VALUE | OCCURRENCE COUNT | |
| 0 | 0 | 2 | |
| 1 | 1 | 2 | |
| 2 | 2 | 2 | 2+2+1=5 |
| 3 | 4 | 1 | 5+1=6 |
| 4 | 7 | 2 | |
| 5 | 8 | 1 | |
| 6 | 9 | 1 | |

|  | (PARENT NODE NUMBER) | |  |  |
|---|---|---|---|---|
|  | OCCURRING VALUE | OCCURRENCE COUNT | | |
| 0 | 0 | 2 | | |
| 1 | 1 | 2 | | |
| 2 | 2 | 2 | } 5001 | 2+2+1=5 |
| 3 | 4 | 1 | | 5+1=6 |
| 4 | 7 | 2 | | |
| 5 | 8 | 1 | | |
| 6 | 9 | 1 | | |

Fig.55A

SEARCH KEY ARRAY
(ASCENDING-ORDER FORMAT)

| | OCCURRING VALUE | OCCURRENCE COUNT |
|---|---|---|
| 0 | 0+2 | 2 |
| 1 | 1+2 | 2 |

ASCENDING-ORDER FORMAT
OFFSET = 2

SEARCH TARGET
(ASCENDING-ORDER FORMAT)

| | OCCURRING VALUE | OCCURRENCE COUNT |
|---|---|---|
| 0 | 0 | 2 |
| 1 | 1 | 3 |
| 2 | (2) | 2 |
| 3 | 7 | 2 |
| 4 | 8 | 2 |

ASCENDING-ORDER FORMAT

COMPARISON RANGE
MISMATCH

Fig.55B

SEARCH KEY ARRAY
(ASCENDING-ORDER FORMAT)

| | OCCURRING VALUE | OCCURRENCE COUNT |
|---|---|---|
| 0 | 0+7 | 2 |
| 1 | 1+7 | 2 |

ASCENDING-ORDER FORMAT
OFFSET = 7

SEARCH TARGET
(ASCENDING-ORDER FORMAT)

| | OCCURRING VALUE | OCCURRENCE COUNT |
|---|---|---|
| 0 | 0 | 2 |
| 1 | 1 | 3 |
| 2 | 2 | 2 |
| 3 | (7) | 2 |
| 4 | 8 | 2 |

ASCENDING-ORDER FORMAT

COMPARISON RANGE
MATCH

Fig.56

| | OCCURRING VALUE | OCCURRENCE COUNT | |
|---|---|---|---|
| 0 | 0 | 2 | |
| 1 | 1 | 3 | |
| 2 | 2 | 2 | } 2 |
| 3 | 7 | 2 | } 7 |
| 4 | 8 | 2 | } 8 |

AGGREGATION ARRAY

| VERTEX NODE LIST |
|---|
| 2 |
| 7 |
| 8 |

…

METHOD, INFORMATION PROCESSING APPARATUS, AND PROGRAM OF SEARCHING FOR, AGGREGATING AND SORTING TREES

This is a National Phase Application in the United States of International Patent Application No. PCT/JP2006/300940 filed Jan. 23, 2006, which claims priority on Japanese Patent Application No. 2005-016373, filed Jan. 25, 2005. The entire disclosures of the above patent applications are hereby incorporated by reference.

TECHNICAL FIELD

The present invention relates to methods for searching for, aggregating, and sorting trees from an array representing a tree data structure constructed on a storage device; an information processing apparatus for carrying out the method; and programs for searching for, aggregating, and sorting trees.

BACKGROUND ART

Databases have been used for various purposes, and relational databases (RDBs), which can eliminate logical inconsistencies, have been mainly used for medium-scale or large-scale systems. For example, RDBs are used for airplane seat reservation systems. In this case, by specifying a key item, it is possible to quickly search for targets (in most cases, one target) or it is possible to confirm, cancel or change a reservation. Since the number of seats on each flight is at most several hundred, the number of seats available on a specific flight can also be determined.

It is known that such RDBs are not suitable for handling tree-type data but are suitable for table-format data (e.g., refer to Non-Patent Document 1).

Additionally, there are some applications that can be more appropriately represented by tree-type formats than table formats. In recent years, particularly, an XML employing a tree data structure has been widely used as a data standard for intranet or Internet applications (e.g., refer to Non-Patent Document 2 for details of an XML).

In general, however, the handling of tree data structures, for example, searching for tree data, is very inefficient. A first reason for the inefficiency is that data are distributed at separate nodes and it is thus very difficult to immediately identify the locations of the data. In RDBs, for example, data "age" is stored only at an item labeled "age" in a certain table. In a tree data structure, however, since nodes at which data "age" are stored are distributed at various locations, data of interest cannot generally be searched for unless the entire tree data structure is checked.

A second reason for the inefficiency is that it takes a long time to represent search results. Representing a group of nodes found by searching often requires representing nodes corresponding to respective descendant nodes of the nodes as well. However, unlike an RDBMS, the tree data structures do not have a standard format; therefore, it takes a long time to represent the descendant nodes.

Accordingly, in order to take advantage of RDBs, which are mainly used as databases, a method for converting tree-type data into an RDB during conversion of the tree-type data into a database has been proposed (e.g., refer to Patent Document 1). In RDBs, data are separately contained in a table (tabular form) for storage. Thus, in order to convert actual tree data into an RDB, it is necessary to insert tree-type data into a table. However, in order to handle various tree data structures, the system design must be such that data from the various data structures are individually inserted into a table for the respective data structures. Thus, the system construction based on an RDB is a very time-consuming process.

In contrast, a method for converting tree-type data, particularly, XML data, into a database while keeping its original format has also been proposed. In the case of a tree data structure, since descendant nodes can be connected to one node and various types of representation are possible, the time and effort required for the system design can be significantly reduced. Thus, there is an increasing demand for processing tree-type data by mainly using a technology that allows handling of a tree data structure adopting an XML or the like.

One example approach for a method for converting XML data into a database while maintaining its original format is such that a copy of data written in a tree data structure is retrieved and, for example, for an item "age", index data for searching "age" is separately stored (e.g., refer to Patent Document 2). This makes it possible to fully utilize the advantage of XML data, i.e., the capability of adding attributes to the data itself, and also makes it possible to store a relational structure of individual items represented by tags as it is.

Patent Document 1: Japanese Unexamined Patent Application Publication No. 2003-248615
Patent Document 2: Japanese Unexamined Patent Application Publication No. 2001-195406
Non-Patent Document 1: SEC Co., Ltd. "Karearea White Paper", [online], [searched on Feb. 19, 2004], Internet <URL: http://www.sec.co.jp/products/karearea/>
Non-Patent Document 2: W3C, "Extensible Markup Language (XML) 1.0 (Third Edition)", [online], Feb. 4, 2004, [searched on Feb. 19, 2004], Internet <URL: http://www.w3.org/TR/2004/REC-xml-20040204/>

DISCLOSURE OF INVENTION

Problems to be Solved by the Invention

However, in such an approach for separately storing index data for the purpose of searching, data is stored at least two locations, and further, cost for creating indices and a data area for storing the indices are required, which is thus disadvantageous in terms of storing a large amount of data.

In practice, even if such a scheme is used to actually search for and identify a node, it takes time to represent the node. Also, this scheme cannot be used to search for nodes with respect to a relationship between nodes (e.g., to extract a tree including any ancestor nodes having an "age" of "60" and any descendant nodes having "age" of "1").

Such a fundamental problem of the related art is caused by the fact that, with attention is being given to only individual data, nodes at which the data are stored are connected by pointers to represent a tree data structure. This makes it impossible to efficiently trace relationships between data items such as parent-child, ancestor, descendant, and brother (sibling), and intergeneration relationships and so on. In other words, since values indicated by the pointers are variable, the pointers can be used only to indicate data storage addresses and thus cannot directly represent the relationships between nodes.

Accordingly, an object of the present invention is to provide methods for efficiently searching for, aggregating, and sorting trees at high speed in a tree data structure that makes it possible to efficiently trace a relationship between data in the tree data structure. Another object of the present invention is to provide an information processing apparatus for searching for, aggregating, and sorting trees in the tree data structure, and programs for searching for, aggregating, and sorting trees.

Means for Solving the Problems

The object of the present invention is achieved by a method for generating an array in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, characterized in that the method comprises:

a step of generating a vertex node list in a storage device in order to represent one or more partial trees, each being a node group including a specific node and descendant nodes thereof, wherein the vertex node list contains the node identifiers assigned to the specific nodes determined as vertex nodes;

a step of identifying portions in the first array, portions representing the partial tree identified by the respective vertex nodes corresponding to the node identifiers contained in the vertex node list; and a step of generating a second array in a standard form in the storage device for each portion in the first array in such a manner that the vertex node of the partial tree becomes a root node, wherein the parent-child relationship between the nodes is represented by the node identifiers assigned to the parent node with which non-vertex nodes are associated, the non-vertex nodes being nodes other than the vertex nodes, and wherein the node identifiers assigned to the parent node correspond to the node identifiers assigned to the associated non-vertex nodes.

According to a preferred embodiment, the step of identifying the portions in the first array comprises a step of identifying a region in the first array, wherein the region starts from a location indicated by the node identifier assigned to the vertex node, extends in a direction in which the node identifier increases, and includes locations in the first array, at which values greater than a value indicated by the node identifier assigned to the vertex node in the first array are contained.

According to a preferred embodiment, the step of generating the second array in the standard form comprises:

a step of reserving an area for an array having the same size as the portion in the first array in the storage device, wherein sequential integers, whose initial value is the node identifier assigned to the root node, are assigned to the area as storage location numbers for the array; and a step of storing values in the area, the values being obtained by subtracting the node identifier assigned to the vertex node from the values contained in the portion in the first array.

The object of the present invention is also achieved by a method for searching for a partial tree in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, and wherein the partial tree has the same topology as a tree serving as a search key in trees identified by the first array, characterized in that the method comprises:

a step of generating an array as a search key array representing the tree serving as the search key in a storage device, wherein the array has a node identifier assigned to a parent node with which non-root nodes are associated, the non-root nodes being nodes other than the root node, wherein the node identifiers assigned to the parent nodes correspond to the node identifier assigned to the associated non-root nodes so as to represent a parent-child relationship between the nodes;

a step of applying an offset to the node identifiers in the search key array and comparing the node identifiers to which the offset is applied with the corresponding node identifiers contained in a portion in the first array, the portion being determined according to the offset; and a step of generating a vertex node list indicating a search result in the storage device, wherein the search result contains the node identifiers included in the portion whose all node identifiers matched in comparison, the portion being contained in the first array.

According to a preferred embodiment, the method further comprises:

a step of determining whether a node corresponding to a node identifier located subsequent to a bottom of the portion in the first array is included in the partial tree identified by the vertex node by referring to the node identifier located subsequent to the bottom of the portion, if all of the node identifiers match; and a step of generating the vertex node list indicating the search result in the storage device if the node is not included in the partial tree, wherein the search result contains the node identifiers included in the portion whose all node identifiers matched in comparison, the portion being contained in the first array.

According to another preferred embodiment, at least one piece of substantial information representing data is related to the nodes, and the method further comprises:

a step of comparing the substantial information related to the nodes identified by the node identifiers in the portion whose all node identifiers matched in comparison with the substantial information related to the nodes identified by the node identifiers in the search key array; and a step of generating the vertex node list indicating the search result in the storage device, wherein the search result containing the node identifiers in the portion whose all substantial information matched with the corresponding substantial information in the key array, the portion being contained in the first array.

The object of the present invention is achieved by a method for aggregating partial trees in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, and wherein the partial trees belong to a tree identified by the first array, characterized in that the method comprises:

a step of generating a vertex node list containing vertex nodes of the partial trees in a storage device;

a step of identifying portions in the first array, the portions representing the partial trees identified by the respective vertex nodes corresponding to the node identifiers contained in the vertex node list;

a step of generating a second array in a standard form in the storage device for each portion in the first array in such a manner that the vertex node of the partial tree becomes a root node, wherein the parent-child relationship between the nodes is represented by the node identifiers assigned the parent nodes with which non-vertex nodes are associated, the non-vertex nodes being nodes other than the vertex nodes, and wherein the node identifiers assigned to the parent node correspond to the node identifiers assigned to the associated non-vertex node; and a step of calculating a count of the generated second arrays for each type of second array by referring to the generated second arrays, and storing the count in association with the type of the second array in the storage device.

The object of the present invention is also achieved by a method for sorting a sequence of partial trees in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, and wherein the partial trees belong to a tree identified by the first array, characterized in that the method comprises:

a step of generating a vertex node list containing vertex nodes from the partial trees in a storage device;

a step of identifying portions in the first array, the portions representing the partial trees identified by the respective vertex nodes corresponding to the node identifiers contained in the vertex node list;

a step of generating second arrays in a standard form in the storage device for respective portions in the first array in such a manner that the vertex node of the partial tree becomes a root node, wherein the parent-child relationship between the nodes is represented by the node identifiers assigned to the parent node with which non-vertex nodes are associated, the non-vertex nodes being nodes other than the vertex nodes, and wherein the node identifiers assigned to the parent node correspond to the node identifiers assigned to the associated non-vertex nodes; and a step of exchanging a sequence of the node identifiers assigned to the vertex nodes in accordance with a preset evaluation criterion by referring to the generated second arrays.

The object of the present invention is also achieved by a method for building a tree data structure in a storage device, characterized in that the method comprises:

a step of assigning unique sequential integers to nodes including a root node as node identifiers in such a manner that child nodes of a certain node are assigned their identifiers earlier than nodes in the same generation as the certain node; and a step of generating an aggregation array in an ascending order form in the storage device, wherein pairs are arranged in the aggregation array in order of the node identifiers assigned to the nodes having one or more child nodes, each pair consisting of the node identifier assigned to the node having the one or more child nodes and an occurrence count of the one or more child nodes whose parent node is a node having the one or more child node.

Further, the object of the present invention is also achieved by a method for generating an array in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, characterized in that the method comprises:

a step of generating an aggregation array in an ascending order form in a storage device, wherein pairs are arranged in order of the node identifiers included in the first array, each pair consisting of the node identifier in the first array and an occurrence count indicating the number of occurrences of the node identifier in the first array.

In one preferred embodiment, there is provided a method for generating a first array representing a parent-child relationship between nodes from the aggregation array, the first array having node identifiers assigned to parent nodes with which non-root nodes are associated, the non-root nodes being nodes other than the root node, wherein the node identifiers assigned the parent nodes correspond to the node identifiers assigned to the associated non-root nodes, the method comprising:

a step of reserving an area for the first array in a storage device based on the occurrence counts in the aggregation array, wherein the node identifiers are used as storage location numbers for the first array;

a step of placing a first pointer and a second point at initial locations in the aggregation array and the first array, respectively;

a step of storing the node identifier indicated by the first pointer in the aggregation array in the first array as a value corresponding to the storage location number indicated by the second pointer, if the node identifier indicated by the first pointer in the aggregation array is equal to a value obtained by subtracting "1" from the storage location number indicated by the second pointer, reducing the occurrence count indicated by the first pointer in the aggregation array by "1", and moving the first pointer and the second pointer in such a manner that the respective storage numbers increase; and a step of moving a third pointer initially placed at the first pointer in the aggregation array so that a storage location number of the third pointer decreases until the storage location number at which the occurrence count is not equal to "0" is identified in the aggregation array if the node identifier indicated by the first pointer in the aggregation array is not equal to the value obtained by subtracting "1" from the storage location number indicated by the second pointer, storing the node identifier indicated by the third pointer in the first array as a value corresponding to the storage location number indicated by the second pointer, reducing the occurrence count indicated by the third pointer in the aggregation array by "1", and moving the second pointer in such a manner that the storage location number of the second pointer increases.

In another preferred embodiment, there is provided a method for generating a partial array representing a partial tree including a vertex node and descendant nodes of the vertex node, the method comprising:

a step of initially computing node identifiers assigned to any nodes to be taken as at least descendant nodes based on the node identifier assigned to the vertex node and an occurrence count related to the node identifier in the aggregation array;

a step of determining whether or not a node corresponding to the node identifier is a descendant node of the vertex node by referring to the node identifiers in the aggregation array in such a manner that a storage location number increases, and updating the node identifier assigned to the descendant node of the vertex node by referring to the occurrence count related to the node identifier in the aggregation array; and a step of generating a pair of the node identifier assigned to the determined descendant node of the vertex node and the related occurrence number as the partial array in a storage device.

In a more preferred embodiment, the method further comprises a step of generating a partial array in a standard form in the storage device by subtracting the node identifier at a head of the partial array from the node identifier in the partial array.

In another preferred embodiment, there is provided a method for searching a tree identified by the aggregation array for a partial tree having the same topology as a tree serving as a search key, comprising:

a step of generating an aggregation array in an ascending order form as a search key array representing the tree serving as the search key in a storage device, wherein pairs are arranged in order of the node identifiers assigned to nodes having one or more child nodes, each pair consisting of the node identifier assigned to the node having the one or more child nodes and an occurrence count of the one or more child nodes whose parent node is the node having the one or more child node;

a step of applying an offset to the node identifiers in the search key array and comparing the node identifiers to which the offset is applied with the corresponding node identifiers contained in a portion in the aggregation array, the portion being determined according to the offset; and a step of storing an aggregation array indicating a search result in the storage device, wherein the search result contains the node identifiers included in the portion whose all nodes matched in comparison and the occurrence count of the contained node identifiers, the portion being contained in the aggregation array.

In a preferred embodiment, at least one piece of substantial information representing data is related to the nodes, and the method further comprises:

a step of comparing the substantial information related to the nodes identified by the node identifiers in the portion whose all node identifiers matched in comparison with the substantial information related to the nodes identified by the node identifiers in the search key array; and a step of generating an aggregation array indicating a search result in the storage device, wherein the search result contains the node identifiers included in the portion in the aggregation array and the occurrence counts of the node identifiers, all the substantial information related to the node identifiers in the portion being equal to the corresponding substantial information related to the key array.

In another preferred embodiment, there is provided a method for aggregating partial trees of a tree identified by the aggregation array based on the aggregation array, comprising:

a step of generating a vertex node list containing vertex nodes of the partial trees in a storage device;

a step of initially computing node identifiers assigned to any nodes to be taken as at least descendant nodes based on the node identifiers assigned to the vertex nodes and occurrence counts related to the respective node identifiers;

a step of determining whether or not a node corresponding to the node identifier is a descendant node of the vertex node by referring to the node identifiers in the aggregation array in such a manner that a storage location number increases, and updating the node identifier assigned to the descendant node of the vertex node by referring to the occurrence count related to the node identifier in the aggregation array;

a step of generating pairs of the node identifiers assigned to the determined descendant nodes of the vertex nodes and the related occurrence counts as partial arrays in the storage device;

a step of generating partial arrays in a standard form in the storage device by subtracting the node identifier at a head of the partial arrays from the node identifiers in the partial arrays; and a step of counting the number of the generated partial arrays in the standard format for each type of the partial arrays in the standard format by referring to the generated partial arrays in the standard format and storing the counted number for each type of the partial arrays in the standard format.

The object of the present invention is achieved by a computer-readable computer program for generating an array in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, characterized in that the computer program makes the computer execute:

a step of generating a vertex node list in a storage device in order to represent one or more partial trees, each being a node group including a specific node and descendant nodes thereof, wherein the vertex node list contains the node identifiers assigned to the specific nodes determined as vertex nodes;

a step of identifying portions in the first array, portions representing the partial tree identified by the respective vertex nodes corresponding to the node identifiers contained in the vertex node list; and a step of generating a second array in a standard-form in the storage device for each portion in the first array in such a manner that the vertex node of the partial tree becomes a root node, wherein the parent-child relationship between the nodes is represented by the node identifiers assigned to the parent node with which non-vertex nodes are associated, the non-vertex nodes being nodes other than the vertex nodes, and wherein the node identifiers assigned to the parent node correspond to the node identifiers assigned to the associated non-vertex nodes.

According to a preferred embodiment, in the step of identifying the portions in the first array, the computer program makes the computer execute:

a step of identifying a region in the first array, wherein the region starts from a location indicated by the node identifier assigned to the vertex node, extends in a direction in which the node identifier increases, and includes locations in the first array, at which values greater than a value indicated by the node identifier assigned to the vertex node in the first array are contained.

According to a preferred embodiment, in the step of generating the second array in the standard form, the computer program makes the computer execute:

a step of reserving an area for an array having the same size as the portion in the first array in the storage device, wherein sequential integers, whose initial value is the node identifier assigned to the root node, are assigned to the area as storage location numbers for the array; and a step of storing values in the area, the values being obtained by subtracting the node identifier assigned to the vertex node from the values contained in the portion in the first array.

The object of the present invention is also achieved by a computer-readable computer program for searching for a partial tree in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, and wherein the partial tree has the same topology as a tree serving as a search key in trees identified by the first array, characterized in that the computer program makes the computer execute:

a step of generating an array as a search key array representing the tree serving as the search key in a storage device, wherein the array has a node identifier assigned to a parent node with which non-root nodes are associated, the non-root nodes being nodes other than the root node, wherein the node identifiers assigned to the parent nodes correspond to the node identifier assigned to the associated non-root nodes so as to represent a parent-child relationship between the nodes;

a step of applying an offset to the node identifiers in the search key array and comparing the node identifiers to which the offset is applied with the corresponding node identifiers contained in a portion in the first array, the portion being determined according to the offset; and a step of generating a vertex node list indicating a search result in the storage device, wherein the search result contains the node identifiers included in the portion whose all node identifiers matched in comparison, the portion being contained in the first array.

According to a preferred embodiment, the computer program makes the computer further execute:

a step of determining whether a node corresponding to a node identifier located subsequent to a bottom of the portion in the first array is included in the partial tree identified by the vertex node by referring to the node identifier located subsequent to the bottom of the portion, if all of the node identifiers match; and a step of generating the vertex node list indicating the search result in the storage device if the node is not included in the partial tree, wherein the search result contains the node identifiers included in the portion whose all node identifiers matched in comparison, the portion being contained in the first array.

According to another preferred embodiment, at least one piece of substantial information representing data is related to the node, and the computer program makes the computer further execute:

a step of comparing the substantial information related to the nodes identified by the node identifiers in the portion whose all node identifiers matched in comparison with the substantial information related to the nodes identified by the node identifiers in the search key array; and a step of generating the vertex node list indicating the search result in the storage device, wherein the search result contains the node identifiers in the portion whose all substantial information matched with the corresponding substantial information in the key array, the portion being contained in the first array.

The object of the present invention is achieved by a computer-readable computer program for aggregating partial trees in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, and wherein the partial trees belong to a tree identified by the first array, characterized in that computer program makes the computer execute:

a step of generating a vertex node list containing vertex nodes of the partial trees in a storage device;

a step of identifying portions in the first array, the portions representing the partial trees identified by the respective vertex nodes corresponding to the node identifiers contained in the vertex node list;

a step of generating a second array in a standard form in the storage device for each portion in the first array in such a manner that the vertex node of the partial tree becomes a root node, wherein the parent-child relationship between the nodes is represented by the node identifiers assigned the parent nodes with which non-vertex nodes are associated, the non-vertex nodes being nodes other than the vertex nodes, and wherein the node identifiers assigned to the parent node correspond to the node identifiers assigned to the associated non-vertex node; and a step of calculating a count of the generated second arrays for each type of second array by referring to the generated second arrays, and storing the count in association with the type of the second array in the storage device.

The object of the present invention is also achieved by a computer-readable computer program for sorting a sequence of partial trees in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, and wherein the partial trees are from a tree identified by the first array, characterized in that the computer program makes the computer execute:

a step of generating a vertex node list containing vertex nodes from the partial trees in a storage device;

a step of identifying portions in the first array, the portions representing the partial trees identified by the respective vertex nodes corresponding to the node identifiers contained in the vertex node list;

a step of generating second arrays in a standard form in the storage device for respective portions in the first array in such a manner that the vertex node of the partial tree becomes a root node, wherein the parent-child relationship between the nodes is represented by the node identifiers assigned to the parent node with which non-vertex nodes are associated, the non-vertex nodes being nodes other than the vertex nodes, and wherein the node identifiers assigned to the parent node correspond to the node identifiers assigned to the associated non-vertex nodes; and a step of exchanging a sequence of the node identifiers assigned to the vertex nodes in accordance with a preset evaluation criterion by referring to the generated second arrays.

The object of the present invention is also achieved by a computer program for building a tree data structure in a storage device, characterized in that the computer program makes the computer execute:

a step of assigning unique sequential integers to nodes including a root node as node identifiers in such a manner that child nodes of a certain node are assigned their identifiers earlier than nodes in the same generation as the certain node; and a step of generating an aggregation array in an ascending order form in the storage device, wherein pairs are arranged in the aggregation array in order of the node identifiers assigned to the nodes having one or more child nodes, each pair consisting of the node identifier assigned to the node having the one or more child nodes and an occurrence count of the one or more child nodes whose parent node is a node having the one or more child node.

Further, the object of the present invention is also achieved by a computer-readable computer program for generating an array in a computer including data having a tree data structure in which node identifiers, which are unique sequential integers, are assigned to nodes including a root node in such a manner that child nodes of a certain node are assigned their identifiers earlier than nodes in the same generation as the certain node, and a parent-child relationship between the nodes is represented by a first array having the node identifiers assigned to parent nodes with which non-root nodes are associated, the non-root nodes being nodes other than the root node, wherein the node identifiers assigned to the parent nodes correspond to the node identifiers assigned to the associated non-root nodes, characterized in that the computer program makes the computer execute:

a step of generating an aggregation array in an ascending order form in a storage device, wherein pairs are arranged in order of the node identifiers included in the first array, each pair consisting of the node identifier in the first array and an occurrence count indicating the number of occurrences of the node identifier in the first array.

In one preferred embodiment, there is provided a computer-readable computer program for generating a first array representing a parent-child relationship between nodes from the aggregation array, the first array having node identifiers assigned to parent nodes with which non-root nodes are associated, the non-root nodes being nodes other than the root node, wherein the node identifiers assigned the parent nodes correspond to the node identifiers assigned to the associated non-root nodes, the computer program making the computer execute:

a step of reserving an area for the first array in a storage device based on the occurrence counts in the aggregation array, wherein the node identifiers are used as storage location numbers for the first array;

a step of placing a first pointer and a second point at initial locations in the aggregation array and the first array, respectively;

a step of storing the node identifier indicated by the first pointer in the aggregation array in the first array as a value corresponding to the storage location number indicated by the second pointer, if the node identifier indicated by the first pointer in the aggregation array is equal to a value obtained by subtracting "1" from the storage location number indicated by the second pointer, reducing the occurrence count indicated by the first pointer in the aggregation array by "1", and moving the first pointer and the second pointer in such a manner that the respective storage numbers increase; and a step of moving a third pointer initially placed at the first pointer in the aggregation array so that a storage location number of the third pointer decreases until the storage location number at which the occurrence count is not equal to "0" is identified in the aggregation array if the node identifier indicated by the first pointer in the aggregation array is not equal to the value obtained by subtracting "1" from the storage location number indicated by the second pointer, storing the node identifier indicated by the third pointer in the first array as a value corresponding to the storage location number indicated by the second pointer, reducing the occurrence count indicated by the third pointer in the aggregation array by "1", and moving the second pointer in such a manner that the storage location number of the second pointer increases.

In another preferred embodiment, there is provided a computer-readable computer program for generating a partial array representing a partial tree including a vertex node and descendant nodes of the vertex node, the computer program making the computer execute:

a step of initially computing node identifiers assigned to any nodes to be taken as at least descendant nodes based on the node identifier assigned to the vertex node and an occurrence count related to the node identifier in the aggregation array;

a step of determining whether or not a node corresponding to the node identifier is a descendant node of the vertex node by referring to the node identifiers in the aggregation array in such a manner that a storage location number increases, and updating the node identifier assigned to the descendant node of the vertex node by referring to the occurrence count related to the node identifier in the aggregation array; and a step of generating a pair of the node identifier assigned to the determined descendant node of the vertex node and the related occurrence number as the partial array in a storage device.

In a more preferred embodiment, the computer program makes the computer further execute a step of generating a partial array in a standard form in the storage device by subtracting the node identifier at a head of the partial array from the node identifier in the partial array.

In another preferred embodiment, there is provided a computer-readable computer program for searching a tree identified by the aggregation array for a partial tree having the same topology as a tree serving as a search key, the computer program making the computer execute:

a step of generating an aggregation array in an ascending order form as a search key array representing the tree serving as the search key in a storage device, wherein pairs are arranged in order of the node identifiers assigned to nodes having one or more child nodes, each pair consisting of the node identifier assigned to the node having the one or more child nodes and an occurrence count of the one or more child nodes whose parent node is the node having the one or more child node;

a step of applying an offset to the node identifiers in the search key array and comparing the node identifiers to which the offset is applied with the corresponding node identifiers contained in a portion in the aggregation array, the portion being determined according to the offset; and a step of storing an aggregation array indicating a search result in the storage device, wherein the search result contains the node identifiers included in the portion whose all nodes matched in comparison and the occurrence count of the contained node identifiers, the portion being contained in the aggregation array.

In a preferred embodiment, at least one piece of substantial information representing data is related to the node, and the computer program makes the computer further execute:

a step of comparing the substantial information related to the nodes identified by the node identifiers in the portion whose all node identifiers matched in comparison with the substantial information related to the nodes identified by the node identifiers in the search key array; and a step of generating an aggregation array indicating a search result in the storage device, wherein the search result contains the node identifiers included in the portion in the aggregation array and the occurrence counts of the node identifiers, all the substantial information related to the node identifiers in the portion being equal to the corresponding substantial information related to the key array.

In another preferred embodiment, there is provided a computer-readable computer program for aggregating partial trees of a tree identified by the aggregation array based on the aggregation array, the computer program making the computer execute:

a step of generating a vertex node list containing vertex nodes of the partial trees in a storage device;

a step of initially computing node identifiers assigned to any nodes to be taken as at least descendant nodes based on the node identifiers assigned to the vertex nodes and occurrence counts related to the respective node identifiers;

a step of determining whether or not a node corresponding to the node identifier is a descendant node of the vertex node by referring to the node identifiers in the aggregation array in such a manner that a storage location number increases, and updating the node identifier assigned to the descendant node of the vertex node by referring to the occurrence count related to the node identifier in the aggregation array;

a step of generating pairs of the node identifiers assigned to the determined descendant nodes of the vertex nodes and the related occurrence counts as partial arrays in the storage device;

a step of generating partial arrays in a standard form in the storage device by subtracting the node identifier at a head of the partial arrays from the node identifiers in the partial arrays; and a step of counting the number of the generated partial arrays in the standard format for each type of the partial arrays in the standard format by referring to the generated partial arrays in the standard format and storing the counted number for each type of the partial arrays in the standard format.

ADVANTAGES

According to the present invention, another object thereof is to provide methods for efficiently searching for, aggregating, and sorting trees at high speed in a tree data structure that makes it possible to efficiently trace a relationship between data in a tree data structure. The present invention also can provide an information processing apparatus for searching for, aggregating, and sorting trees in the tree data structure, and programs for searching for, aggregating, and sorting trees.

DETAILED DESCRIPTION OF THE INVENTION AND BEST MODE FOR CARRYING OUT THE INVENTION

Embodiments of the present invention will be described below with reference to the accompanying drawings.

[Computer System Configuration]

FIG. 1 is a block diagram showing the hardware configuration of a computer system that handles a tree data structure according to an embodiment of the present invention. As shown in FIG. 1, a computer system 10 has a configuration similar to those of typical computer systems, and includes a CPU 12 that controls the entire system and individual components thereof by executing programs, a RAM (Random Access Memory) 14 that stores work data and so on, a ROM (Read Only Memory) 16 that stores programs and so on, a fixed storage medium 18 such as a hard disk, a CD-ROM driver 20 for accessing a CD-ROM 19, an interface (I/F) 22 disposed between the computer system 10 and the CD-ROM driver 20 or an external terminal connected to an external network (not shown), an input device 24 such as a keyboard and a mouse, and a CRT display device 26. The CPU 12, the RAM 14, the ROM 16, the external storage medium 18, the I/F 22, the input device 24, and the display device 26 are interconnected through a bus 28.

A program for building a tree data structure on a storage device and a program for converting the tree data structure on the storage device according to the present embodiment may be stored on the CD-ROM 19 and read by the CD-ROM driver 20, or may be pre-stored in the ROM 16. The programs read from the CD-ROM 19 may be stored in a predetermined area of the external storage medium 18. Alternatively, the programs may be externally supplied via the network (not shown), the external terminal, and the I/F 22.

An information processing apparatus according to the embodiment of the present invention can be implemented by causing the computer system 10 to execute the program for building a tree data structure on the storage device and the program for converting the tree data structure on the storage device.

[Tree Data Structure]

FIG. 2A illustrates POS data, which is one example of tree data. FIG. 2A shows one example in which the data structure (i.e., topology) and the data values of this tree data are visually expressed. FIG. 2B shows one example in which the same tree data is expressed in an XML format. As shown in FIG. 2, the tree data structure is represented by combinations of arcs and nodes that start from a root node (in this example, POS data) to leaf nodes (endpoints) branched from corresponding nodes. For each node, item-name information, i.e., a node type, and item-value information, i.e., a node value, are associated with each other. In the example shown in FIGS. 2A and 2B, for a node for <ShopName>France Shop</ShopName> in XML format, a node type "ShopName (=Shop Name) and a node value "France Shop" are associated with each other. This association can be realized by, for example, associating a pointer for a node-information storage area in which information stating the type and the node value are stored with a node identifier. However, it is to be noted that the present invention will not be restricted to a particular way of handling substantial values in a tree data structure.

Meanwhile, in order to efficiently perform search, aggregation, or sort of data in a tree data structure, a scheme for representing a tree data structured topology, i.e., a scheme for expanding data in a storage device, plays a significantly important role. Accordingly, the description below will mainly be given of a tree data structure topology.

Conventionally, the above-described tree data structure is represented by connecting data-storing nodes by pointers. The pointer representation, however, has a drawback in the lack of inevitability of the pointer values. That is, in one case, a specific node A is stored at a certain address (e.g., 100), and in another case, the same node A is stored at another address (e.g., 200). Thus, the pointer values are not constant. In essence, therefore, the pointer values merely represent the storage addresses of the nodes. Thus, for example, when nodes are connected by pointers in accordance with a depth-first rule, it is difficult to re-connect the nodes by pointers in accordance with a width-first rule.

In contrast, the inventor paid attention to the fact that the topology of a tree data structure can be represented by an arc list. The arc list is a list of arcs that represent parent-child relationships between nodes. FIGS. 3A to 3C illustrate one example of a tree data structure representation form using an arc list. In the example in FIG. 3A, a tree data structure consisting of 12 nodes having node identifiers (IDs), i.e., 0, 10, 20, 30, 40, 50, 60, 70, 80, 90, 100, and 110 is shown. FIG. 3A shows the entire tree data structure. In FIG. 3A, numbers shown at the centers of figures, such as circles and heart-shaped figures, indicate node IDs, and an arrow and a pair of numbers, such as <0, 10>, shown adjacent to the arrow indicate an arc. The node IDs are not restricted to character strings, and may be numerical values, particularly, integers. FIG. 3B shows an arc list from parent nodes (From-ID) to child nodes (To-ID), and FIG. 3C shows a node list containing pairs, each consisting of a node ID and a node type. For the purpose of just representing a tree data structure, the node list may be omitted. In principle, the use of such an arc list makes it possible to directly describe relationships between nodes without using pointers.

[Representation Based on "Child→Parent" Relationship]

In the example shown in FIGS. 3A to 3C, the arc list is described based on a "parent→child" relationship in which parent nodes are associated with child nodes. Thus, since one parent node, for example, root node 0 has three child nodes 10, 60, and 80, the same node ID "0" occurs in the From-ID field of the arc list three times. That is, since a child node cannot be identified even when a parent node is identified, the arc list is constituted by an array of elements From-IDs and an array of elements To-IDs. When the arc list is used, certain nodes occur both in the array of From-IDs and the array of To-IDs.

In contrast, the parent-child relationship can also be represented by a "child→parent" relationship. In this case, the parent-child relationship between nodes is represented by an array of pairs, each consisting of a non-root node, which is a node other than a root node, and an associated parent node. The parent-child relationship represented by the "child→parent" relationship offers an important characteristic, which cannot be obtained by the "parent→child" relationship. That is, since one child node is always associated with a unique parent node, identifying a child node makes it possible to immediately identify a unique parent node corresponding to the child node. That is, in practice, it is sufficient to prepare only the array of elements To-IDs in the arc list. As a result, the storage space for storing the arc list can be reduced. A reduction in the storage space provides an advantage in that the number of accesses to a memory decreases, so that the processing speed can be increased.

FIGS. 4A to 4C illustrate a method for representing a tree data structure based on a "child→parent" relationship according to one embodiment of the present invention. FIG. 4A is a diagram illustrating an entire tree and FIG. 4B shows an arc list based on the "child→parent" relationship. Since the arc list shown in FIG. 4B contains the storage area of a parent node for the root node, "−" is set as the parent-node root node for the sake of convenience. However, since a parent node corresponding to the root node does not exist, the storage area of the parent node for the root node may be omitted, as shown in FIG. 4C, from the arc list based on the "child→parent" relationship. In this manner, according to the embodiment of the present invention, a non-root node which is a node other than a root node is associated with a parent node of the non-root node to thereby represent the parent-child relationship between nodes. Further, tracing the list of parent nodes from child nodes represented in a "child-parent" expression makes it possible to represent the tree topology.

According to one embodiment of the present invention, the tree data structure based on such a "child→parent" relationship is built on the RAM 14 by causing the computer system 10 shown in FIG. 1 to execute, as shown in FIG. 5, a node defining step 501 of assigning unique node identifiers to nodes including the root node and a parent-child-relationship defining step 502 of associating the node identifiers assigned to the non-root nodes with the node identifiers assigned to parent nodes of the non-root nodes, which are nodes other than the root node. In this manner, node identifiers are first assigned to nodes by using arbitrary identification information, such as character strings, floating points, or integers, and the parent-child relationship is then defined based on the "child→parent" representation. Thus, finding (looking up) the node identifiers of the parent nodes based on the node identifiers of the child nodes makes it possible to represent the tree topology.

[Node Identifiers]

According to one preferable embodiment, in the node defining step, numerical values are used as the node identifiers, more preferably, sequential integers are used, and even more preferably, sequential integers starting from 0 or 1 are used. Consequently, based on a node identifier, an address at which the node identifier of the parent node corresponding to the node is stored can be easily obtained. This can increase the speed of the processing for finding the node identifier of the parent node based on the node identifier of the child node.

When a parent-child relationship between nodes is represented by assigning ordered numbers to nodes in a tree data structure as node identifiers, defining a rule for the number-assigning sequence provides an advantage in that subsequent handling of the tree data structure is facilitated. According to the present invention, as the number-assigning sequence rule, a depth-first mode, in which priority is given to child nodes of a certain node over nodes in the same generation as the certain node, and a width-first mode, in which priority is given to nodes in the same generation as a certain node over child nodes of the certain node, are used.

FIGS. 6A to 6C illustrate processing for converting ID-based tree-structured data into sequential-integer-based tree-structured data according to one embodiment of the present invention. FIG. 6A shows tree-structured data in which ID numbers are assigned to respective nodes. FIG. 6B shows a conversion rule. FIG. 6C shows tree-structured data in which sequential integers are assigned to the respective nodes. The conversion rule of this example is a rule for assigning sequential numbers in the depth-first mode. Specifically, when multiple child nodes exist, a smallest number is assigned to the oldest child (the first preceding sibling) and a large number is assigned to the youngest child (the last following sibling), with priority being given to child nodes over sibling nodes. Although the numbers are assigned in ascending order in this example, they may be assigned in descending order.

FIGS. 7A to 7C illustrate processing for converting ID-based tree-structured data into sequential-integer-based tree-structured data according to another embodiment of the present invention. FIG. 7A shows tree-structured data in which ID numbers are assigned to respective nodes. FIG. 7B shows a conversion rule. FIG. 7C shows tree-structured data in which sequential integers are assigned to the respective nodes. The conversion rule of this example is a rule for assigning sequential numbers in the width-first mode. More specifically, when multiple child nodes exist, a smallest number is assigned to the oldest child (the first preceding sibling) and a large number is assigned to the youngest child (the last following sibling), with priority being given to the sibling nodes over the child nodes. Although numbers are assigned in ascending order in this example, they may be assigned in descending order.

In this manner, through the use of numbers as node identifiers, the address at which a content value for the node is stored can be promptly found from the node number, i.e., on the order of O(1). Also, representing the parent-child relationship by using "child→parent" representation allows a parent node to be promptly found from a child node, i.e., on the order of O(1).

[Depth-First Mode]

According to one embodiment of the present invention, a depth-first-based tree data structure, as shown in FIG. 6C, can be constructed on a storage device by causing the computer system 10 shown in FIG. 1 to execute:

a node defining step of assigning unique sequential integers to nodes including the root node in such a manner that child nodes of a certain node is given priority over nodes in the same generation as the certain node; and a parent-child-relationship defining step of storing, in the storage device, an array that is formed by arranging the integers assigned to the parent nodes of the non-root nodes, which are nodes other than the root node, in order of the integers assigned to the non-root nodes. With this arrangement, sequential integers are assigned to the nodes in the depth-first mode, and the parent-child relationship between the nodes is represented by an array based on a "child→parent" relationship.

FIG. 8 is a flowchart of depth-first-based node definition processing according to one embodiment of the present invention. This node definition processing causes the computer system 10 to execute:

a step 801 of first assigning a number to a root node;

a step 802 of assigning, when only one child node exists for a certain node to which a number has already been assigned, a number next to the number assigned to the certain node to the only one child node; and a step 803 of assigning, when multiple child nodes exist for a certain node to which a number has already been assigned, numbers to child nodes from the first preceding-sibling node to the last following-sibling node in accordance with a sibling relationship between the child nodes such that a following-sibling node is assigned its number next to an immediately previous assigned number, after all descendant nodes of the immediately preceding-sibling node of the following-sibling node are assigned their numbers. With this arrangement, a sibling relationship is defined between multiple child nodes derived from the same parent node in the depth-first mode.

FIG. 9 illustrates a parent-child-relationship array that is based on "child→parent" representation and that is created from the depth-first tree data structure shown in FIG. 6C according to one embodiment of the present invention. When the parent-child relationship between nodes to which sequential numbers are assigned in the depth-first mode is represented as an array based on a "child→parent" relationship, an excellent characteristic, i.e., descendant nodes of a certain node occur in contiguous areas, can be obtained, as indicated by a sub-tree 1 or a sub-tree 2 shown in FIG. 9.

According to one embodiment of the present invention, the excellent characteristic of the depth-first mode is used to extract, from the array, contiguous areas in which values that are greater than or equal to the integer assigned to a certain node, to thereby identify descendant nodes of the certain node. Consequently, a node group indicating descendant nodes of a certain node can be obtained as a continuous block in the array. For example, when the size of the continuous block is assumed to be "m", the speed of the processing for identifying all descendant nodes of the certain node is on the order of O(m).

As described above, the parent-child relationship between nodes can be represented by not only a "child→parent" relationship array but also a "parent→child" relationship array. FIG. 10 illustrates a parent-child relationship array that is based on "parent→child" representation and that is created from the depth-first tree data structure shown in FIG. 6C. Since multiple child nodes can exist for one parent node, a parent-child relationship array is constituted by two arrays: an array Aggr for indicating areas in which the numbers assigned to child nodes for a node are stored and an array P→C in which the numbers assigned to the child nodes are stored. For example, the value of the second element Aggr[1] from the head of the array Aggr is "3", which indicates that the numbers assigned to child nodes for node[1] are stored after the element P→C[3] in the array P→C. It can be understood from this arrangement that the child nodes for node[0], i.e., for the root node, are three elements from the head of the array P→C, that is, 1 of P→C[0], 6 of P→C[1], and 8 of P→C[2].

A method for determining the parent-child relationship arrays based on the "parent→child" representation will be now described.

(1) When the number of a node matches the largest index (=11) in the array P→C, a child node belonging to this node does not exist. Thus, the processing is not continued.

(2) An Aggr value is determined from the number of a parent node indicated in boldface in FIG. 10. This Aggr value indicates the start point of the array P→C.

(3) An Aggr value corresponding to "the parent-node number indicated in boldface+1" is determined. This Aggr value −1 represents the end point of the array P→C.

For example, the start point of the child nodes of node 0 is Aggr[0], i.e., 0, and the end point is Aggr[1]−1, i.e., 3−1=2. Thus, the child nodes of node 0 are the zeroth to second elements in the array P→C, i.e., 1, 6, and 8.

Alternatively, the parent-child relationship based on the "parent→child" representation can also be more simply represented by two arrays, i.e., an array of parent node numbers and an array of corresponding child node numbers. However, in order to find a parent-child relationship by using the arrays, the parent node numbers must be searched for, that is, an access time log(n) is required, which is inefficient.

[Width-First Mode]

According to one embodiment of the present invention, a width-first-based tree data structure as shown in FIG. 7C can be constructed on a storage device by causing the computer system 10 shown in FIG. 1 to execute:

a node defining step of assigning unique sequential integers to nodes including the root node, with priority being given to nodes in the same generation over child nodes; and a parent-child-relationship defining step of storing, in the storage device, an array that is formed by arranging the integers assigned to the parent nodes of the non-root nodes, which are nodes other than the root node, in order of the integers assigned to the non-root nodes. Thus, sequential numbers are assigned to the nodes in the width-first mode, and the parent-child relationship between the nodes can be represented by the array of the "child→parent" relationship.

FIG. 11 is a flowchart of width-first-based node definition processing according to one embodiment of the present invention. This node definition processing causes the computer system 10 to execute:

a step 1101 of determining how many generations each node is away from the root node and the number of nodes included in each generation;

a step 1102 of first assigning a number to the root node; and a step 1013 of assigning, after assigning numbers to all nodes included in a certain generation, numbers to all nodes included in a next generation of the certain generation until no node exists in the next generation, wherein, for nodes having different parent nodes, the nodes are assigned their numbers in order of the numbers assigned to the parent nodes, and for nodes having the same parent node, a sibling relationship between multiple child nodes derived from the parent node is defined and the nodes from the first preceding-sibling node to the last following-sibling node are sequentially assigned continuously varying unique integers, starting from a number next to a most previously assigned number. Thus, the sibling relationship can be defined between multiple child nodes derived from the same parent node in the width-first mode.

FIG. 12 illustrates a parent-child-relationship array that is based on the "child→parent" representation and that is created from the width-first tree data structure shown in FIG. 7C according to one embodiment of the present invention. As shown in the figure, when the parent-child relationship between nodes to which sequential numbers are assigned in the width-first mode is represented as an array based on a "child→parent" relationship, an excellent characteristic, i.e., child nodes of a certain node occur in contiguous areas, can be obtained. This is because, when the parent-child relationship between nodes to which sequential numbers are assigned in the width-first mode is represented by an array based on a "child→parent" relationship, the numbers assigned to parent nodes occur in the array in a certain order (in ascending order or descending order).

Thus, according to one embodiment of the present invention, the excellent characteristic of the width-first mode is used to extract, from the array, contiguous areas in which the same value as the integer assigned to one certain node is stored, to thereby identify all nodes of the certain node. With this arrangement, child nodes of the certain node can be searched for by using a technique such as binary search, that is, the child nodes can be searched for on the order of O(log (n)).

As described above, the parent-child relationship between nodes can be represented by not only a "child→parent" relationship array but also a "parent→child" relationship array. FIG. 13 illustrates a parent-child relationship array that is based on the "parent→child" representation and that is created from the width-first tree data structure shown in FIG. 7C. As shown in FIG. 13, since multiple child nodes can exist for one parent node, the parent-child relationship array is constituted by two arrays: an array Aggr for indicating areas in which the numbers assigned to child nodes for each node are stored and an array P→C in which the numbers assigned to the child nodes are stored. For example, the value of the second element Aggr[1] from the head of the array Aggr is "3", which indicates that the numbers assigned to child nodes for node[1] are stored after the element P→C[3] in the array P→C. It can be understood from this arrangement that the child nodes for node[0], i.e., for the root node, are three elements from the head of the array P→C, that is, 1 of P→C [0], 2 of P→C[1], and 3 of P→C[2].

A method for determining the parent-child-relationship arrays based on the "parent→child" representation will be described.

(1) When the number of a node matches the largest index (=11) in the array P→C, a child node belonging to this node does not exist. Thus, the processing is not continued.

(2) An Aggr value is determined from the number of a parent node indicated in boldface in FIG. 13. This Aggr value indicates the start point of the array P→C.

(3) An Aggr value corresponding to "the parent-node number indicated in boldface+1" is determined. This Aggr value −1 represents the end point of the array P→C.

For example, the start point of the child nodes of node 0 is Aggr[0], i.e., 0, and the end point is Aggr[1]−1, i.e., 3−1=2. Thus, the child nodes of node 0 are the zeroth to second elements of the array P→C, i.e., 1, 2, and 3.

[Vertex Nodes and Partial Tree Group]

During search, aggregation, or sort of data in a tree data structure, a specific portion in the tree data may be used as a processing target, for example, a search target range. The present inventor proposes a scheme for more efficiently performing various types of processing by using one node representing a specific portion including multiple nodes. Next, this scheme will be described in detail.

In the above-described tree, a method will now be discussed in which the value of a node closest to the root node is used to represent all nodes starting from the node to a leaf node (endpoint) derived from the node. A group of nodes from a certain node to a leaf node derived from the certain node will hereinafter be referred to as a "partial tree". A node that is closest to the above-noted node (root node) will be referred to as a "vertex node".

FIG. 14A is a diagram showing a tree data structure based on the above-described width-first mode. FIG. 14B shows a parent-child relationship array based on a "child→parent" representation with respect to the tree data structure. For example, a vertex node [4] includes node identifiers {4, 8, and 9}, a vertex node [6] includes a node identifier {6}, and a vertex node [3] includes node identifiers {3, 7, 10, and 11}. Such an array including multiple vertex nodes will be referred to as a "vertex node list". The vertex node list allows multiple partial trees to be specified. The specified multiple partial trees will be referred to as a "partial tree group".

The vertex node list will hereinafter be expressed by [a, b, . . . ], where "a", "b", . . . are node identifiers assigned to the vertex nodes. Expanding each vertex node contained in the vertex node list and determining the node identifiers assigned to all nodes contained in a partial tree having the vertex node will now be discussed. When only one node identifier exists in a list of determined node identifiers, i.e., when the same node identifier does not occur multiple times, such a partial tree group will be referred to as a "normalized partial tree group". Partial tree groups other than the normal partial tree group are referred to as "non-normalized partial tree groups".

Regardless of normalized partial tree groups or non-normalized partial tree groups, the vertex node list makes it possible to identify a partial tree group including a vertex node and descendant nodes of the vertex node. For example, a vertex node list [4, 6, and 3] as shown in FIG. 15A makes it possible to identify a partial tree group (partial trees {4, 8, and 9}, {6}, and {3, 7, 10, and 11}) as shown in FIG. 15B.

The partial tree group identified by the vertex node list can be a target for search, aggregation, sort, and set operations.

In the example shown in FIGS. 15A and 15B, for example, when partial trees containing "heart-shaped" nodes are searched for, a partial tree group shown in FIG. 16B can be obtained. FIG. 16A shows a vertex node list representing this partial tree group.

When the number of nodes belonging to each partial tree is aggregated, the tree group as shown FIG. 17B is obtained. In FIG. 17A, an array 1701 indicates a vertex node list, and an array 1702 indicates the numbers of nodes belonging to partial trees identified by the respective vertex nodes.

For example, sorting the partial trees by using the numbers of nodes belonging to the partial trees is possible as a sorting method. In FIG. 18A, an array 1801 indicates a sorted vertex node list, and an array 1802 indicates the numbers of nodes belonging to the partial trees identified by the vertex node list. FIG. 18B shows a state in which the partial trees are sorted in accordance with the number of nodes.

Logical AND will now be described as a set operation between multiple partial tree groups. With respect to the tree shown in FIGS. 14A and 14B, the logical AND of the partial tree group shown in FIG. 19B (the corresponding vertex node list is shown in FIG. 19A) and the partial tree group shown in FIG. 19D (the corresponding vertex node list is shown in FIG. 19C) will now be discussed.

Comparison between a partial tree 1901, shown in FIG. 19B and identified by the vertex node having node identifier [4], and a partial tree 1911, shown in FIG. 19D and identified by the vertex node having node identifier [1], shows that the partial tree 1901 is included in the partial tree 1902. A partial tree having an inclusion relationship with the partial tree 1902 shown in FIG. 19B does not exist in the partial tree group shown in FIG. 19D. Comparison between a partial tree 1903, shown in FIG. 19B and identified by the vertex node having node identifier [3], and a partial tree 1913, shown in FIG. 19D and identified by the node identifier [7], shows that the partial tree 1913 is included in the partial tree 1903. As a result, the vertex node list indicating the result of the logical AND operation indicates [4 and 7], as shown in FIG. 20A. FIG. 20B shows a partial tree group corresponding to the result of the logical AND operation.

As can be understood from FIGS. 16A to 20B, the vertex node list (in the aggregation, an array that contains aggregation results (the number of nodes) and that has the same size as the vertex node list, in addition to the vertex node list) can express a result of processing and/or operations accordingly.

[Standard Form]

A relationship of nodes and connection between the nodes in a group of partial trees, each partial tree starting from a certain node to leaf nodes branched from the certain node, is herein referred to as a "topology". For example, in a tree shown in FIG. 21, the structure of this tree 2100 may be represented by a parent-child relationship array based on a "child→parent" representation in the depth-first mode (for the array, see reference numeral 2101: the array is expressed as "C→P" in the figures, but is referred to as a "C-P array" in the description below).

Partial trees that are identified by a vertex node list 2102 will be discussed. In FIG. 22, partial trees A to C (reference numerals 2201 to 2203) correspond to partial trees identified by the vertex node list 2102 shown in FIG. 21. In a group of these partial trees, it can be said that the partial tree A (see reference numeral 2201) and the partial tree B (see reference numeral 2202) are identical with respect to their connectivity relations between the nodes, i.e., have the same topology. It can also be said that the partial tree group represented by the vertex nodes 2102 include two types of topology.

In order to perform such topology comparison and to determine the sameness of topologies, it is desired to standardize the topologies of the partial trees to represent the topologies. The standardization of the topology of the partial tree will be described below. Representation of a standardized topology will herein be referred as a "standard form".

As shown in FIG. 23A, the partial tree A (see reference numeral 2201) and the partial tree B (see reference numeral 2202) clearly have the same topology. However, referring to a C-P array 2103, elements of a portion representing the partial tree A are [1, 2, and 2], and on the other hand, the elements of a portion representing the partial tree B are [7, 8, and 8]. Thus, they are not equal to each other. Accordingly, the partial trees are represented as parent-child relationship arrays based on a "child→parent" representation in the depth-first mode (see reference numerals 2301 and 2032 shown in FIG. 23B), so that comparing the elements of the arrays with each other makes it possible to determine whether both topologies are the same. Thus, a partial tree can be represented as a parent-child relationship array based on the "child->parent" representation in the depth-first mode using a vertex node of the partial tree as a root node, and this representation is referred to as "standardization".

Processing executed during the standardization will be described below. The standardization is generally includes:

a step of generating a vertex node list in a storage device in order to represent one or more partial trees, each being a node group including a specific node and descendant nodes thereof, wherein the vertex node list contains the node identifiers assigned to the specific nodes determined as vertex nodes;

a step of identifying portions in the first array, portions representing the partial tree identified by the respective vertex nodes corresponding to the node identifiers contained in the vertex node list; and a step of generating a second array in a standard form in the storage device for each portion in the first array in such a manner that the vertex node of the partial tree becomes a root node, wherein the parent-child relationship between the nodes is represented by the node identifiers assigned to the parent node with which non-vertex nodes are associated, the non-vertex nodes being nodes other than the vertex nodes, and wherein the node identifiers assigned to the parent node correspond to the node identifiers assigned to the associated non-vertex nodes. In this case, the first array refers to a C-P array.

More specifically, as shown in FIG. 24, the CPU 12 refers to the C-P array stored in a memory, such as the RAM 14, to identify, in the C-P array, a partial array corresponding to a partial tree to be processed (step 2401). More specifically, in the C-P array, a pointer, which is initially placed at a location indicated by the vertex node of a partial tree, is moved downward one by one (in a direction in which the node identifiers increase). When a C-P array value indicated by the pointer is greater than a C-P array value corresponding to the vertex node, a node corresponding to the node identifier indicated by the pointer is included in a partial tree (see reference numeral 2501 shown in FIG. 25).

Next, the CPU 12 converts the element at the head of a partial array, the element indicating the node identifier assigned to the parent node of the vertex node into "−1" (step 2402)

Next, the CPU 12 calculates a value by subtracting an offset value, which is a value of the node identifier assigned to the vertex node, from each value of the second and subsequent elements, and stores the calculated value in the partial array as the value of the element (step 2403). The processing in step 2403 is executed on all of the second and subsequent elements in the partial array (refer to steps 2404 and 2405). As a result, in the example shown in FIG. 25, a partial array having the elements [7, 8, 8] is converted into a partial array having [−1, 0, 0] (see reference numeral 2510) through the standardization. The CPU 12 stores the standardized partial array in the memory, such as the RAM 14.

In the processing shown in FIG. 24, step 2402 may be omitted, and, in step 2403, the node identifiers of the vertex nodes may be sequentially subtracted from the values of the elements in the partial array, starting from the element at the head thereof.

[Ascending-Order Format]

An array indicating how many child nodes each parent node has can also be employed. This array will be referred to as an "ascending ordered array". The ascending ordered array has the following advantages.

(1) In the ascending ordered array, the elements are arranged in ascending order according to the sequence of parent node numbers. Thus, the closer the node identifier assigned to a parent node is to the root node, the earlier the node identifier occurs, and in case of comparing the ascending ordered arrays with each other, the closer the node identifiers are to the root node, the earlier the node identifiers are compared with each other. When two ascending ordered arrays are compared with each other starting from the heads thereof, an element closer to the root is compared earlier than others.

(2) The comparison can be efficiently performed.

The reason is that, firstly, the array size can be reduced in case where two or more child nodes often belong to one parent node.

Secondarily, this is because the ascending-ordered array is easily compared.

Thus, the ascending-order format is suitable for sorting topologies described below. In particular, the primary reason why it is suitable for sorting topologies is that, since an element closer to the root node is entered in the ascending-order format array earlier than others, the largeness/smallness of topologies is determined more heavily based on the characteristics of elements closer to the root node.

Constructing the above-described ascending ordered array in a storage device can be achieved by including:

a step of assigning unique sequential integers to nodes including a root node as node identifiers in such a manner that child nodes of a certain node are assigned their identifiers earlier than nodes in the same generation as the certain node; and a step of generating an aggregation array in an ascending order form in the storage device, wherein pairs are arranged in the aggregation array in order of the node identifiers assigned to the nodes having one or more child nodes, each pair consisting of the node identifier assigned to the node having the one or more child nodes and an occurrence count of the one or more child nodes whose parent node is a node having the one or more child node.

Generating an ascending ordered array from a C-P array (a first array) can be achieved by having a step of generating, in the storage device, an ascending ordered aggregation array in which pairs, each consisting of a node identifier in the first array and an occurrence count indicating the number of occurrences of the node identifier in the first array, are arranged in order of the node identifiers.

FIG. 26 illustrates an ascending ordered array. In FIG. 26, a parent-child relationship array (a standardized C-P array) expressing "child→parent" representation of a standardized partial tree 2601 (corresponding to the partial tree C shown in FIG. 22) is shown to be an array as indicated by reference numeral 2602. By referring to the elements in the C-P array, the CPU 12 creates an aggregation array containing pairs, each consisting of an occurring value (a node identifier) and an occurrence count (step 2611). In this case, in the aggregation array, the occurring values are stored in ascending order. Consequently, an aggregation array 2603 is created. With respect to "occurring value=−1", since the occurrence count thereof is always "1", the CPU 12 deletes the pair of "occurring value=−1" and "the occurrence count=1" from the array (step 2622). As a result of such processing, an aggregation array 2604 can be obtained. The CPU 12 stores the obtained aggregation array 2604 in the memory, such as the RAM 14.

The standardized C-P array and the ascending ordered aggregation array correspond to each other on a one-to-one basis and can be mutually converted. Conversion from a standardized C-P array into an aggregation array (generation of an aggregation array) is performed as described above. Conversion from an aggregation array into a standardized C-P array (generation of a C-P array based on an aggregation array) will be described below.

In FIG. 27, a tree 2701 can be represented using an ascending ordered aggregation array 2702 containing pairs, each consisting of an occurring value and an occurrence count. This can also be represented using a CP array 2703. The processing for converting from the aggregation array into the C-P array employs a concept "mainstream". The term "mainstream" refers to a continuous block having, in a C-P array, a storage value that is smaller than the storage location number of interest by "1", except for the element at the head (i.e., the element whose storage location number, which corresponds to a node identifier, is 0). For example, in the C-P array, blocks indicated by reference numerals 2711 and 2712 are mainstreams. In the tree 2701, arcs that couple nodes included in the blocks indicated by reference numerals 2711 and 2712 are shown by dotted lines. A node that does not have a storage value that is smaller than the storage location number of the node by "1" can be regarded as the node at the head of the mainstream.

The conversion from the aggregation array into the C-P array (a first array) generally includes:

a step of reserving an area for the first array in a storage device based on the occurrence counts in the aggregation array, wherein the node identifiers are used as storage location numbers for the first array;

a step of placing a first pointer and a second point at initial locations in the aggregation array and the first array, respectively;

a step of storing the node identifier indicated by the first pointer in the aggregation array in the first array as a value corresponding to the storage location number indicated by the second pointer, if the node identifier indicated by the first pointer in the aggregation array is equal to a value obtained by subtracting "1" from the storage location number indicated by the second pointer, reducing the occurrence count indicated by the first pointer in the aggregation array by "1", and moving the first pointer and the second pointer in such a manner that the respective storage numbers increase; and a step of moving a third pointer initially placed at the first pointer in the aggregation array so that a storage location number of the third pointer decreases until the storage location number at which the occurrence count is not equal to "0" is identified in the aggregation array if the node identifier indicated by the first pointer in the aggregation array is not equal to the value obtained by subtracting "1" from the storage location number indicated by the second pointer, storing the node identifier indicated by the third pointer in the first array as a value corresponding to the storage location number indicated by the second pointer, reducing the occurrence count indicated by the third pointer in the aggregation array by "1", and moving the second pointer in such a manner that the storage location number of the second pointer increases.

FIG. 28 is a flowchart showing processing for converting from an aggregation array into a C-P array. As shown in FIG. 28, the CPU 12 reserves, in the memory such as the RAM 14, an area for an C-P array, and stores "−1" as the element at the head of the C-P array (step 2801). Next, the CPU 12 sets a first pointer at the head of an ascending ordered aggregation array and also sets a second pointer at a second storage location (storage location number=1) in the C-P array (step 2802). FIG. 29A shows a state in which the processing in steps 2801 and 2802 has been finished. In FIG. 29A and figures subsequently referred to, the first pointer is expressed by "arrow 1" and the second pointer is expressed by "arrow 2". Also, a third pointer described below is expressed by "arrow 3". As the element at the head of the C-P array, "−1" is stored.

The CPU 12 determines whether or not a value obtained by subtracting "1" from the storage location number (node identifier) in the C-P array, the storage location number being indicated by the second pointer, is equal to the occurring value in the aggregation array, the occurring value being indicated by the first pointer (step 2803). When the determination in step 2803 indicates YES (Yes), the CPU 12 stores the occurring value indicated by the first pointer in the aggregation array in the C-P array at the location indicated by the second pointer (step 2804). Subsequently, the CPU 12 reduces the occurrence count indicated by the first pointer in the aggregation array by "1" (step 2805). Also, the CPU 12 moves the first pointer and the second pointer downward by one (i.e., in such a manner that the storage location numbers indicated by those pointers increase by "1") (step 2806). When the location of the second pointer does not exceed the bottom of the C-P array (NEGATIVE (No) in step 2807), the process returns to step 2803.

As shown in FIG. 29B, the C-P-array storage-location number indicated by the second pointer (arrow 2) is "1", and thus, when "1" is reduced from the value, a value that is equal to the occurring value "0" indicated by the first pointer in the aggregation array. Thus, when the determination in step 2803 indicates AFFIRMATIVE (Yes), the occurring value "0" indicated by the first pointer in the aggregation array is stored at the location indicated by the second pointer in the C-P array, and the occurrence count indicated by the first pointer in the aggregation array is reduced by "1". Thereafter, the first pointer and the second pointer are each moved downward in such a manner that the storage location number increases by "1".

FIGS. 30A and 30B show processing states that follow the state in which the values are stored in the C-P array shown in FIG. 29B. In this case, the processing in steps 2804 to 2806 is also executed.

In the case of FIG. 31A, the storage location number indicated by the second pointer in the C-P array is "4", and thus, when "1" is reduced from the value, "3" is obtained. On the other hand, the occurring value indicated by the first pointer in the aggregation array is "7", and thus, the values do not match each other (NEGATIVE (No) in step 2803).

In this case, the CPU 12 generates a third pointer for specifying a location in the aggregation array, and moves the third pointer back (i.e., moves the third pointer in a direction in which the storage location number decreases) from a location of the first pointer to specify a location at which "the occurrence count≠0" is satisfied for the first time (step 2808). In the example shown in FIG. 31A, when the third pointer is moved in a direction in which the storage location number decreases by one from the location of the first pointer, the occurrence count indicated by the third pointer is "2". Thus, the third pointer stops at this location.

Next, the CPU 12 stores the occurring value indicated by the third pointer in the aggregation array in the C-P array at the location indicated by the second pointer (step 2809). The CPU 12 reduces the occurrence count indicated by the third pointer in the aggregation array by "1" (step 2810). Also, the CPU 12 moves the second pointer downward by one (i.e., moves the second pointer such that the storage location number indicated by the pointer increases by "1") (step 2811).

In the case of FIGS. 31B, 32A, and 32B, the determination in step 2803 indicates NEGATIVE (No), steps 2808 to 2811 are executed, and the occurring value indicated by the third pointer in the aggregation array is stored at the location indicated by the second pointer in the C-P array.

In the case of subsequent FIGS. 33A and 33B, the determination in step 2803 indicates AFFIRAMATIVE (Yes), steps 2804 to 2806 are executed, and the occurring value indicated by the first pointer in the aggregation array is stored at the location indicated by the second pointer in the C-P array. In the case of subsequent FIGS. 34A and 34B, the determination in step 2803 indicates NEGATIVE (No), steps 2808 to 2811 are executed, and the occurring value indicated by the third pointer in the aggregation array is stored at the location indicated by the second pointer in the C-P array. For example, in FIG. 34B, after the processing in steps 2808 to 2811, the second pointer is moved to the position exceeding the bottom of the C-P array. Thus, the processing is finished at this point.

In this manner, a standardized C-P array can be generated based on an ascending ordered aggregation array. It can also be understood that the ascending ordered aggregation array and the standardized C-P array contain the same information (tree-structure information), except that the representation forms are different from each other. This arrangement, therefore, makes it possible to employ the representation form, which is more convenient to use in search, aggregation, and sort processing described below, and to continue processing.

[Ascending Ordered Partial Tree]

In the ascending ordered aggregation array described above, the node identifiers assigned to terminal nodes (leaf nodes) do not occur as occurring values. For example, a tree shown in FIG. 48A is represented as shown in FIG. 48B (see reference numeral 4800), through the use of an ascending ordered aggregation array. As can be understood from FIG. 48A, the node identifiers assigned to leaf nodes in this tree are "3", "5", "6", "10", and "11". When reference is made to occurring-value items in the partial array shown in FIG. 48B, the node identifiers "3", "5", "6", "10", and "11" do not occur. Also, as can be understood with reference to the partial array shown in FIG. 48B, the sum of occurrence counts is equal to "the number of all nodes−1".

Identifying a range of an ascending ordered partial tree and the standard format of the ascending ordered partial tree will be described below.

The method for identifying a partial tree in an ascending ordered array generally includes:

a step of initially computing node identifiers assigned to any nodes to be taken as at least descendant nodes based on the node identifier assigned to the vertex node and an occurrence count related to the node identifier in the aggregation array;

a step of determining whether or not a node corresponding to the node identifier is a descendant node of the vertex node by referring to the node identifiers in the aggregation array in such a manner that a storage location number increases, and updating the node identifier assigned to the descendant node of the vertex node by referring to the occurrence count related to the node identifier in the aggregation array; and a step of generating a pair of the node identifier assigned to the determined descendant node of the vertex node and the related occurrence number as the partial array in a storage device.

FIG. 49 is a flow chart showing processing for identifying a partial tree having a certain node based on an ascending ordered aggregation array. As shown in FIG. 49, the CPU 12 retrieves a vertex node from a vertex node list stored in the memory, such as the RAM 14 (step 4901). Subsequently, the CPU 12 refers to an occurring value and the occurrence count in the aggregation array, the value and the number being indicated by the retrieved vertex node, to calculate an initial calculated value ("the occurring value+the occurrence count+ 1" (step 4902). This calculated value has a meaning as follows.

In the ascending ordered aggregation array, an occurring value corresponds to a node identifier, and an occurrence count indicates how many times the node identifier occurs in the C-P array. Thus, it can be known that, at least, the node identifier of a next vertex node in the vertex node list (in other words, the node identifier of the vertex node in a next partial tree) is greater than or equal to the calculated value.

As is clarified in step 4908 described below, when an occurring value (node identifier) at a row next to a row of interest where the occurring value exists in the aggregation array does not have a number greater than or equal to the calculated value at the row of interest, it is possible to correct the calculated value at the row of interest by adding the occurrence count at the row next to the row of interest. In this manner, when the occurring value at the next row does not reach the calculated value, the partial tree can be identified by adding the occurrence count at the next row to the calculated value at the row of interest and comparing the calculated value with the occurring value at the row after the next row until the occurring value, which is greater than or equal to the calculated value, is found.

FIGS. 50A to 50C illustrate a specific example of processing for identifying, in a tree shown in FIG. 48A, a partial tree having a certain vertex node (the node identifier=2). FIG. 50A shows a state in which a pointer indicates, in an aggregation array, a storage location number corresponding to the vertex node. In FIGS. 50A to 50C, each black arrow indicates a storage location number corresponding to the vertex node. Each hollow arrow indicates a moving pointer described below.

In this state, the above-described calculated value is "2+2+ 1=5". Thus, it can be understood that the node identifier of the vertex node in a next partial tree is "5" or more.

Next, the CPU 12 places the moving pointer at a storage location number indicated by the vertex node (step 4903). This location is the initial location of the moving pointer. The CPU 12 moves the moving pointer to the next storage location number (step 4904), and refers to, in the aggregation array, an occurring value indicated by the moving pointer (step 4905). The CPU 12 compares the calculated value calculated in step 4902 with the occurring value referred to in step 4903. When "the calculated value>the occurring value" is satisfied (AFFIRMATIVE (Yes) in step 4906), the CPU 12 generates information indicating that the node corresponding to the occurring value at the storage location number indicated by the moving pointer belongs to the vertex node, and stores the generated information in the memory (step 4907). For example, in order to store the information, an array containing the occurring value may be generated in the memory or a flag associated with the storage location number may be set in the aggregation array to represent the information.

Thereafter, the CPU 12 updates the calculated value to "the initial calculated value+the occurrence count indicated by the pointer" (step 4908).

As shown in FIG. 50B, when the moving pointer indicates the storage location number "3", the occurring value is "4". Since comparison of the calculated value "5" and the occurring value "4" shows "the calculated value 5>the occurring value 4", the determination in step 4904 indicates AFFIRAMTIVE (Yes). That is, the node having the occurring value "4", i.e., the node identifier "4", belongs to the vertex node having node identifier "2", and the information indicating so is stored in the memory. The calculated value is further updated to "5 (the initial calculated value)+1 (the occurrence count indicated by the pointer)=6".

When the determination in step 4906 indicates NO, the partial-tree identifying processing for the vertex node ends. As shown in FIG. 50C, when the moving pointer indicates the storage location number "4", the occurring value is "7". Since comparison of the updated calculated-value "6" and the occurring value "7" shows "the calculated value 6<the occurring value 7", the determination in step 4906 indicates NEGATIVE (No). Thus, it is identified that the partial tree having the vertex node "2" is in a range indicated by reference numeral 5001.

Next, a description will be given of the standard format of a tree or a partial tree represented by an ascending ordered aggregation array. This can be accomplished by subtracting the occurring value at the storage location number at the head of an aggregation array from each occurring value in the aggregation array. FIG. 51 illustrates an ascending ordered aggregation array of the partial tree identified in the processing shown in FIGS. 50A to 50C. In this case, the occurring value "2" at the storage location number at the head is subtracted from each occurring value (see reference numeral

5101) in an ascending ordered aggregation array (see reference numeral 5102). This can obtain a standardized ascending ordered aggregation array (see reference numeral 5103).

An ascending ordered aggregation array for terminal nodes will now be discussed. In the example shown in FIG. 48A, the node identifiers of the terminal nodes are "3", "5", "6", "10", and "11". Thus, each of the terminal nodes is represented in the ascending ordered aggregation array, as indicated by reference numeral 5201 shown in FIG. 51. For example, the first aggregation array indicates that the occurrence count for the occurring value "3" is "0 (zero)", (since it is a terminal node). In this case, the standardization can also be accomplished by reducing the occurring value from the occurring value in each array, that is, by changing the occurring value to "0 (zero)" (see reference numeral 5202).

[Topology Search]

We will now explain a case in which a partial tree having the same connection form, i.e., the same topology, as a tree or a partial tree is to be found in an entire tree or a partial tree identified by a certain vertex node. For example, when a partial tree having the same topology as a tree shown in FIG. 35A is to be found in a tree shown in FIG. 35B, a partial tree indicated by the dotted line shown in FIG. 35B can be identified. This processing will be referred to as topology search. In the topology search, the search result thereof can be expressed by an array (a vertex node list) containing the node identifier assigned to the vertex node of the partial tree identified by the search. In the example of FIGS. 35A and 35B, the search result is [7].

Since an algorithm for a case in which a partial tree having a tree serving as a search key is to be found from the entire tree and an algorithm for a case in which a partial tree having the same tree serving as a search key is to be found from a partial tree group identified by a vertex node list are the same, they are described below without distinction.

It is noted that, in the following description, a tree that serves as a search key will also be referred to as a "search topology". The topology search generally includes:

a step of generating an array representing a parent-child relationship between nodes in a storage device as a search key array representing the tree serving as the search key, the array having the node identifiers assigned to parent nodes with which non-root nodes are associated, the non-root nodes being nodes other than a root node, wherein the node identifier assigned to the parent node corresponds to the node identifier assigned to the associated non-root nodes;

a step of applying an offset to the node identifiers in the search key array and comparing the node identifiers to which the offset is applied with the corresponding node identifiers contained in a portion of a first array, the portion being determined according to the offset; and a step of generating a vertex node list indicating a search result in the storage device, the vertex node list containing the node identifiers in the portion of the first array, wherein all the node identifiers contained in the portion matched in comparison.

FIG. 36 is a flowchart showing topology search processing according to the present embodiment. As shown in FIG. 36, by referring to a C-P array representing a search topology stored in the memory such as the RAM 14, the CPU 12 generates a search-key array from which the element at the head of the C-P array is deleted (step 3601). Next, the CPU 12 initializes an offset value, which is to be added to the values in the search-key array, to "0 (zero)" (step 3602). The CPU 12 also places a pointer, which indicates a position for comparison between the search-key array and a search-target C-P array, at an initial location (step 3603). In step 3603, in the C-P array, the pointer is initially placed at a location at which "1" is added to the offset value. For example, as shown in FIG. 37A, the pointer that indicates a comparison position initially indicates "offset value (0)+1=1" in the C-P array. Thus, the element at the head of the search key array is compared with the element having the storage location number "1" indicated by the pointer in the C-P array, as described below.

The CPU 12 adds the offset value to each element in the search key array and compares the elements to which the offset value is added with elements in a portion of the C-P array corresponding to the elements in the search key array, wherein the portion is indicated by the pointer for the C-P array (step 3604). The CPU 12 then determines whether or not the corresponding elements in the search key array and the portion of the C-P array match each other (step 3605). When the determination in step 3605 indicates AFFIRMATIVE (Yes), the CPU 12 refers to the element next to the bottom of the portion to be compared in the C-P array, i.e., the element at the storage location number obtained by adding "1" to the storage location number at the bottom of the portion to be compared, to thereby determine whether or not the referred element belongs to the same block as a tree specified by the portion to be compared in the C-P array (step 3606). Specifically, the CPU 12 checks whether or not the element next to the bottom of the portion to be compared in the C-P array is greater than or equal to the offset value. If the element is greater than or equal to the offset value, then the CPU 12 determines that the element belongs to the same block as the tree.

If the determination in step 3606 indicates NEGATIVE (No), the offset value is stored in a vertex node list that is generated in the memory to store a search result (step 3607). Thereafter, the CPU 12 moves the pointer downward by one, i.e., moves the pointer in such a manner that the storage location number increases by "1" (step 3608), while the CPU 12 increases the offset value by "1" (step 3609). In conjunction with the movement of the pointer, it is determined whether or not a new portion to be compared exists in the C-P array (step 3610), and if the portion exists (AFFIRMATIVE (Yes) in step 3610), this process returns to step 3604.

In the example shown in FIG. 37A (in case of the offset value=0), since the elements in the search-key array and the elements in the portion to be compared (the elements at the storage location numbers "1" to "4") in the C-P array do not partially match each other, the determination in step 3605 is negative (No). In the example shown in FIG. 37B (in case of the offset value=1), the elements in the search-key array and the elements in the portion to be compared (the elements at the storage location numbers "2" to "5") in the C-P-array match each other completely. The element (the storage location number=6) next to the bottom (the storage location number=5) in the C-P array to be compared is "1", which is greater or equal to the offset value "1". Thus, the determination in step 3606 is affirmative (Yes). In the examples of shown in FIGS. 38A and 38B (in cases of the offset values=2 and 3, respectively), the determination in step 3605 is also negative (No). In the example shown in FIG. 39 (in case of the offset value=7), the determination in step 3605 is affirmative (Yes) and the determination in step 3606 is negative (No). As a result, the offset value "7" is stored in the vertex node list. In the example shown in FIG. 39, since an element next to the bottom (the storage location number=11) in the C-P array to be compared does not exist, checking of the block (i.e., comparison between a next element and the offset) does not need to be continued.

[Another Topology Search]

For example, in addition to matching of the topologies, matching of the types of nodes (e.g., item-name information of the nodes described with reference to FIGS. 2A and 2B) may be used as a search condition. In this case, after the above described step 3606, the types of nodes corresponding to the compared elements are compared with each other, and if the types match each other, then the offset value may be stored may be stored in the vertex node list.

[Topology Search Using Ascending Ordered Aggregation Array]

The topology search can also be realized using an ascending ordered aggregation array. In essence, a standardized ascending ordered aggregation array representing a tree (a search topology) serving as a search key is compared with an ascending ordered aggregation array of trees. FIG. 53 is a flowchart showing processing for topology search using an ascending-order format according to the present embodiment. The processing shown in FIG. 53 is substantially the same as the processing (the topology search processing using the C-P array) shown in FIG. 36. Although the processing shown in FIG. 36 involves the determination as to whether or not the element next to a portion to be compared belongs to the same block as the portion to be compared (step 3606), the use of the ascending ordered aggregation array allows the step to be omitted.

The topology search using an ascending ordered aggregation array generally includes:

a step of generating the ascending ordered aggregation array as a search key array representing the tree serving as the search key in a storage device, wherein pairs are arranged in order of the node identifiers assigned to nodes having one or more child nodes, each pair consisting of the node identifier assigned to the node having the one or more child nodes and an occurrence count of the one or more child nodes whose parent node is the node having the one or more child node;

a step of applying an offset to the node identifiers in the search key array and comparing the node identifiers to which the offset is applied with the corresponding node identifiers contained in a portion in the aggregation array, the portion being determined according to the offset; and a step of storing an aggregation array indicating a search result in the storage device, wherein the search result contains the node identifiers included in the portion whose all nodes matched in comparison and the occurrence count of the contained node identifiers, the portion being contained in the aggregation array.

More specifically, the CPU 12 refers to an ascending ordered aggregation array representing a search topology stored in the memory such as the RAM 14 and generates a search key array (step 5301). This search key array is a standardized ascending ordered aggregation array. Next, the CPU 12 places a pointer at an initial location to indicate a position for comparison between the search-key array and the aggregation array to be compared (step 5302). In step 5303, the pointer is placed at the location having the storage location number (0 (zero)) in the aggregation array. The CPU 12 also initializes the offset value to be added to occurring values in the search key array, in such a manner that a sum of the occurring value at the head of the search key array and the offset value match the occurring value at the head of a portion to be compared (step 5303). In the case of FIG. 54A, since the occurring value at the head of the search key array is "0 (zero)" and the occurring value at the head of the portion to be compared is "0 (zero)", the offset value also becomes "0 (zero)".

Next, the CPU 12 compares the search key array with the portion to be compared in the aggregation array indicated by the pointer (step 5304). In this case, the position indicated by the pointer is the head of the portion to be compared.

For example, as shown in FIG. 55A, the comparison position is initially determined so that the storage location number "0 (zero)" in the search key array and the storage location number "0+0 (the latter 0 (zero) is the offset value)" in the aggregation array are aligned with each other.

Next, the CPU 12 adds the offset value to each occurring value in the search key array, and compares a set of the occurring values in the search key array, the offset value being added to the occurring values, and the occurrence counts thereof with a set of the occurring values at the corresponding positions in the portion to be compared and the occurrence counts (step 5304). If all of the corresponding elements match each other (affirmative (Yes) in step 5305), then the offset value is stored in the vertex node list, which is generated in the memory for storing the search result (step 5306). Thereafter, the CPU 12 moves the pointer downward by one, i.e., moves the pointer in such a manner that the storage location number increases by "1" (step 5307). The CPU 12 also increases the offset value such that a sum of the occurring value at the head of the search key array and the offset value matches the occurring value at the head of the portion to be compared after the pointer has been moved (step 5308). In conjunction with the movement of the pointer, it is determined whether or not a new portion to be compared exists in the aggregation array (step 5309). If the new portion exists (affirmative (Yes) in step 5309), the process returns to step 5304.

In the example shown in FIG. 54A (in case of the offset value=0), the occurring value to which the offset value is added in the search key array and the occurring value in the portion to be compared match each other, but the occurrence counts do not match each other. Thus, the determination in step 5305 is negative (No). In the example shown in FIG. 54B (in case of the offset value=1), the occurring values also match each other, but the occurrence counts do not match each other. In addition, in the example shown in FIG. 55A (in case of the offset value=2), the occurring values do not match each other.

In contrast, in the example shown in FIG. 55B, all of the corresponding occurring values and the corresponding occurrence counts match. Thus, the vertex node list representing the search list becomes [7].

The use of an ascending ordered aggregation array can reduce the number of comparison operations between a search key array and a portion to be compared. In the comparison operations, processing for determining the same blocks (step 3606 shown in FIG. 36) may be omitted.

[Topology Aggregation]

Topology aggregation will now be described. Topology aggregation can be regarded as two methods as follows.

(1) Using a topology as a dimension, the number of each type of topologies is determined in a tree.

(2) Using a topology as a dimension, the number, a maximum value, a minimum value, a total value, an average value, and so on of a specific measure (e.g., age, weight, and so on) are determined in a tree.

In essence, when aggregation (1) (which is referred to as a "first topology aggregation") is executed, it is easy to perform aggregation (2) (which is referred to as a "second topology aggregation"), i.e., an operation for a measure belonging to the topology type. Thus, the first topology aggregation will first be described.

Now, the measures are briefly described. As described with reference to FIGS. 2A and 2B, item-name information, i.e., a node type, and item-value information, i.e., a node value, are associated with each other at an actual node. The item-name information (the node type) and the item-value information (the actual value of the node) at the node may be used as the measure.

[First Topology Aggregation]

A tree shown in FIG. 40A will be discussed. Now, determining the number of trees for each topology type in a partial-tree group identified by a vertex node list [2, 7, and 8] will be discussed. As a result, a topology 4011 appears as two partial nodes indicated by a vertex node list [2, 8]. A topology 4012 appears as one partial node indicated by a vertex node list [7]. Thus, a topology-aggregation result indicating that the number of topologies 4011 is 2 and the number of topologies 4012 is 1 is obtained (see FIG. 40B).

The topology aggregation generally includes:

a step of generating a vertex node list containing vertex nodes of partial trees in a storage device;

a step of identifying portions in a first array, the portions representing the partial trees identified by respective vertex nodes corresponding to node identifiers contained in the vertex node list;

a step of generating a second array in a standard form in the storage device for each portion in the first array in such a manner that the vertex node of the partial tree becomes a root node, wherein the parent-child relationship between the nodes is represented by the node identifiers assigned the parent nodes with which non-vertex nodes are associated, the non-vertex nodes being nodes other than the vertex nodes, and wherein the node identifiers assigned to the parent node correspond to the node identifiers assigned to the associated non-vertex node; and a step of calculating a count of the generated second arrays for each type of second array by referring to the generated second arrays, and storing the count in association with the type of the second array in the storage device.

A more specific description will be given of first topology aggregation processing performed by an information processing apparatus according to the present embodiment. As shown in FIG. 41, the CPU 12 refers to a vertex node list stored in the memory such as the RAM 14 and retrieves a value in the vertex node list (i.e., a node identifier assigned to a vertex node) (step 4101). Next, the CPU 12 identifies a range of a partial tree specified by the vertex node in a C-P array (step 4102). This can be realized by, for example, processing shown in FIG. 42.

As shown in FIG. 42, the CPU 12 first refers to an element indicated by a storage location number obtained by adding "1" to the node identifier assigned to the vertex node in the C-P array (step 4201). Next, it is determined whether or not the referenced element in the C-P array is greater than or equal to the node identifier assigned to the vertex node (step 4202). When the determination in step 4202 is affirmative (Yes), since the node corresponding to the storage location number for this element belongs to a partial tree identified by the vertex node, the CPU 12 temporarily stores the storage location number in the memory (step 4203). Next, the CPU 12 adds "+1" to the storage location number to be referenced in the C-P array. The CPU 12 repeats the processing in steps 4202 to 4204 so long as the storage location number does not exceed the storage location number at the bottom of the C-P array (negative (No) in step 4205). This allows the storage location numbers corresponding to node identifiers assigned to nodes belonging to the partial tree for the vertex node.

Next, the CPU 12 converts the partial array in the C-P array, the partial array corresponding to the partial tree specified by the vertex node, into a standard-format array (step 4103). The standardization conversion is realized by executing the processing shown in FIG. 24.

The CPU 12 executes the processing in steps 4102 and 4103 on all vertex nodes (refer to step 4104) and obtains standardized partial arrays for the respective vertex nodes. The obtained partial arrays may be stored in the memory, such as the RAM 14. Next, the CPU 12 compares the standard-format partial arrays with each other and counts how many types of arrays exist for each partial array (step 4105). The partial array and its count value serve as an aggregation result obtained by the first topology aggregation.

If the first topology aggregation is to be performed on an entire tree, then all node identifiers may be stored in the vertex node list.

FIGS. 43A to 43C illustrate an example of the first topology-aggregation processing. In FIGS. 43A to 43C, we can achieve the result that there are two standard-format partial arrays [−1, 0, 0] and one standard-format partial array [−1, 0, 1, 1, 0] by identifying ranges of partial trees specified by the vertex nodes (see reference numerals 4301, 4311, and 4321) and obtaining the standard-format partial arrays (see reference numerals 4302, 4312, and 4322).

[Second Topology Aggregation]

In the second topology aggregation, for each classified partial array, the number of specified measures and operation values (such as a maximum value, a minimum value, a total value, an average value, and so on) regarding specified values may be derived from the result of the first topology aggregation.

[Topology Aggregation Using Ascending Ordered Aggregation Array]

The topology aggregation can also be realized using an ascending ordered aggregation array. The tree shown in FIG. 40A can be expressed as shown in FIG. 56 by means of an ascending ordered aggregation array. As is the case with an example shown in FIG. 40A, it is assumed that the number of types of topologies is computed in a partial tree group identified by a vertex node list [2, 7, 8].

The topology aggregation using an ascending ordered aggregation array generally includes:

a step of generating a vertex node list containing vertex nodes of partial trees in a storage device;

a step of initially computing node identifiers assigned to any nodes to be taken as at least descendant nodes based on the node identifiers assigned to the vertex nodes and occurrence counts related to the respective node identifiers;

a step of determining whether or not a node corresponding to the node identifier is a descendant node of the vertex node by referring to the node identifiers in the aggregation array in such a manner that a storage location number increases, and updating the node identifier assigned to the descendant node of the vertex node by referring to the occurrence count related to the node identifier in the aggregation array;

a step of generating pairs of the node identifiers assigned to the determined descendant nodes of the vertex nodes and the related occurrence counts as partial arrays in the storage device;

a step of generating partial arrays in a standard form in the storage device by subtracting the node identifier at a head of the partial arrays from the node identifiers in the partial arrays; and a step of counting the number of the generated partial arrays in the standard format for each type of the partial arrays in the standard format by referring to the generated partial arrays in the standard format and storing the counted number for each type of the partial arrays in the standard format.

FIG. 57 is a flowchart showing processing for the topology aggregation using an ascending ordered aggregation array. As shown in FIG. 57, the CPU 12 refers to a vertex node list stored in the memory such as the RAM 14, and retrieves a value (i.e., a node identifier assigned to a vertex node) from the memory (step 5701). Next, the CPU 12 identifies a range of a partial tree for the retrieved vertex node in the aggregation array to be processed (step 5702). This is realized by executing the processing shown in FIG. 49. In step 5702, an aggregation array indicating the range of the partial tree is generated.

The CPU 12 converts the aggregation array that is obtained in step 5702 and that indicates the range of the partial tree into a standard-format aggregation array (step 5703). This can be realized by subtracting the occurrence count at the storage location number at the head of the aggregation array from each occurring value in the aggregation array, as described above with reference to FIGS. 51 and 52.

After the processing in steps 5701 to 5703 is executed on all vertex nodes (see step 5704), standardized (i.e., standard-format) aggregation arrays are obtained for the respective vertex nodes. The obtained aggregation arrays may be stored in the memory, such as the RAM 14. Next, the CPU 12 compares the aggregation arrays with each other and counts how many aggregation arrays exist for each type of the aggregation arrays (step 5705). The aggregation arrays indicating the ranges of the partial trees and the count numbers of the aggregation arrays serve as the aggregation result of the topology aggregation.

In the example shown in FIG. 56, as a result of the processing described above, aggregation arrays indicating the ranges of three partial trees can be obtained with respect to the vertex nodes, respectively, as show in FIG. 58A. In FIG. 58A, reference numerals 5801 to 5803 represent aggregation arrays indicating the ranges of partials trees with respect to the vertex nodes "2", "7", and "8", respectively. Thus, an aggregation result as shown in FIG. 58B can be obtained.

[Topology Sort]

In some cases, it is desired that, for the aggregation result, the number of aggregations be displayed in ascending order or descending order. That is, in some cases, it is desired that an array that allows sequential access in order from the smallest to the largest (or in the reverse order thereof) be generated based on a large/small criterion that satisfies transitivity. Generation of such an array based on the large/small criterion is referred to as "sorting".

Suppose that a vertex node list is sorted in ascending order of the number of nodes in a partial tree indicated by each of vertex nodes for a tree group shown in FIG. 44A. In this case, a sorted version of the vertex node list will be "2, 8, 7", as shown in FIG. 44B. This is because the number of nodes in the partial node indicated by each of the vertex nodes "2" and "8" is "3", and the number of nodes in the partial tree indicated by the vertex node "7" is "5". Of course, the order of sorting is not limited to this arrangement, and the measure described with respect to the aggregation may also be employed.

Topology sort processing is a method for sorting a sequence of partial trees in a tree identified by a first array and generally includes:

a step of generating a vertex node list containing vertex nodes from the partial trees in a storage device;

a step of identifying portions in the first array, the portions representing the partial trees identified by the respective vertex nodes corresponding to the node identifiers contained in the vertex node list;

a step of generating second arrays in a standard form in the storage device for respective portions in the first array in such a manner that the vertex node of the partial tree becomes a root node, wherein the parent-child relationship between the nodes is represented by the node identifiers assigned to the parent node with which non-vertex nodes are associated, the non-vertex nodes being nodes other than the vertex nodes, and wherein the node identifiers assigned to the parent node correspond to the node identifiers assigned to the associated non-vertex nodes; and a step of exchanging a sequence of the node identifiers assigned to the vertex nodes in accordance with a preset evaluation criterion by referring to the generated second arrays.

FIG. 45 is a flowchart showing one example of topology sorting according to the present embodiment. As shown in FIG. 45, the topology-sort processing according to this example is similar to the first topology-aggregation processing, and steps 4501 to 4504 shown in FIG. 45 are analogous to steps 4101 to 4104 shown in FIG. 41. Thus, in the example in shown in FIG. 46A (which is the same as that shown in FIG. 43A), executing the processing in steps 4501 to 4503 on all vertex nodes in the vertex node list allows standard-format arrays shown in FIGS. 46B to 46D to be obtained with respect to the vertex nodes "2", "7", and "8". When the large/small comparison criterion (sorting by the number of nodes) shown in FIG. 44B is followed, a vertex node list in which the order of the vertex nodes is changed can be obtained as shown in FIG. 46E.

[Information Processing Apparatus]

FIG. 47 is a functional block diagram showing an example of an information processing apparatus for building a tree data structure according to an embodiment of the present invention, generating a vertex node list, generating various arrays forming the tree data structure, storing the arrays in a memory, as well as executing topology search, topology aggregation, and topology sort processing. In practice, this information processing apparatus 4700 is achieved by installing a necessary program on the computer system 10 shown in FIG. 1.

As shown in FIG. 47, the information processing apparatus 4700 includes a storage unit 4701 in which data representing the tree data structure and various arrays including a vertex node list are stored; a node defining unit 4702 for assigning unique node identifiers to nodes including a root node and for storing the node identifiers in the storage unit 3501; a parent-child-relationship defining unit 4703 for associating the node identifiers assigned to non-root nodes, which are nodes other than the root node, with the node identifiers assigned to parent nodes of the respective non-root nodes and for storing a C-P array, which is an array indicating the association, in the storage unit 4701; a standardization processing unit 4704 for generating a standardized partial array representing a partial tree, based on the node identifiers and the C-P array stored in the storage unit 4701; an ascending-order-format processing unit 4705 for converting the C-P array and the partial array into an ascending ordered aggregation array; a topology-search processing unit 4706 for executing topology search processing; a topology-aggregation processing unit 4707 for executing topology aggregation processing; and a topology-sort processing unit 4708 for executing topology sort processing. Processing results obtained by and arrays generated by the standardization processing unit 4704, the ascending-order-format processing unit 4705, the topology-search processing unit 4706, the topology-aggregation processing unit 4707, and the topology-sort processing unit 4708 are stored in the storage unit 4701.

Preferably, the node defining unit 4702 uses numerical values as the node identifiers, and more preferably, uses sequential integers as the node identifiers. The parent-child relationship defining unit 4703 stores, in the storage unit 4701, an array containing pairs, each consisting of the node identifier assigned to each non-root node and the node identifier assigned to the parent node with which each non-root node is associated.

When a node is specified by, for example, an instruction from the input unit (see reference numeral 24 in FIG. 1), the vertex-node-list generating unit 4704 stores the node identifier of the specified node in the vertex node list. In accordance with the instruction from the input device, the topology-search processing unit 4706, the topology-aggregation processing unit 4707, and the topology-sort processing unit 4708 executes topology search processing, topology aggregation processing, and topology sort processing as described above, respectively. During the processing, the standardization processing unit 4704 and the ascending-order-format processing unit 4705 also execute processing to generate a predetermined array and store the array in the storage unit 4701, as needed.

The present invention is not limited to the embodiments described above and various modifications can be made thereto within the scope of the present invention disclosed in the claims. Needless to say, such modifications are also encompassed by the scope of the present invention.

BRIEF DESCRIPTION OF THE DRAWINGS

FIGS. 2A and 2B illustrate POS data, which is one example of tree data, FIG. 2A showing an example in which the data structure (i.e., topology) and data values of the tree data are visually represented, and FIG. 2B showing an example in which the same tree data is represented in an XML format.

FIGS. 6A to 6C illustrate processing for converting ID-based tree-structured data into sequential-integer-based tree-structured data according to one embodiment of the present invention.

FIGS. 7A to 7C illustrate processing for converting ID-based tree-structured data into sequential-integer-based tree-structured data according to another embodiment of the present invention.

FIG. 8 is a flowchart of depth-first-based node-definition processing according to one embodiment of the present invention.

FIG. 15A shows an example of a vertex node list, and FIG. 15B illustrates an example of a partial tree group identified by the vertex node list.

FIG. 16A shows an example of a vertex node list obtained by search processing, and FIG. 16B shows an example of a partial tree group identified by the vertex node list.

FIGS. 19A and 19C illustrate examples of vertex node lists to be subjected to a logical conjunction operation, and FIGS. 19B and 19D illustrate examples of partial tree groups identified by the vertex node lists shown in FIGS. 19A and 19C, respectively.

FIG. 20A illustrates an example of a vertex node list indicating the result of the logical conjunction operation, and FIG. 20B illustrates a partial tree group identified by the vertex node list.

FIGS. 29A and 29B show the specific example of processing from the aggregation processing to the processing for conversion into the C-P array.

FIGS. 30A and 30B show the specific example of processing from the aggregation processing to the processing for conversion into the C-P array.

FIGS. 31A and 31B show the specific example of processing from the aggregation processing to the processing for conversion into the C-P array.

FIGS. 32A and 32B show the specific example of processing from the aggregation processing to the processing for conversion into the C-P array.

FIGS. 55A and 55B show the specific example of the topology-search processing using the ascending-order format according to the present embodiment.

FIG. 56 shows an ascending ordered aggregation array representing the tree shown in FIG. 40A and an example of the vertex node list.

Figure 1:
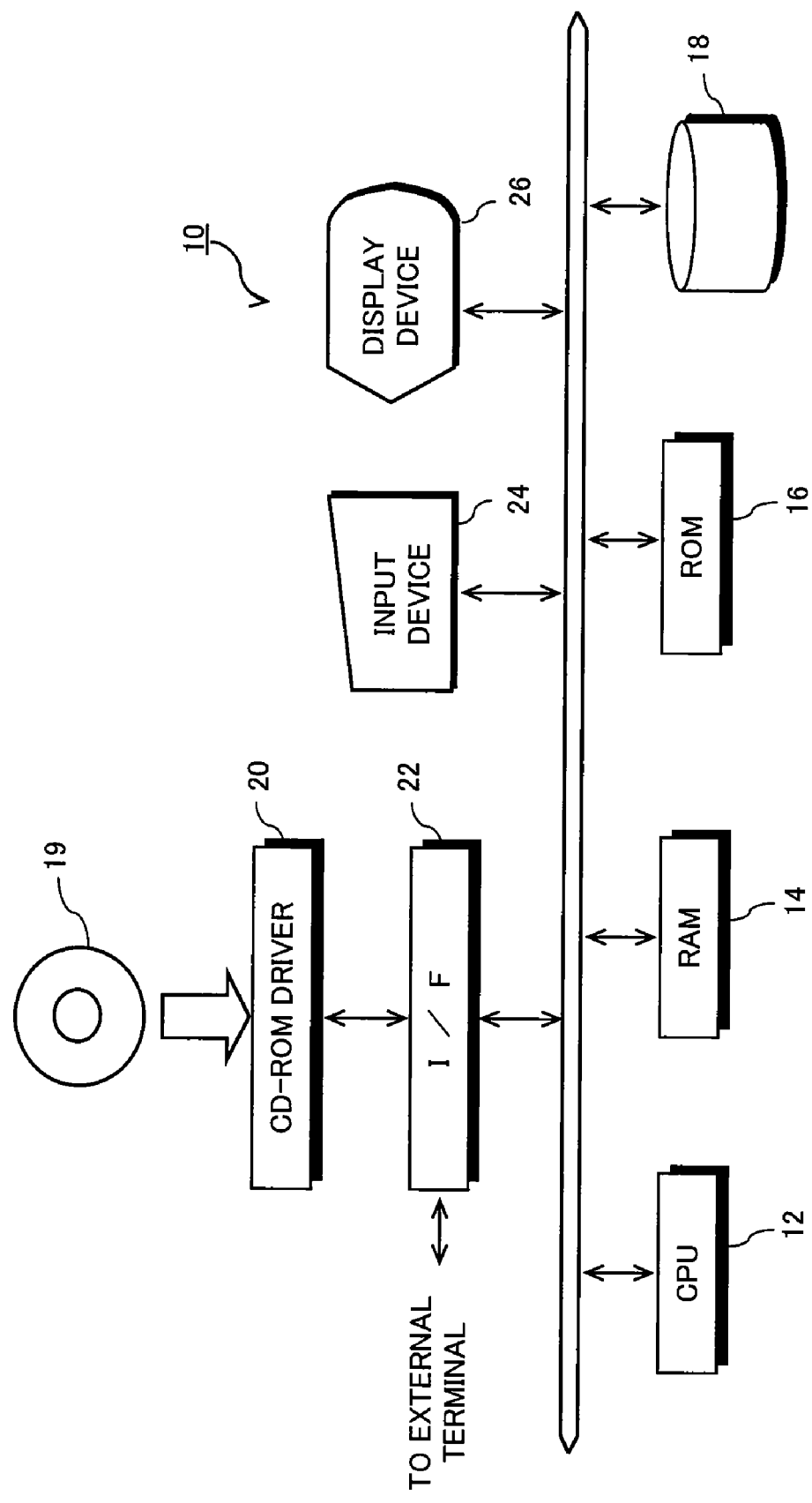
FIG. 1 is a block diagram of a computer system that handles a tree data structure according to an embodiment of the present invention.
Figures 3A, 3B, 3C:
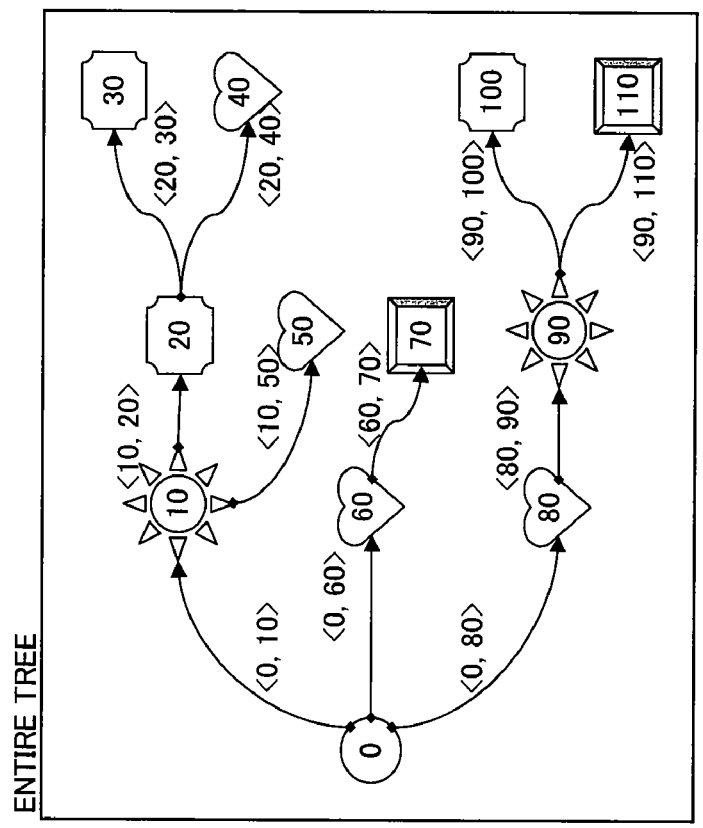
FIGS. 3A to 3C illustrate an example of representation formats of a tree data structure using an arc list.
Figures 4A, 4B, 4C:
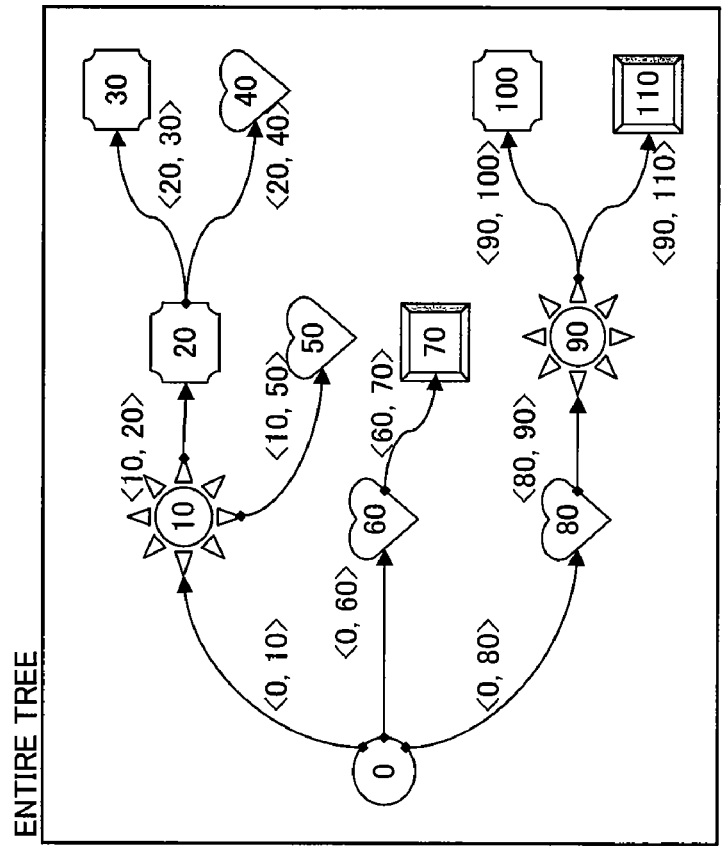
FIGS. 4A to 4C illustrate a method for representing a tree data structure based on a "child→parent" relationship according to one embodiment of the present invention.
Figure 5:
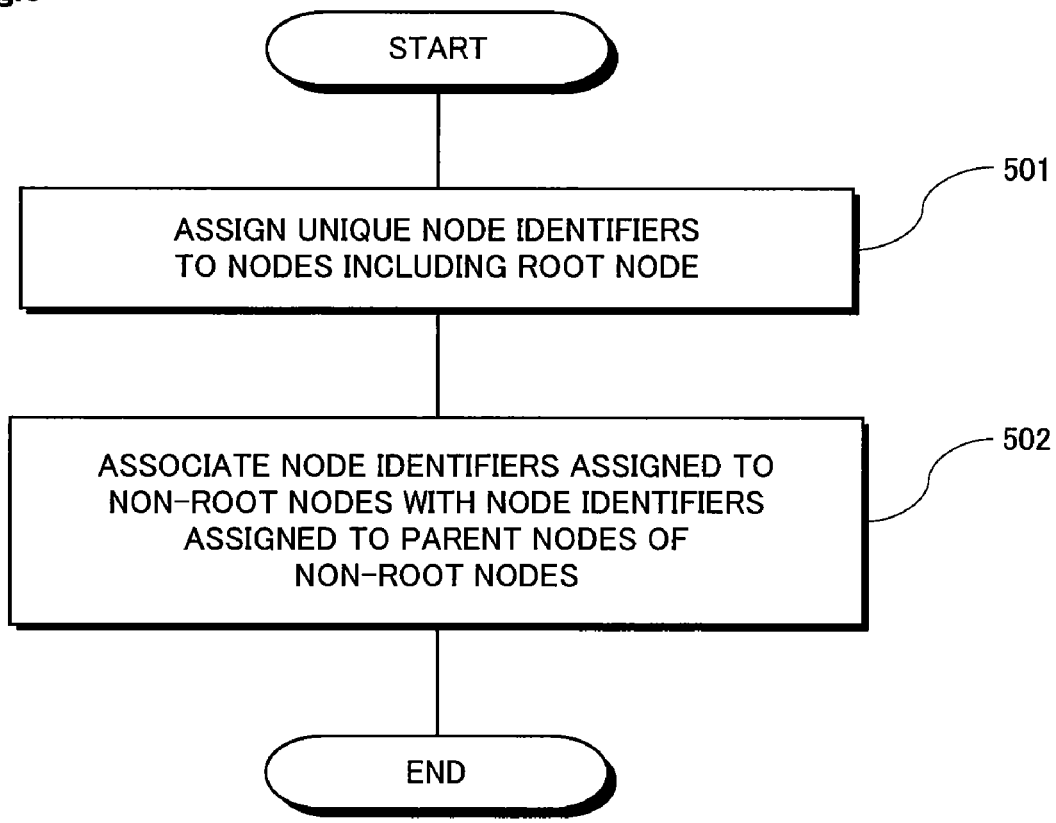
FIG. 5 is a flowchart of a method for constructing the tree data structure according to one embodiment of the present invention on a storage device.
Figure 9:
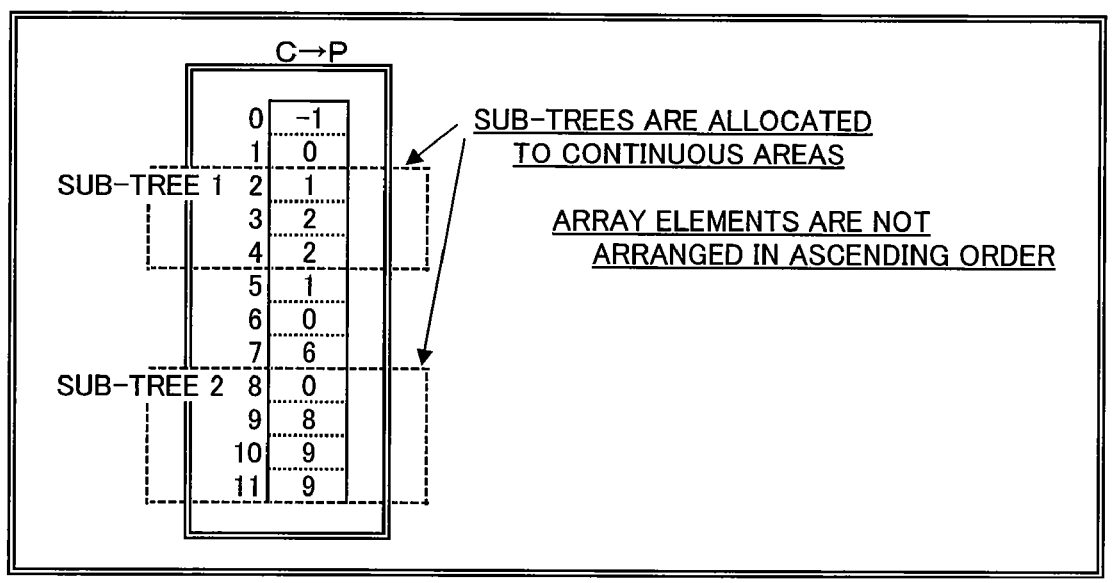
FIG. 9 illustrates a parent-child-relationship array based on "child→parent" representation and created according to one embodiment of the present invention.
Figure 10:
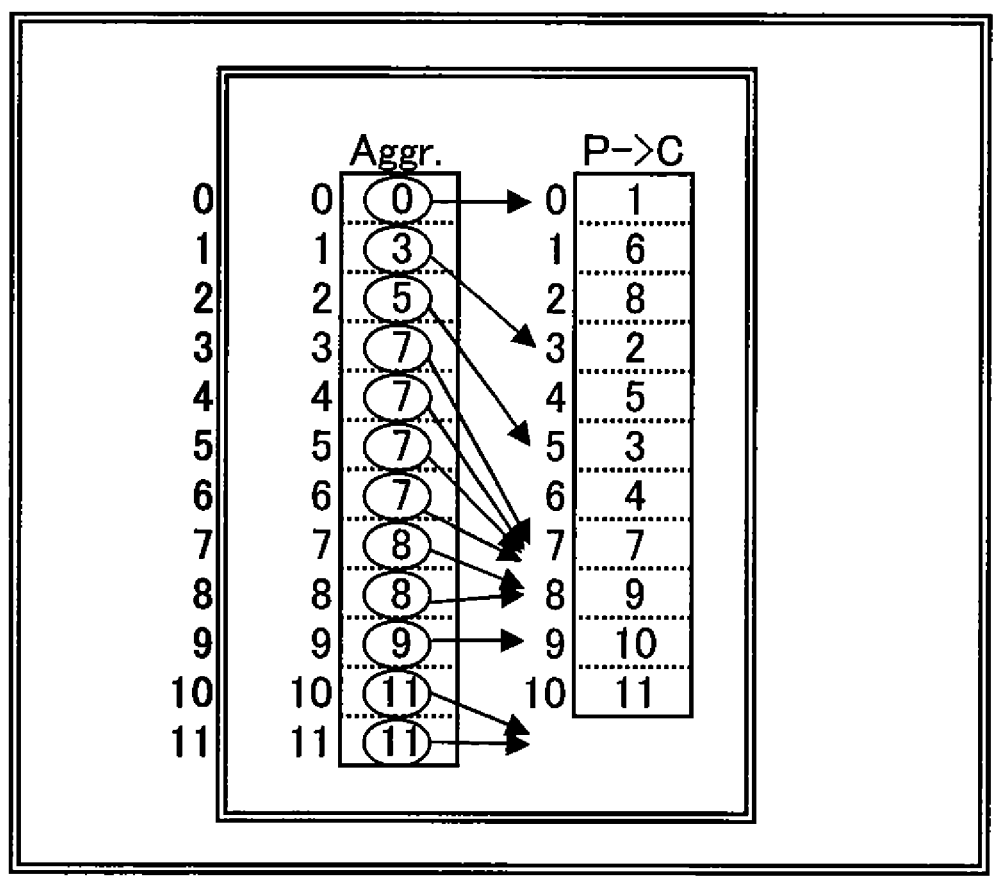
FIG. 10 illustrates a parent-child-relationship array based on "parent→child" representation and created from a depth-first tree data structure shown in FIG. 6C.
Figure 11:
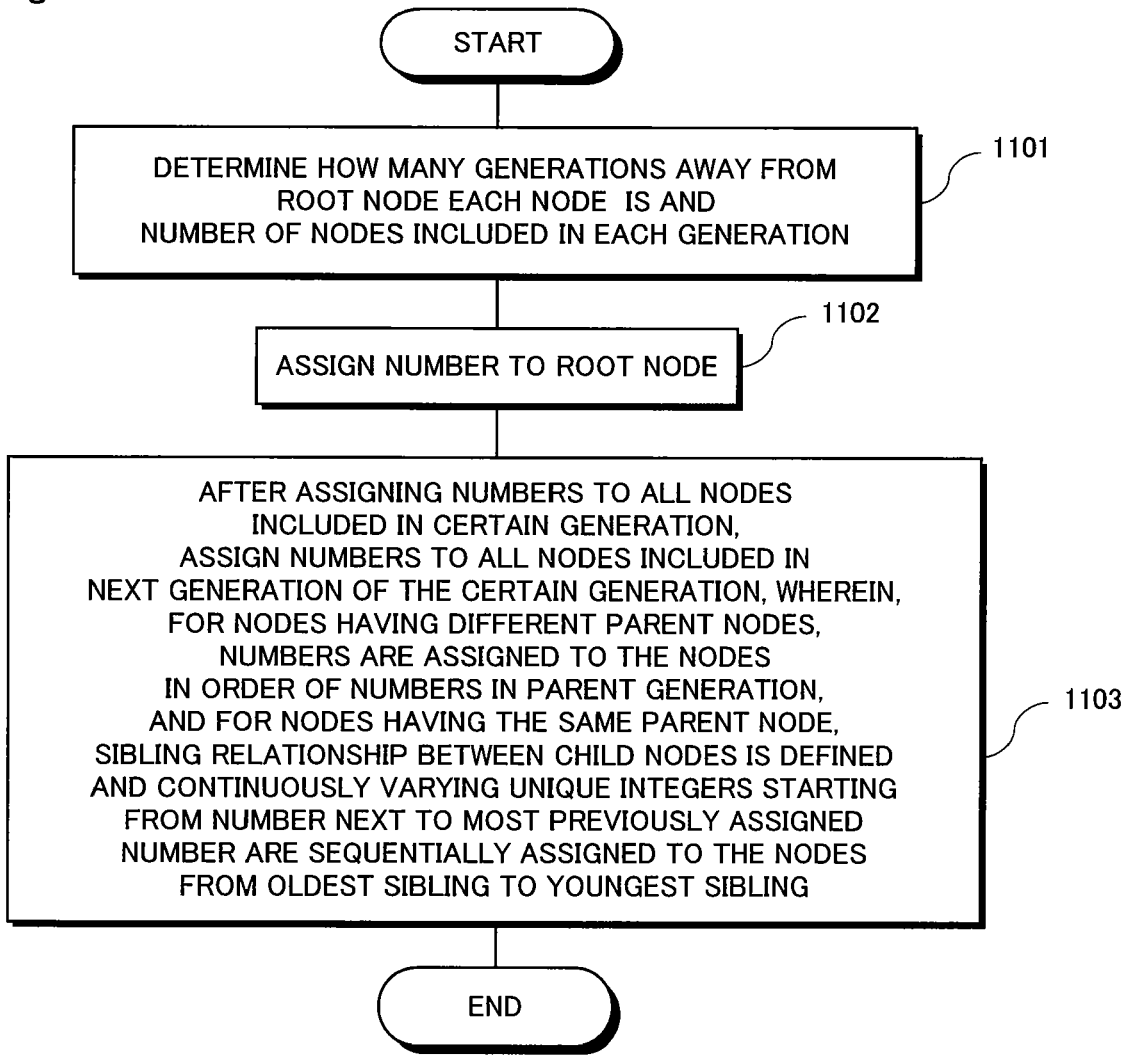
FIG. 11 is a flowchart of width-first-based node-definition processing according to one embodiment of the present invention.
Figure 12:
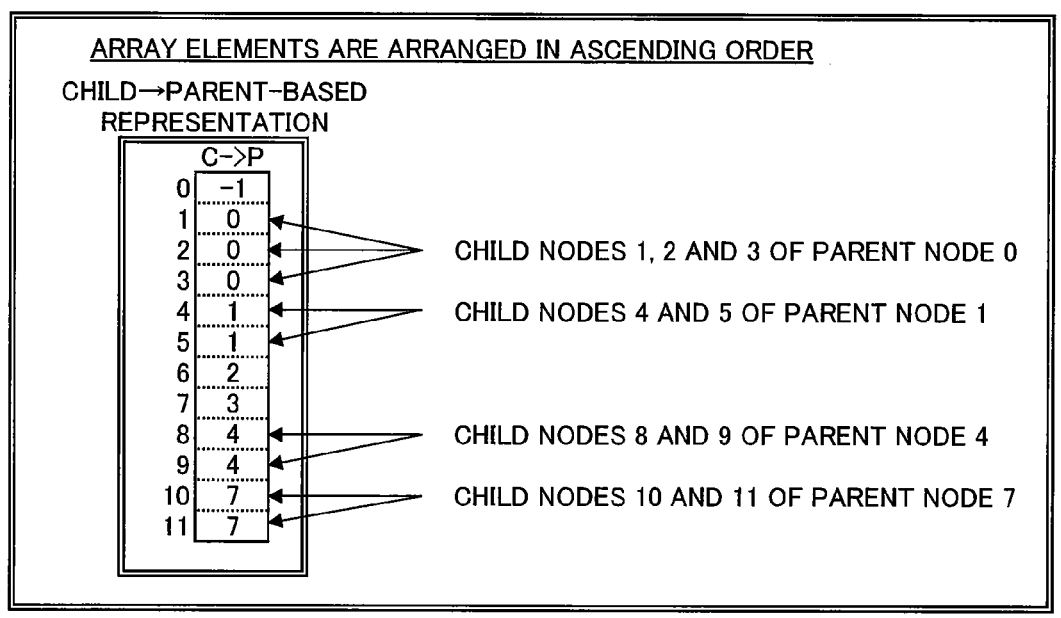
FIG. 12 illustrates a parent-child-relationship array based on "child→parent" representation and created according to one embodiment of the present invention.
Figure 13:
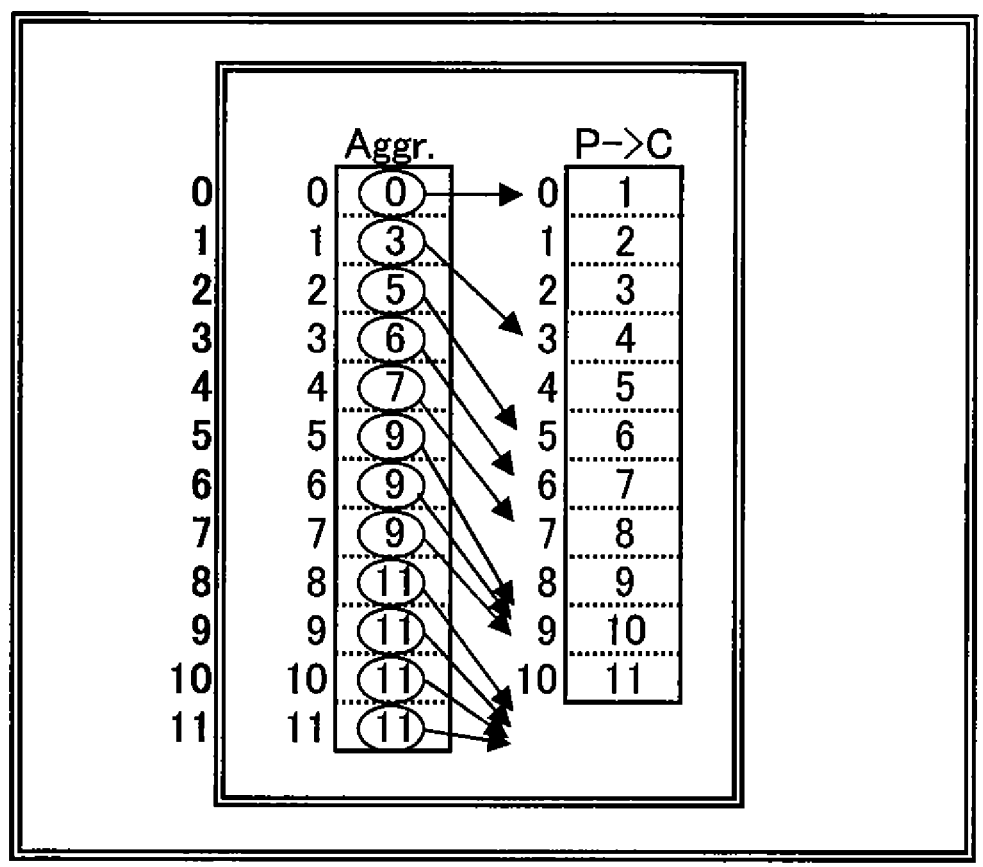
FIG. 13 illustrates a parent-child-relationship array based on "parent→child" representation and created from a width-first tree data structure shown in FIG. 7C.
Figures 14A, 14B:
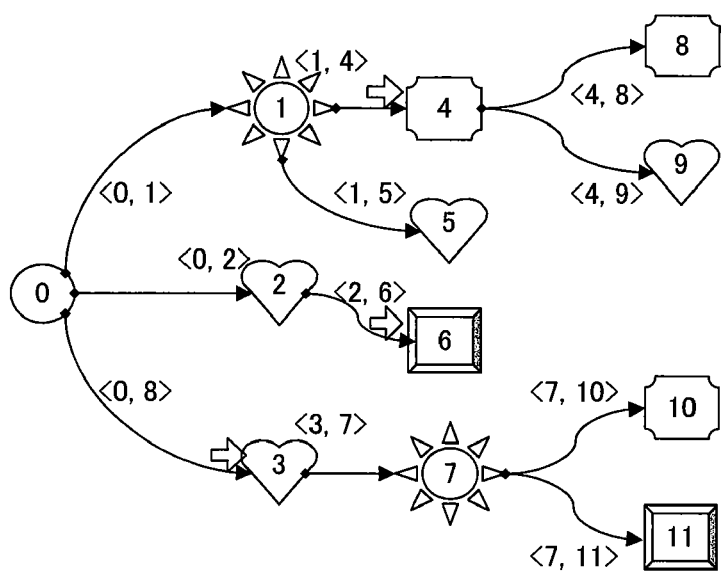
FIG. 14A shows a tree data structure based on the width-first mode.
FIG. 14B shows the tree data structure as a parent-child-relationship array based on "child→parent" representation.
Figures 17A, 17B:
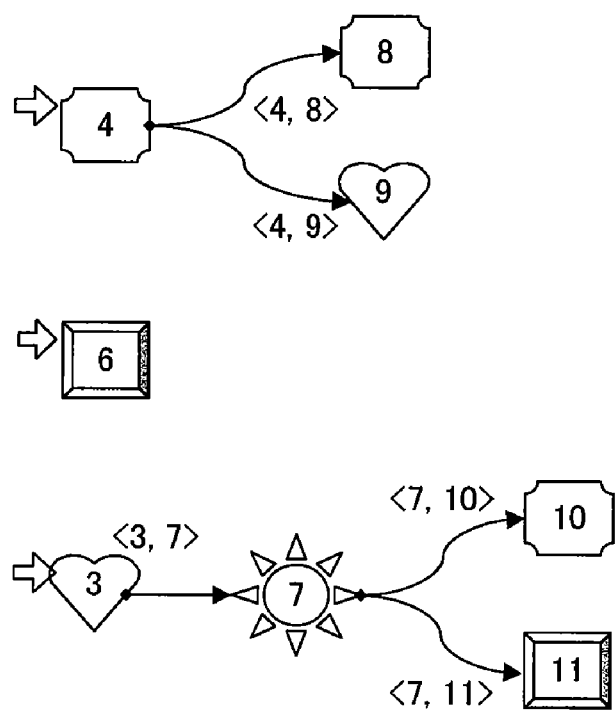
FIG. 17A shows an example of an array indicating a vertex node list and an aggregation result which are obtained by aggregation processing.
FIG. 17B shows an example of a partial tree group identified by the vertex node list.
Figures 18A, 18B:
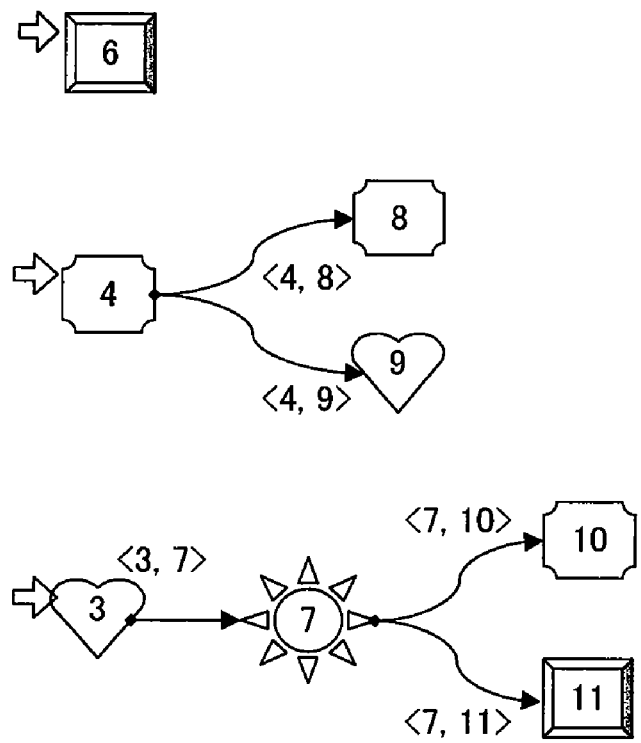
FIG. 18A illustrates an example of a vertex node listed sorted by the number of nodes and an array indicating the corresponding numbers of nodes.
FIG. 18B illustrates an example of partial trees identified by the vertex node list.
Figure 21:
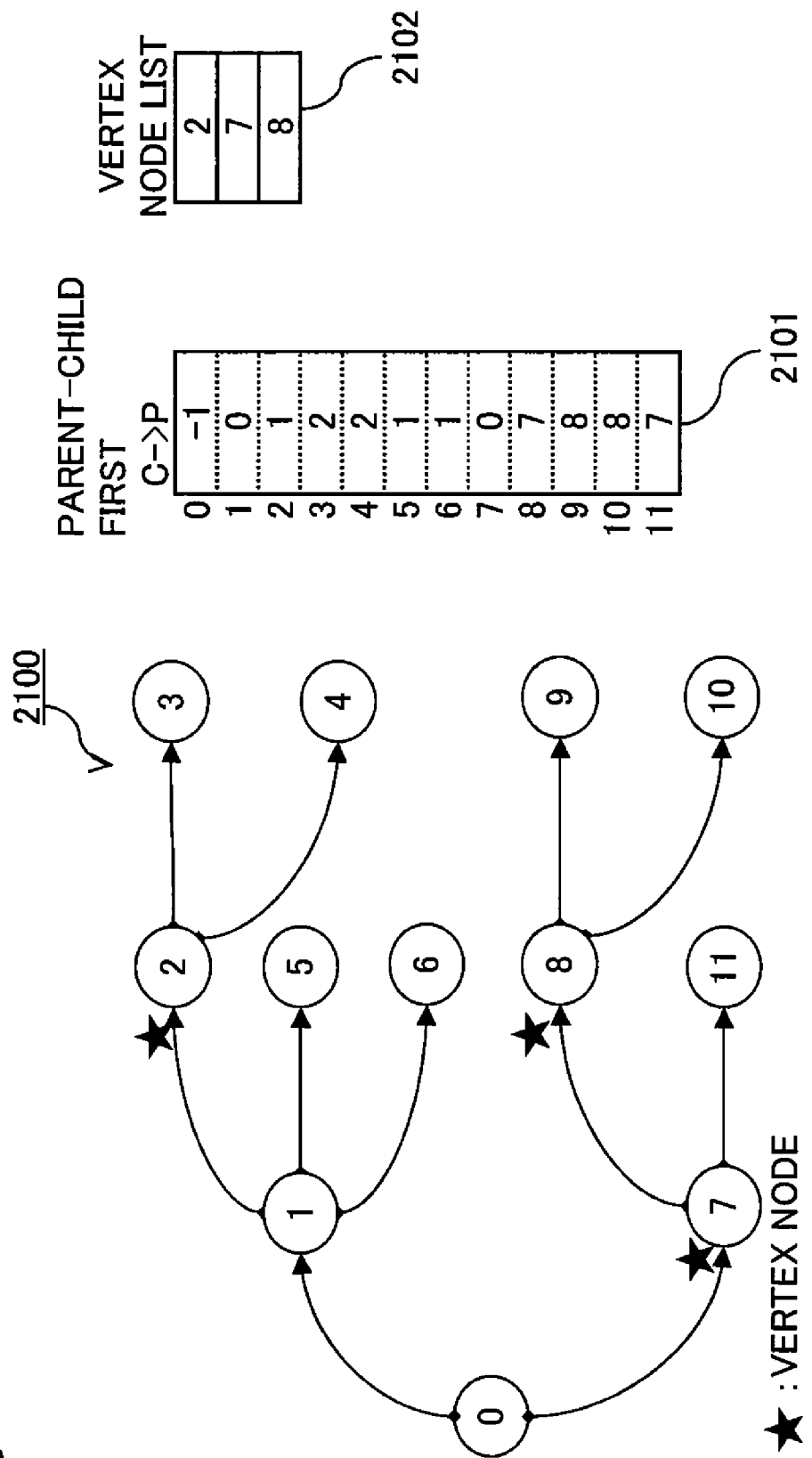
FIG. 21 shows an example of a C-P array representing nodes and a vertex node list specifying a partial-tree group.
Figure 22:
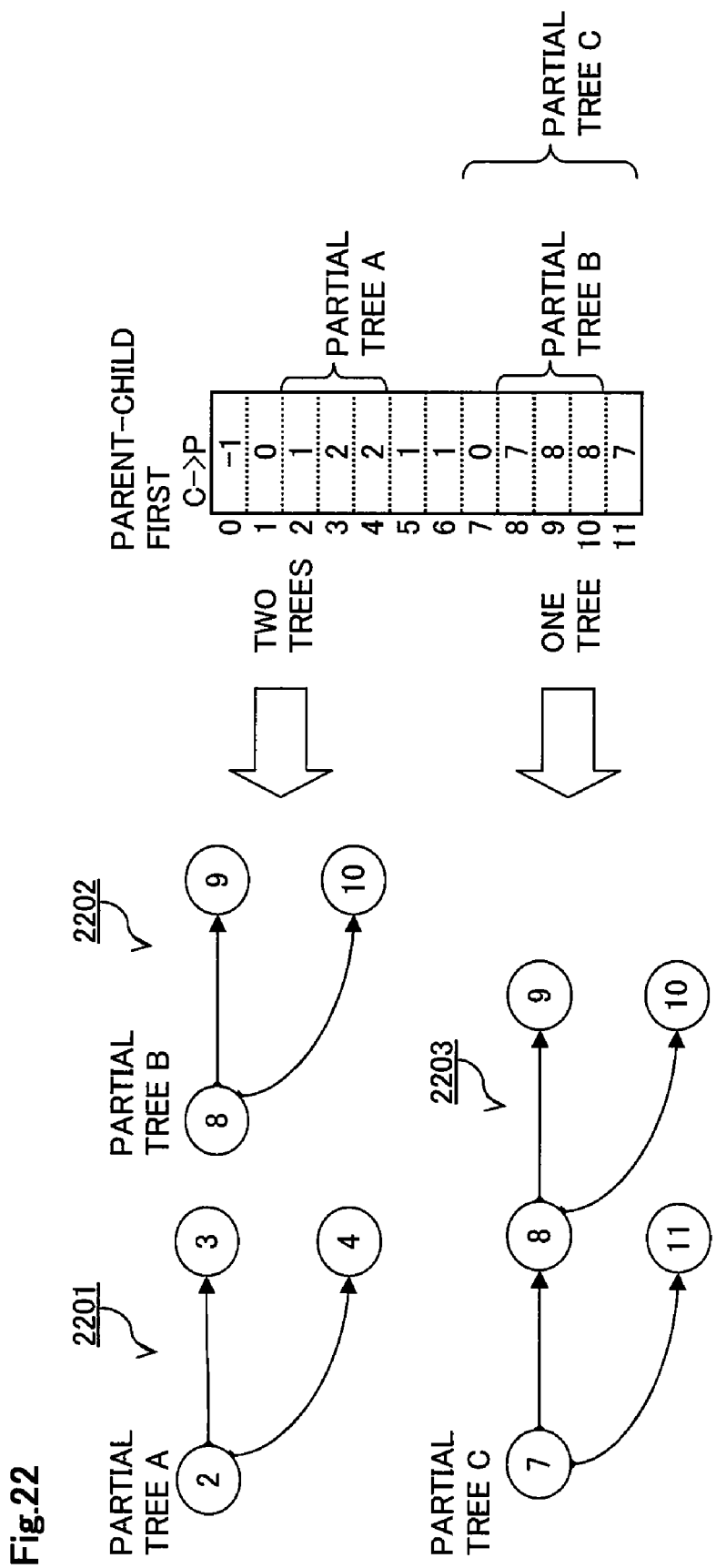
FIG. 22 shows partial trees specified by the respective vertex nodes in the vertex node list shown in FIG. 21.
Figure 23B:
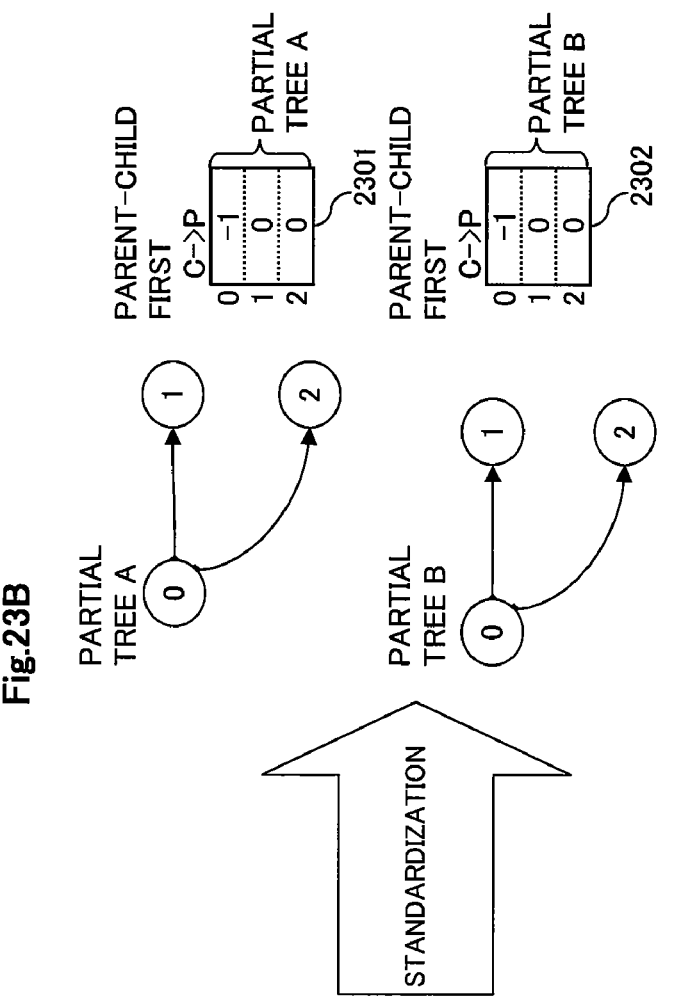
FIGS. 23A and 23B illustrate an overview of partial-tree standardization according to the present embodiment.
Figure 23A:
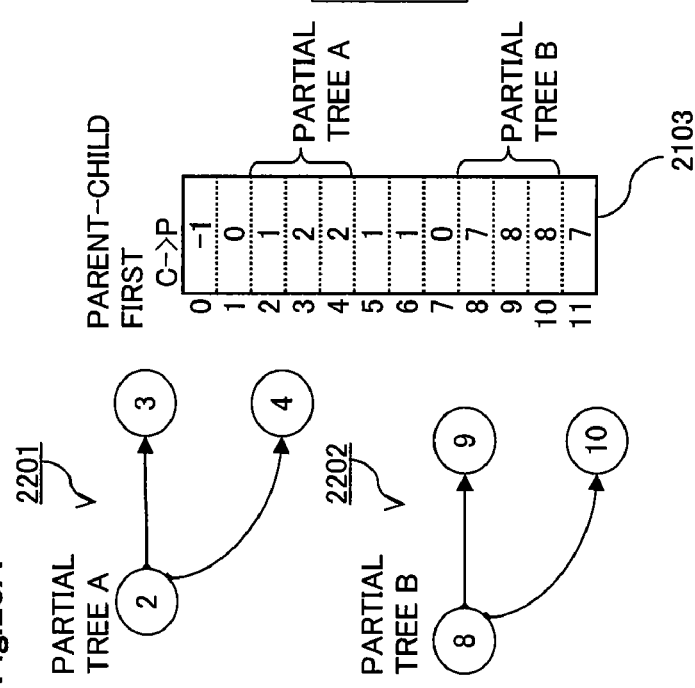
Figure 24:
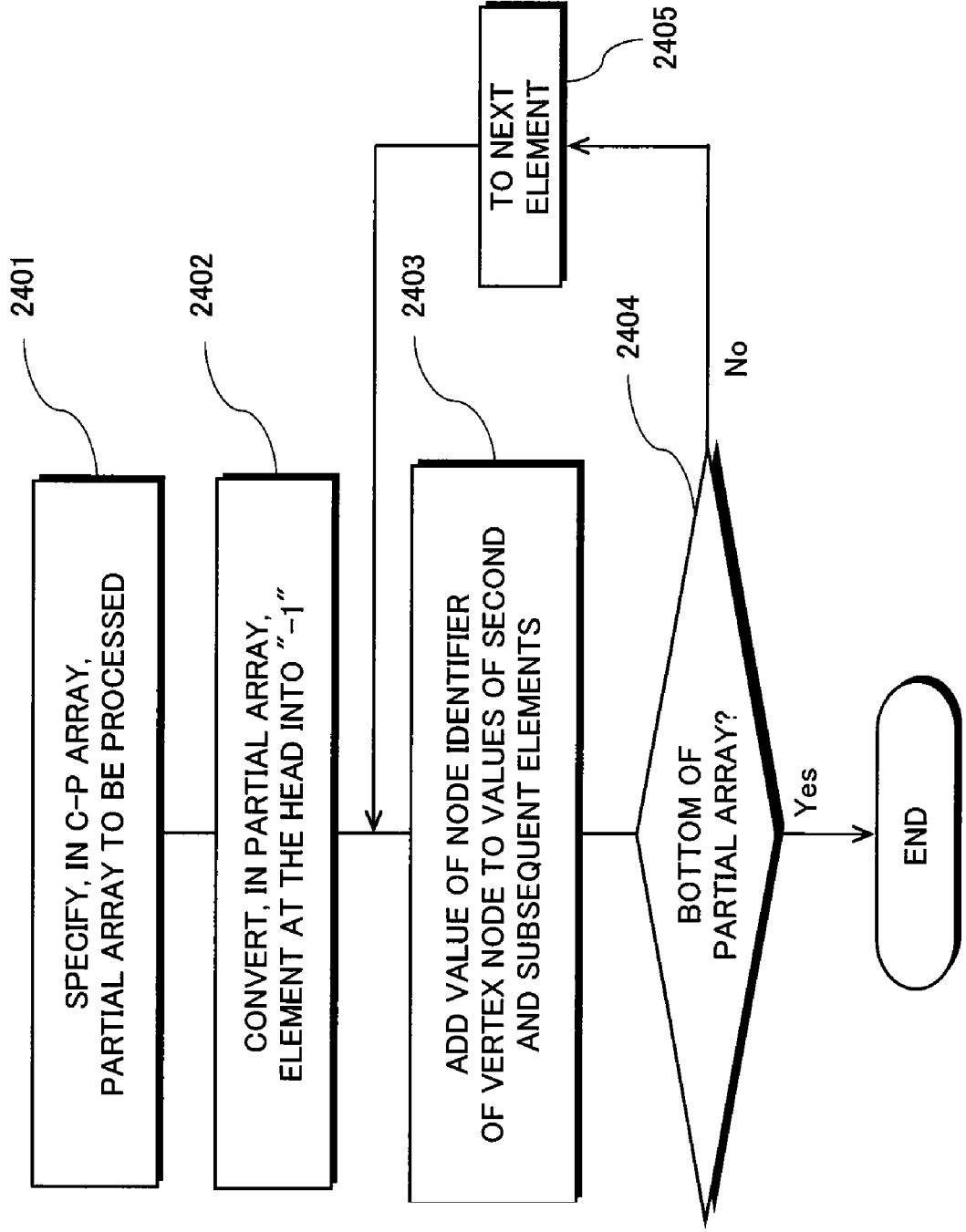
FIG. 24 is a flowchart showing an example of the partial-tree standardization according to the present embodiment.
Figure 25:
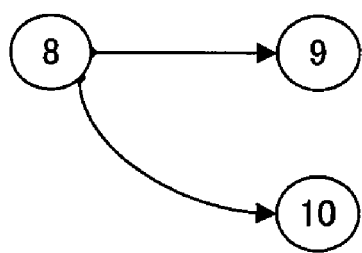
FIG. 25 shows an example of a standardized partial array representing a partial tree.
Figure 26:
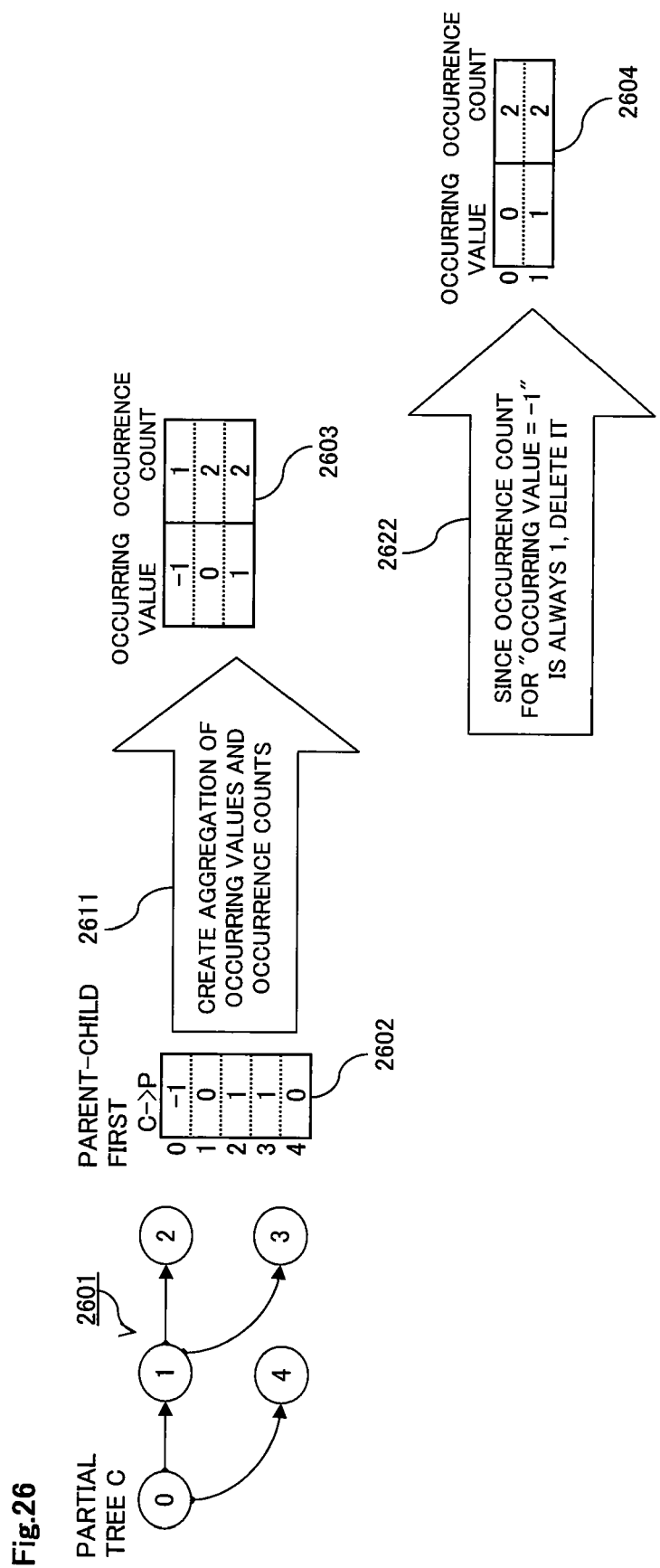
FIG. 26 illustrates an example of an ascending ordered array according to the present embodiment.
Figure 27:
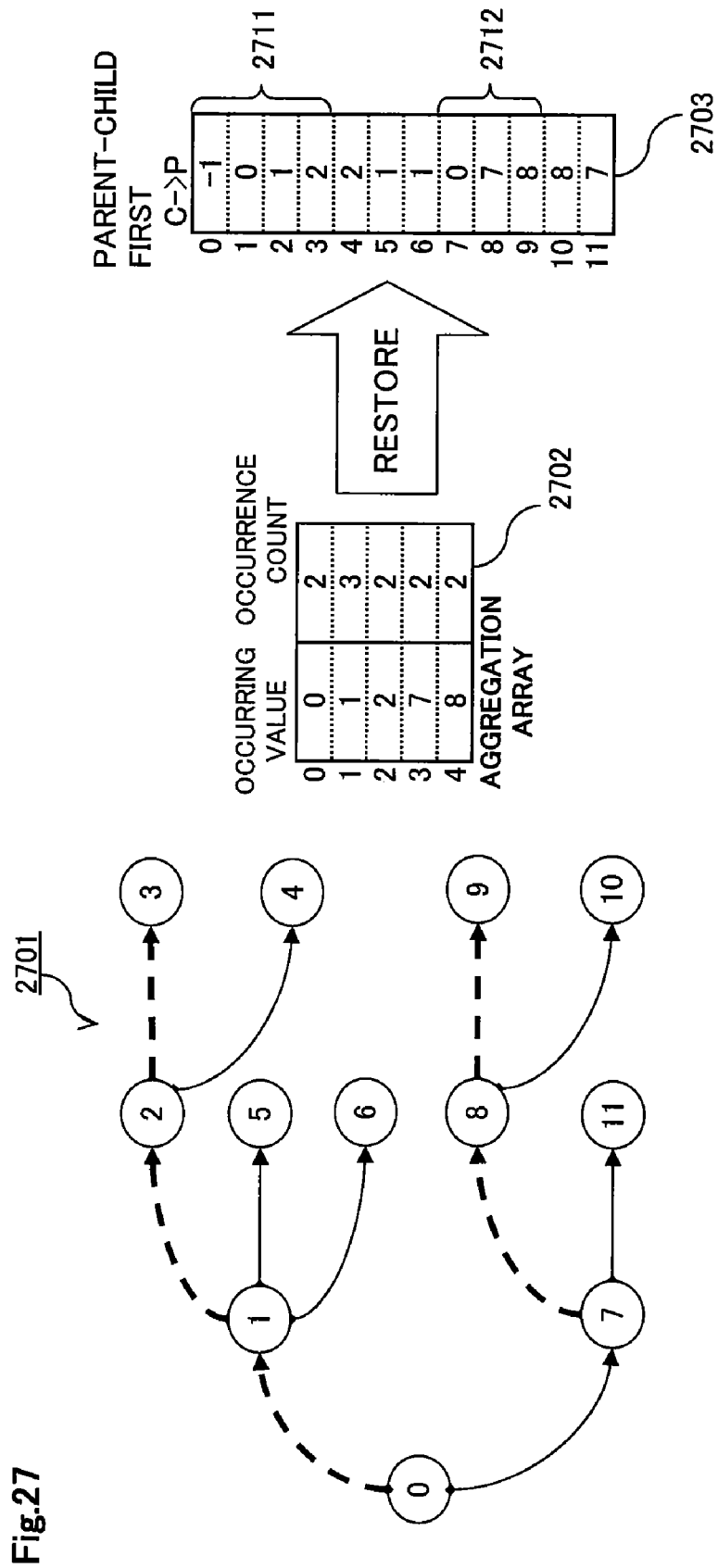
FIG. 27 illustrates an overview of inter-conversion between an ascending ordered aggregation array and a C-P array.
Figure 28:
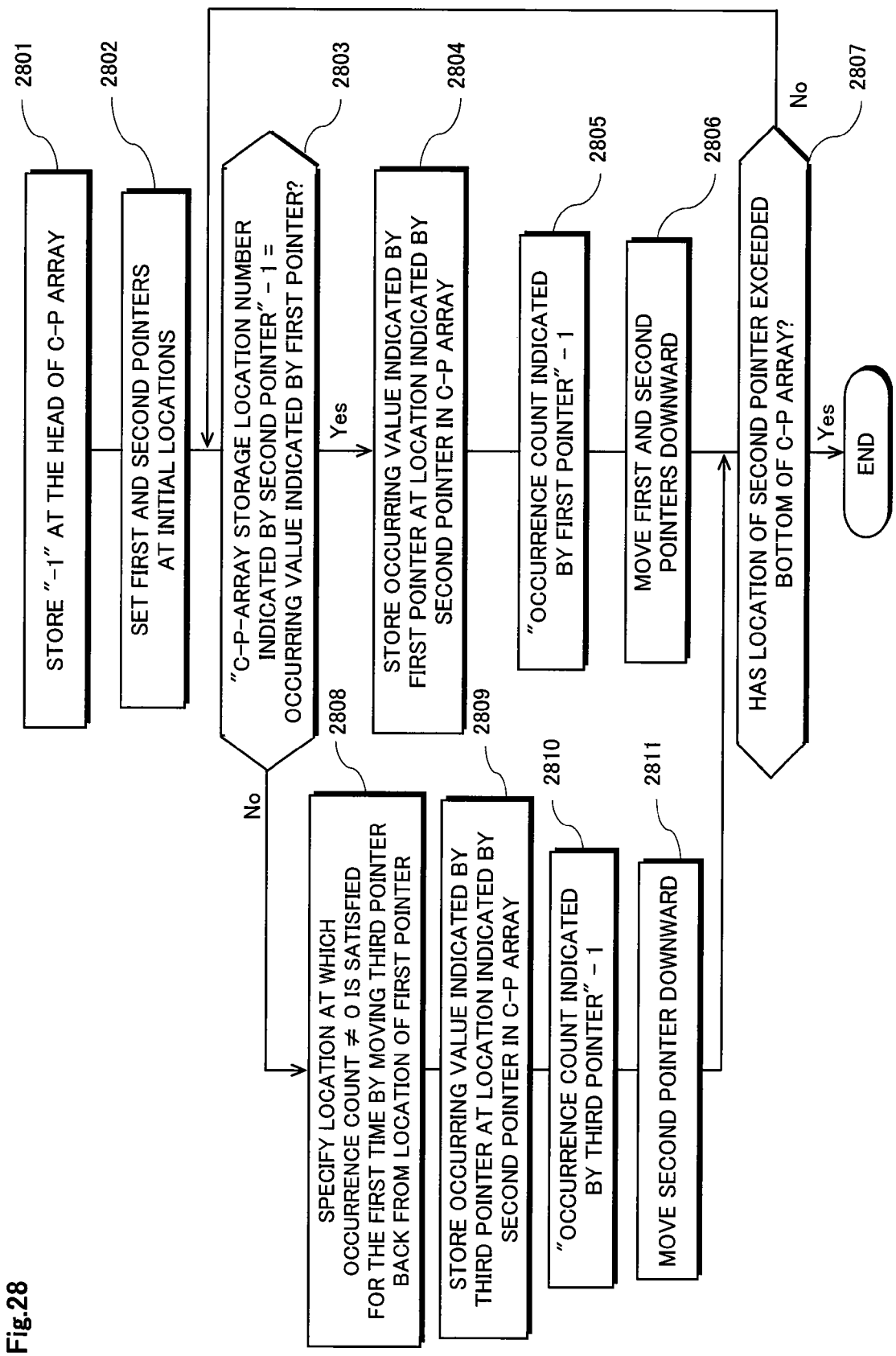
FIG. 28 is a flowchart showing an example of conversion from the aggregation array into the C-P array according to the present embodiment.
Figure 33A:
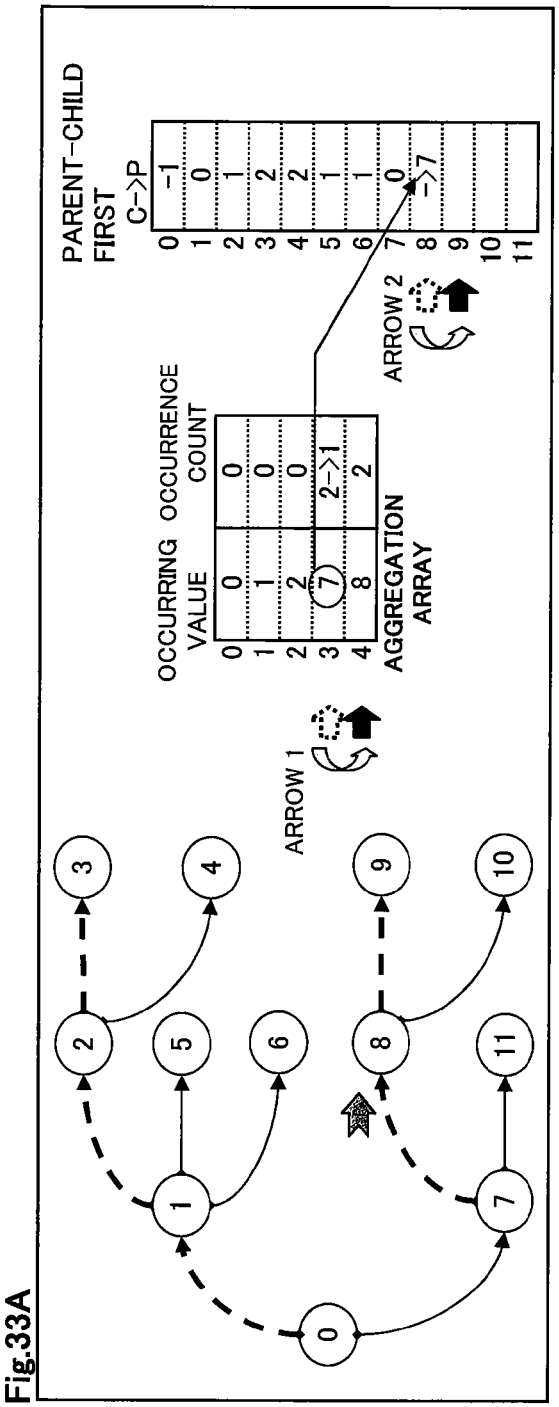
FIGS. 33A and 33B show the specific example of processing from the aggregation processing to the processing for conversion into the C-P array.
Figure 33B:
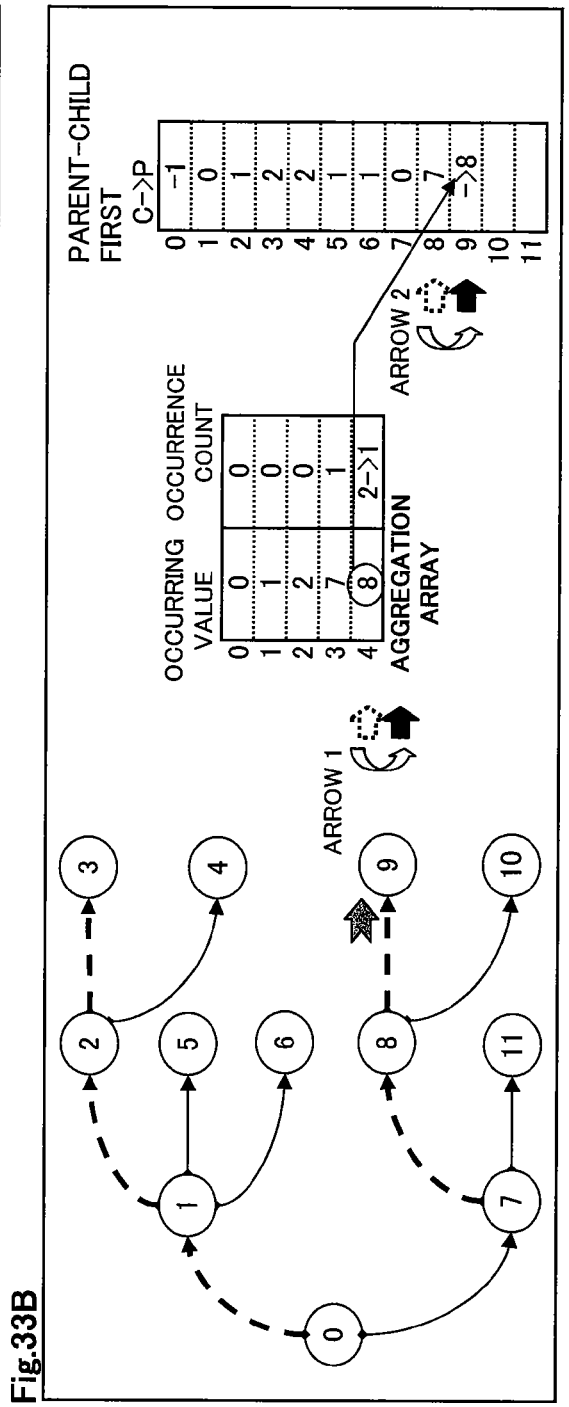
Figure 34A:
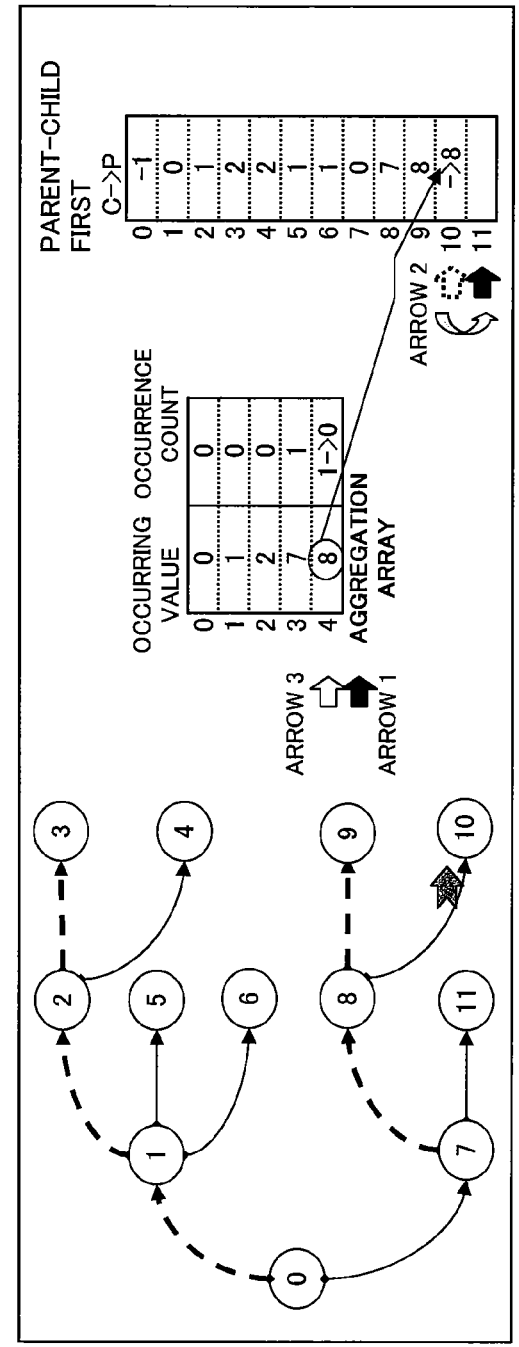
FIGS. 34A and 34B show the specific example of processing from the aggregation processing to the processing for conversion into the C-P array.
Figure 34B:
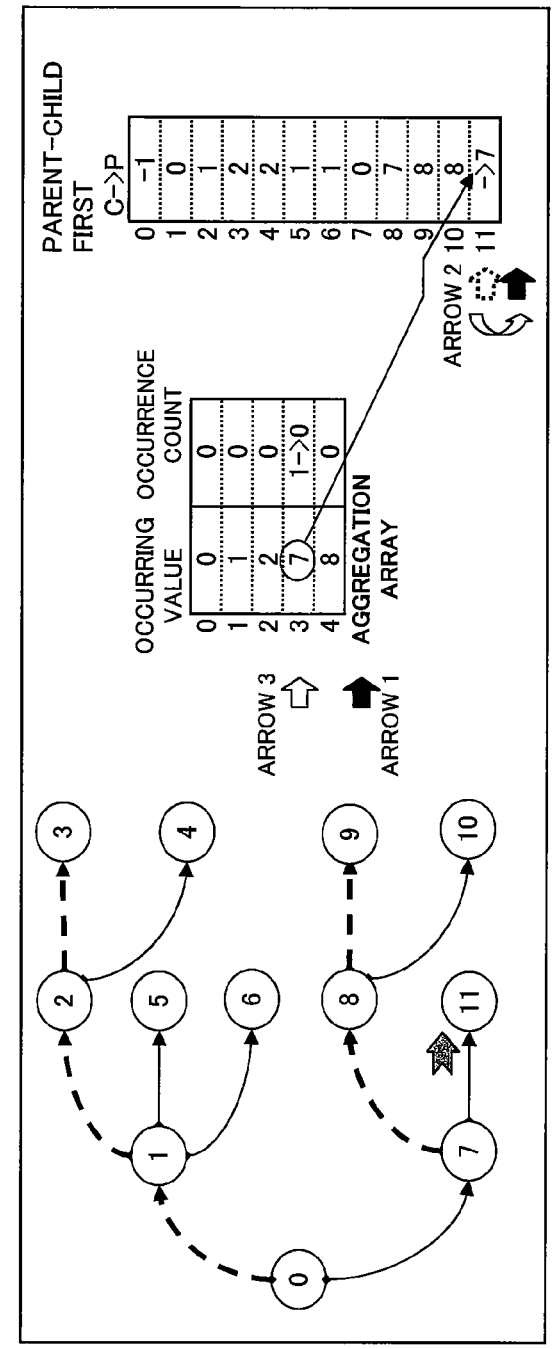
Figure 35B:
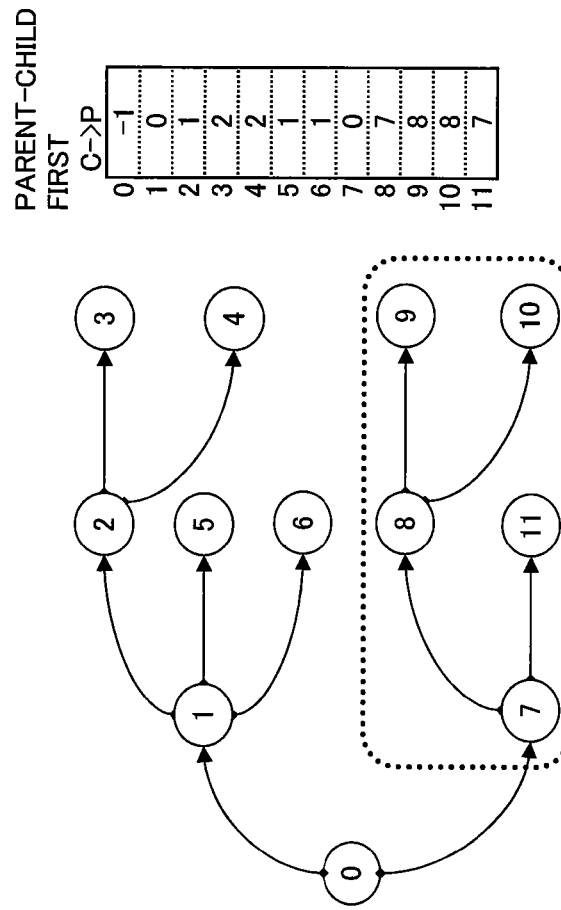
FIGS. 35A and 35B illustrate an overview of topology search according to the present embodiment.
Figure 35A:
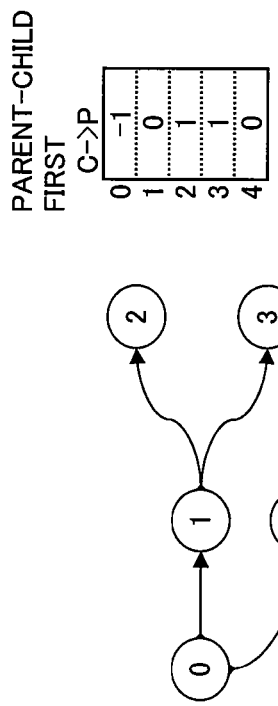
Figure 36:
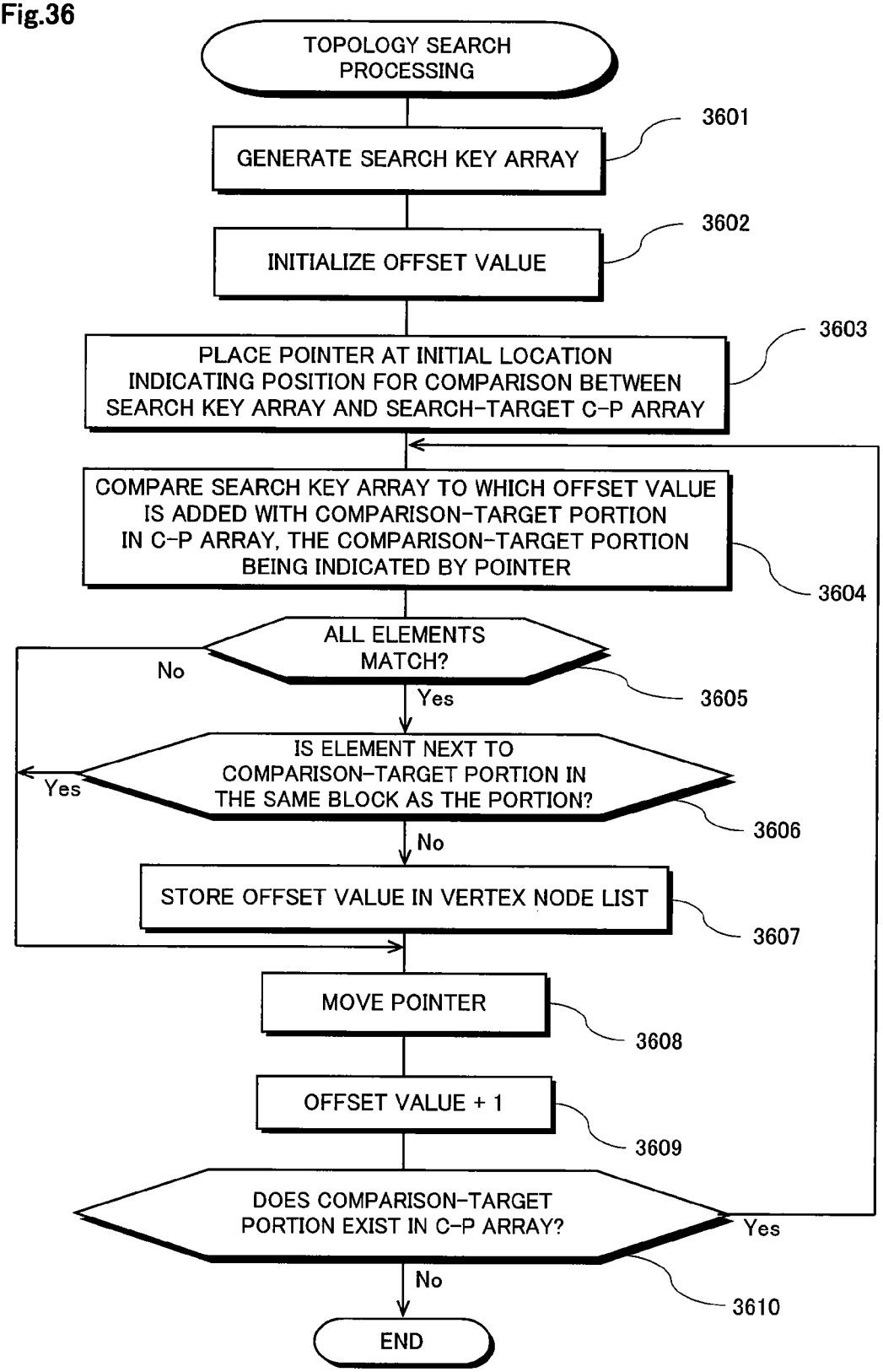
FIG. 36 is a flowchart showing an example of the topology search processing according to the present embodiment.
Figure 37A:
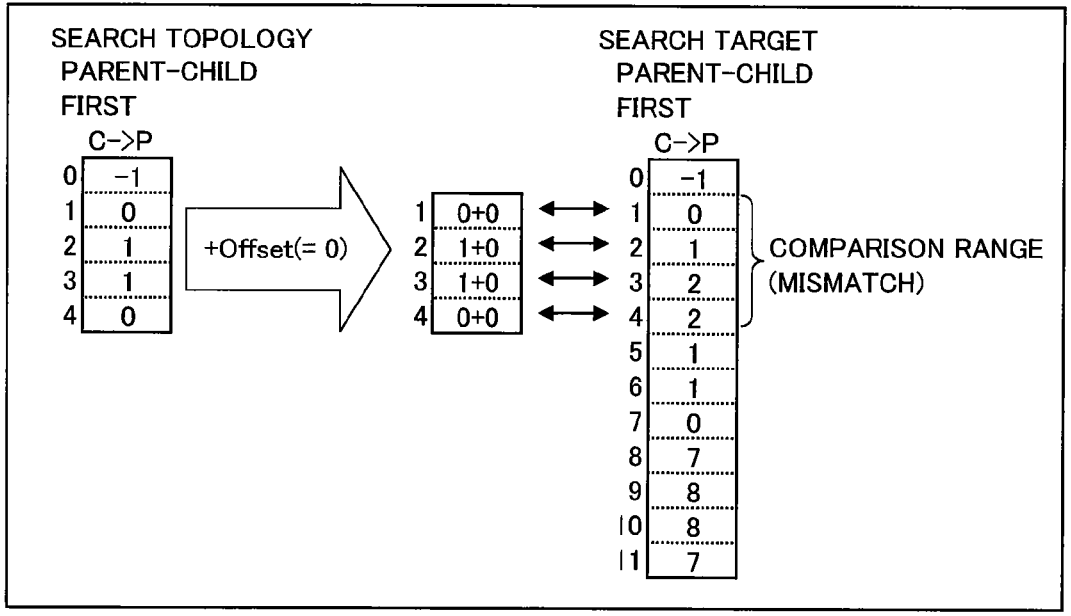
FIGS. 37A and 37B show a specific example of the topology search processing.
Figure 37B:
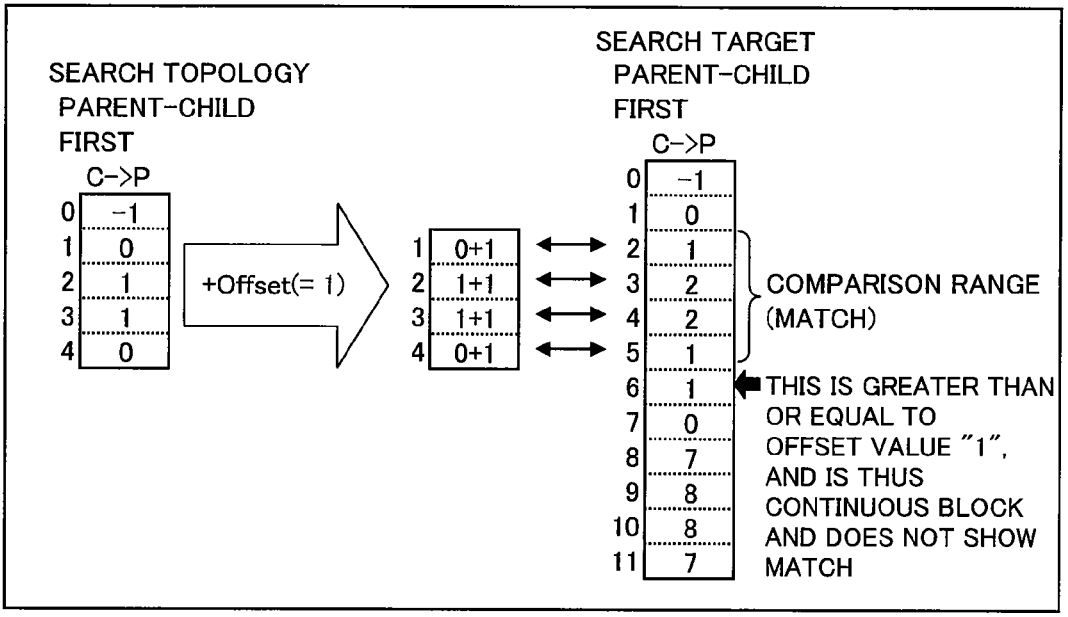
Figure 38A:
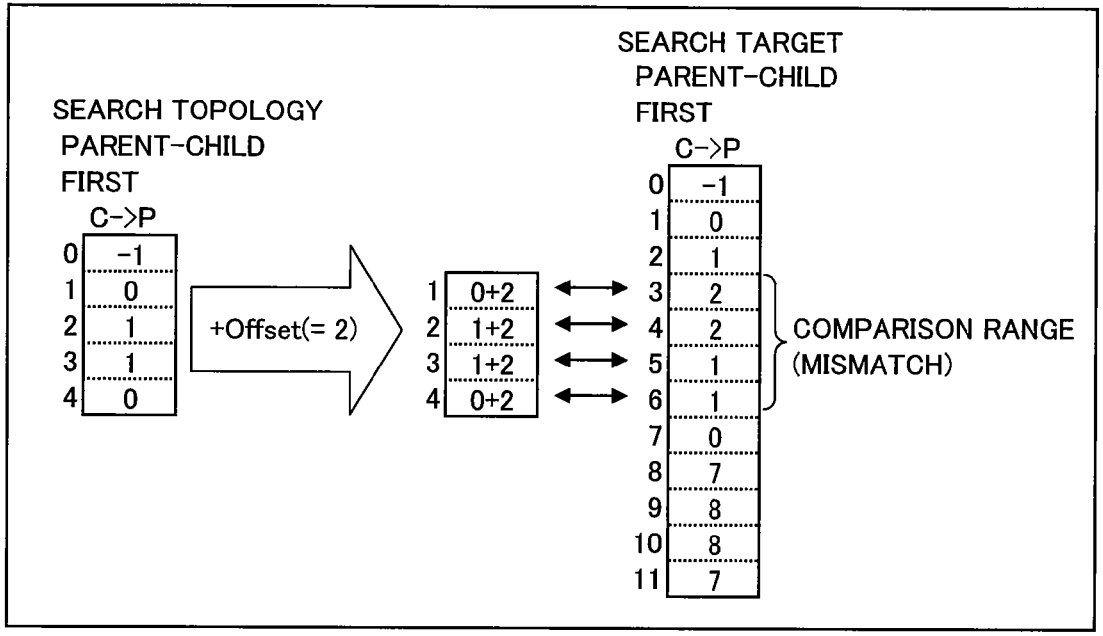
FIGS. 38A and 38B show the specific example of the topology search processing.
Figure 38B:
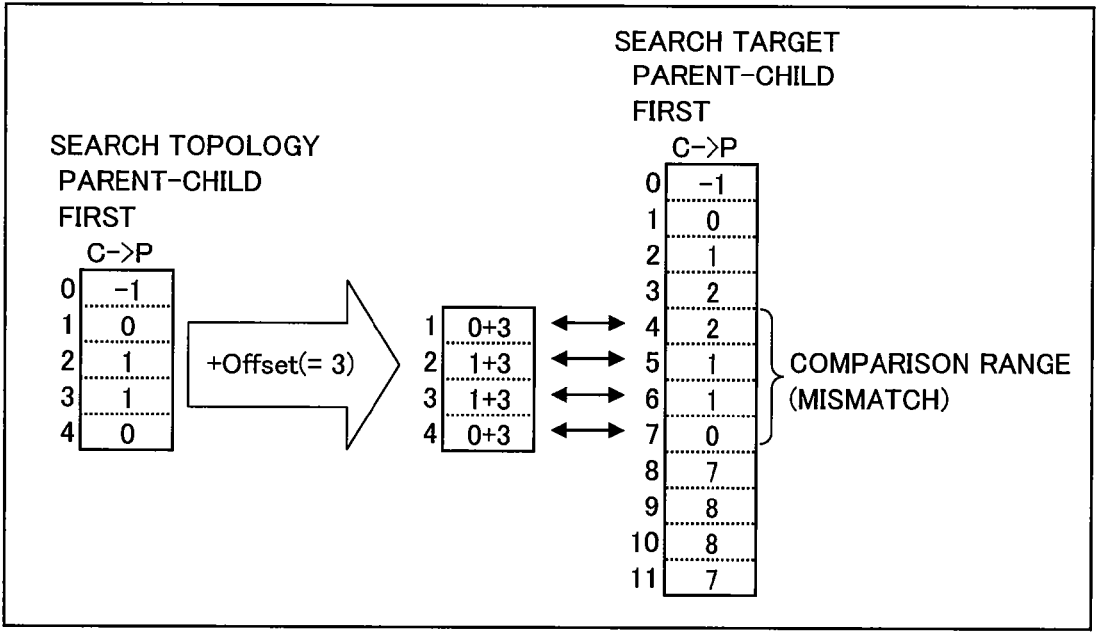
Figure 39:
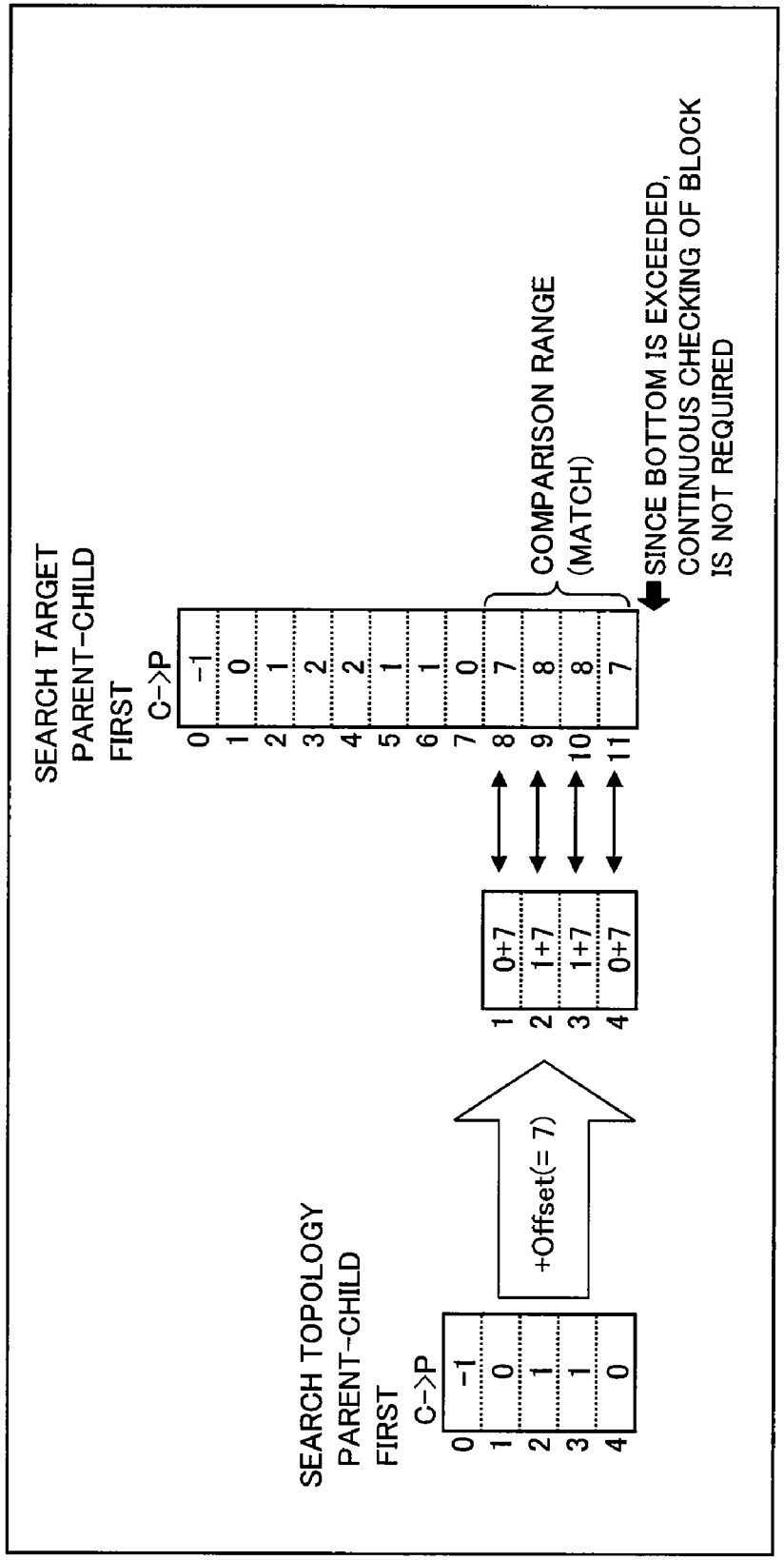
FIG. 39 shows the specific example of the topology search processing.
Figures 40A, 40B:
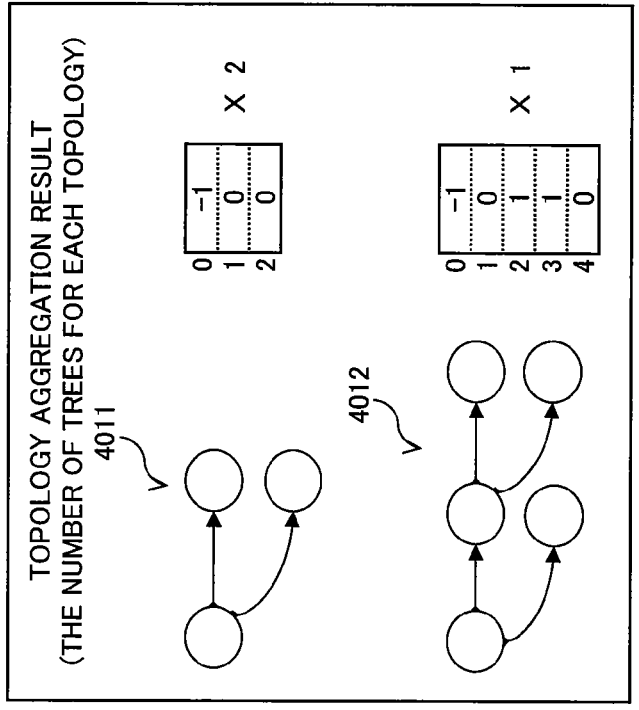
FIGS. 40A and 40B illustrate an overview of first topology aggregation according to the present embodiment.
Figure 41:
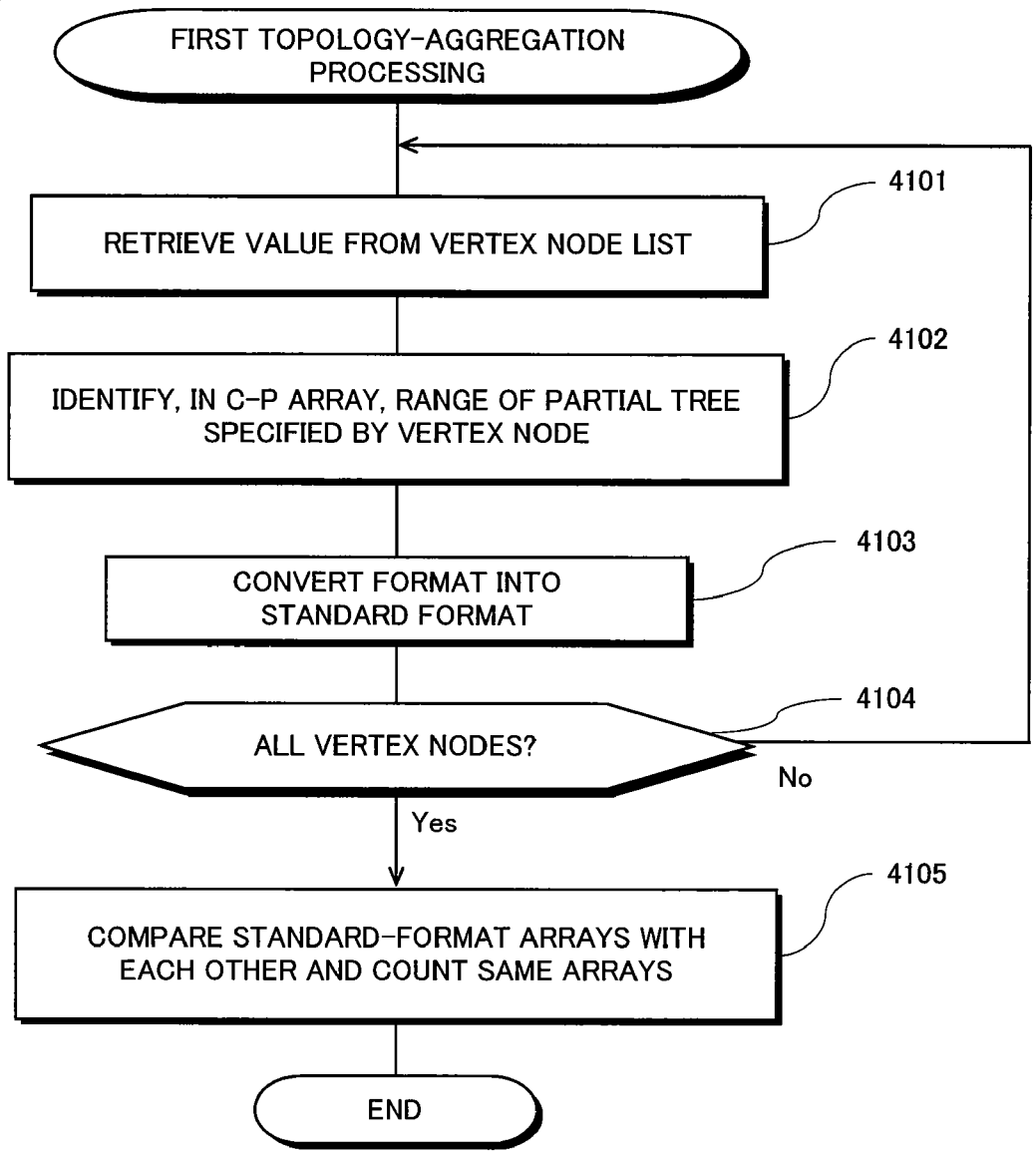
FIG. 41 is a flowchart showing an example of the first aggregation processing according to the present embodiment.
Figure 42:
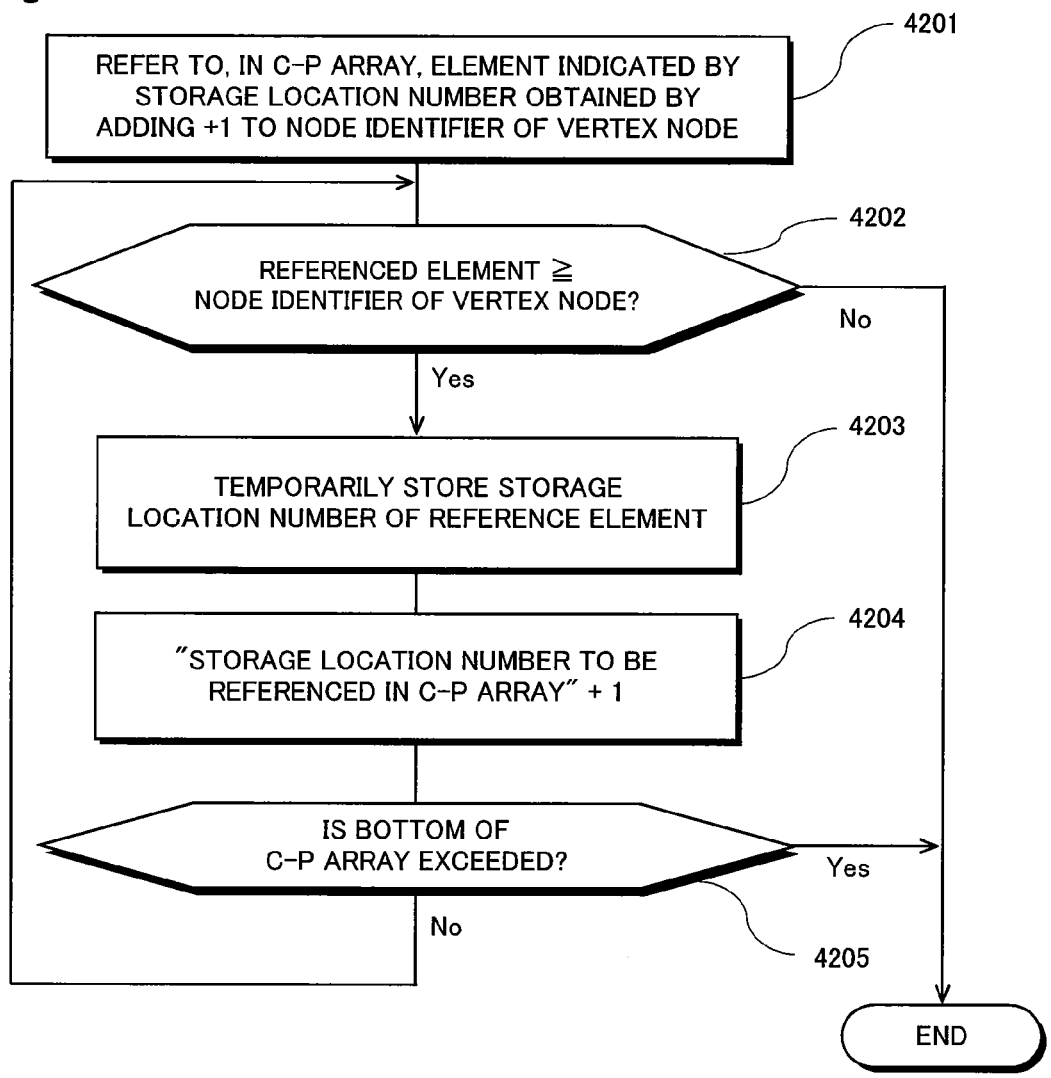
FIG. 42 is a flowchart more specifically showing step 4102 in FIG. 41.
Figure 43A:
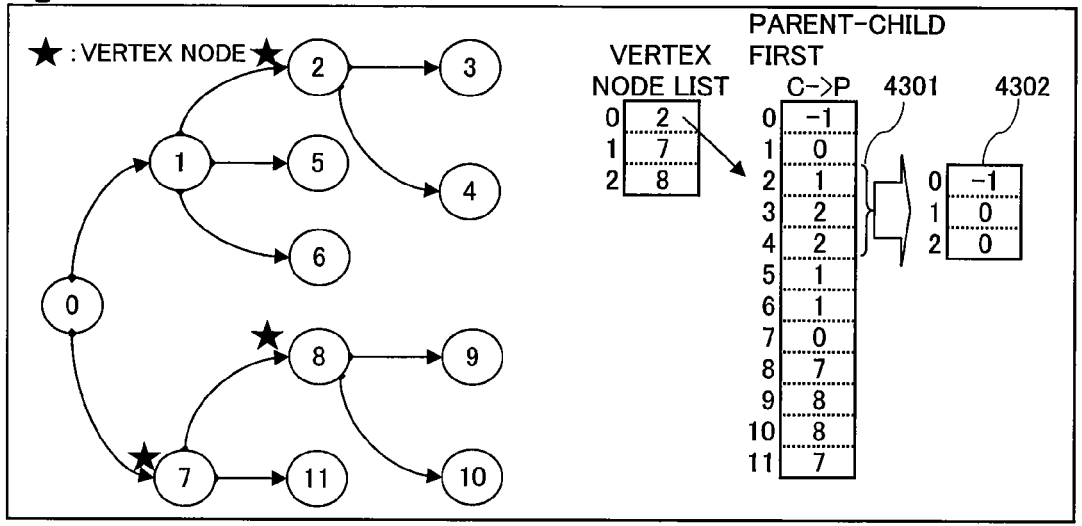
FIGS. 43A to 43C show a specific example of the first topology-aggregation processing.
Figure 43B:
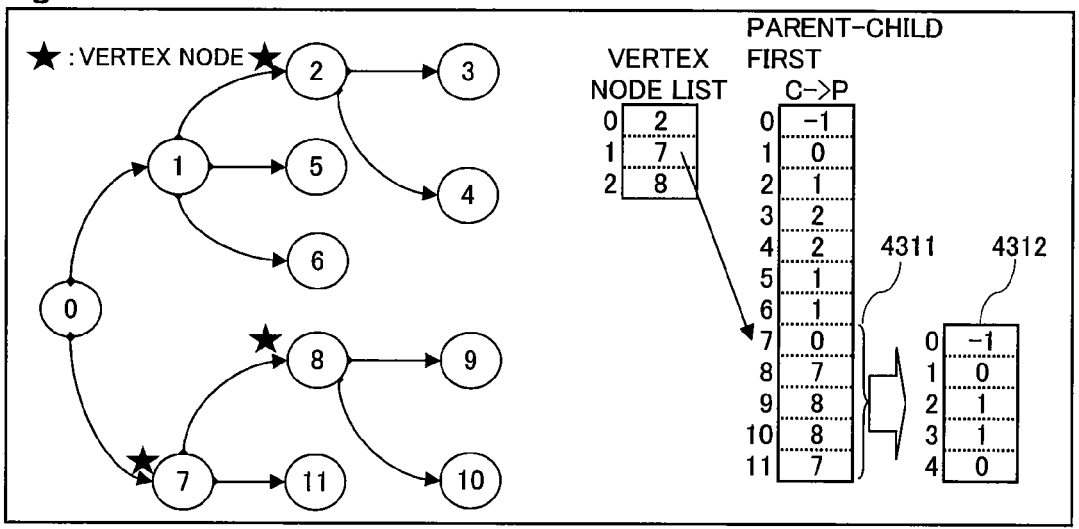
Figure 43C:
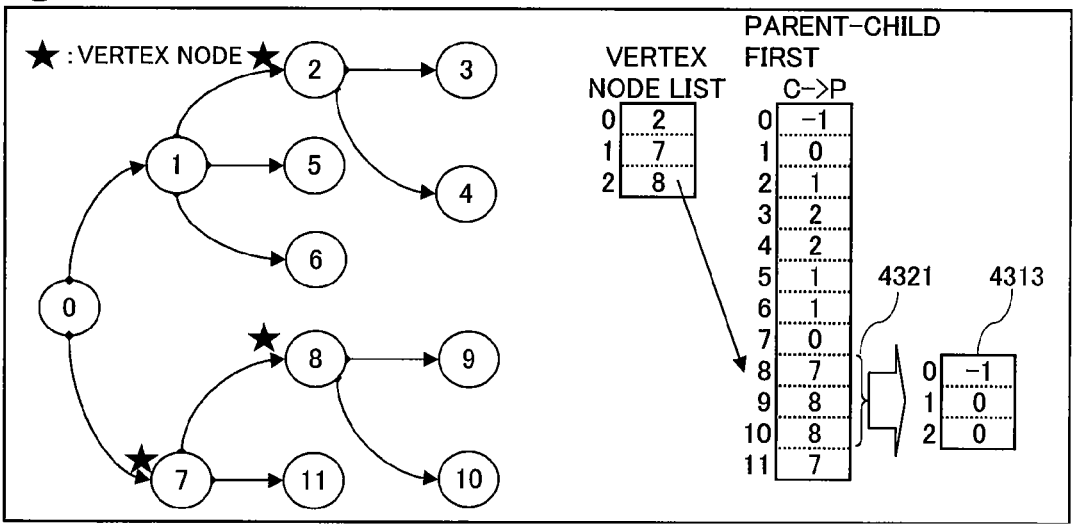
Figure 44A:
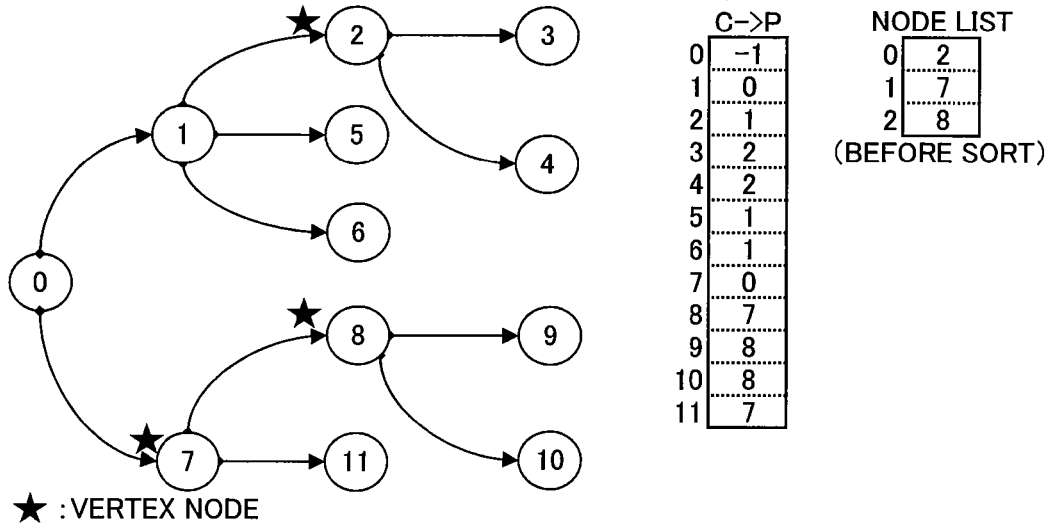
FIGS. 44A and 44B illustrate an overview of topology sort according to the present embodiment.
Figure 44B:
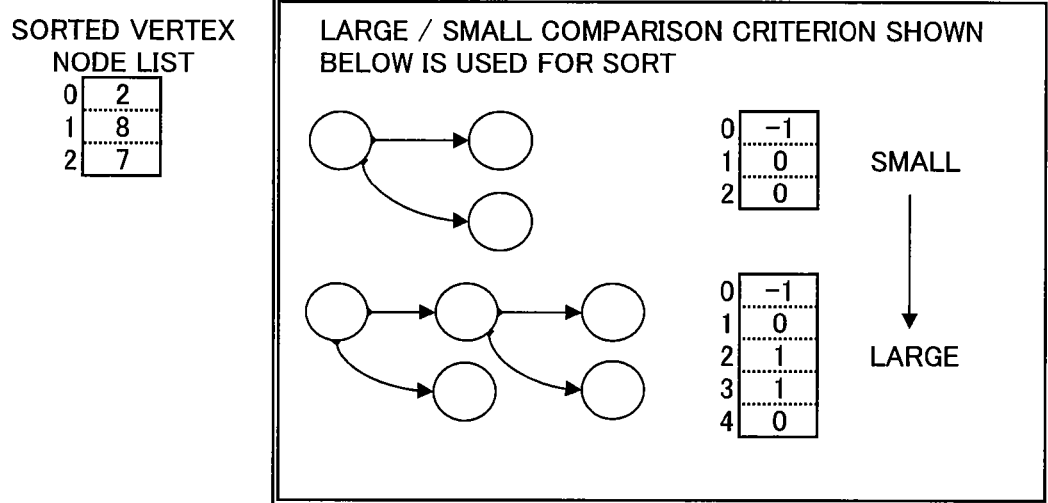
Figure 45:
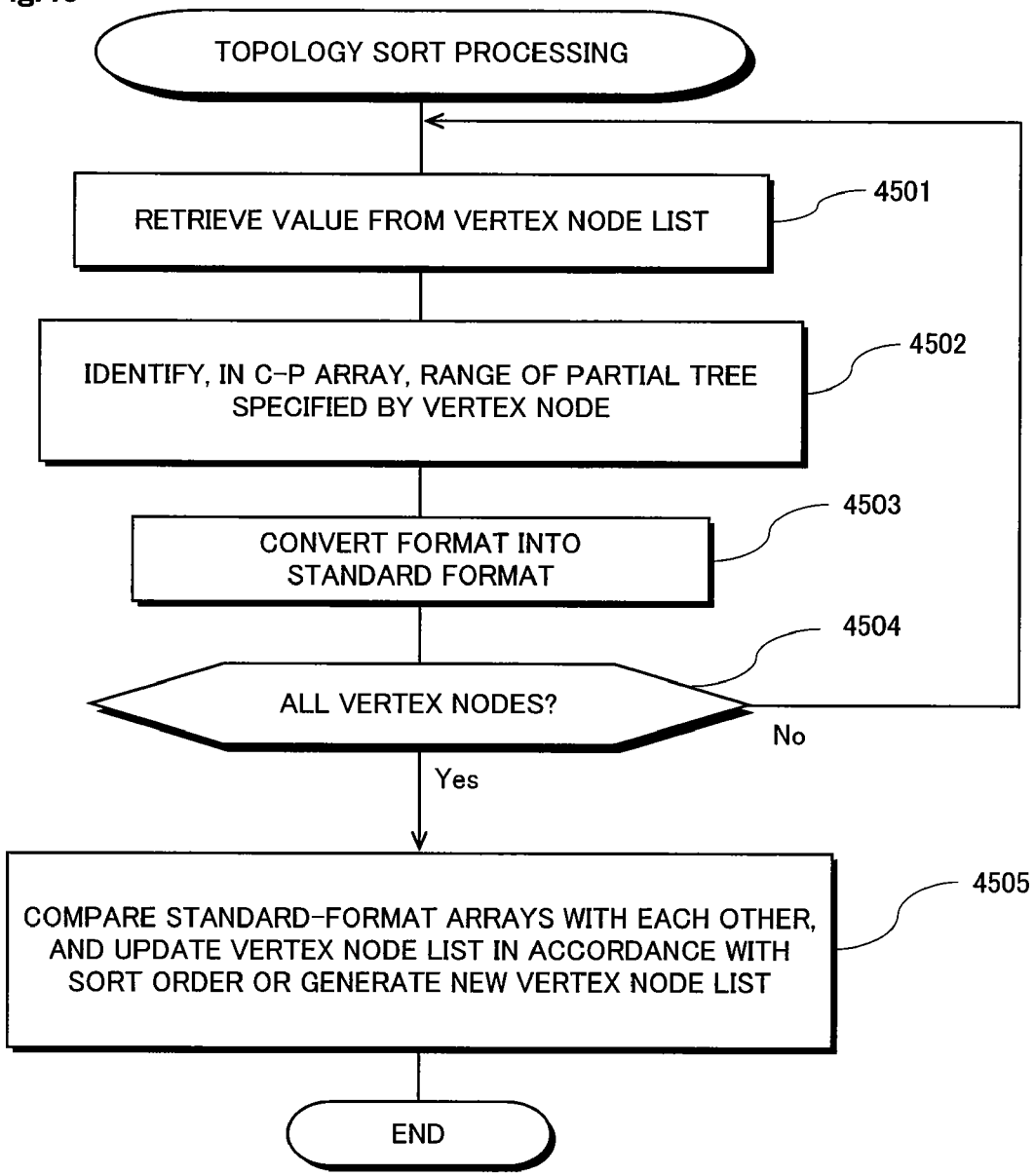
FIG. 45 is a flowchart showing an example of the topology-sort processing according to the present embodiment.
Figures 46A, 46B, 46C, 46D, 46E:
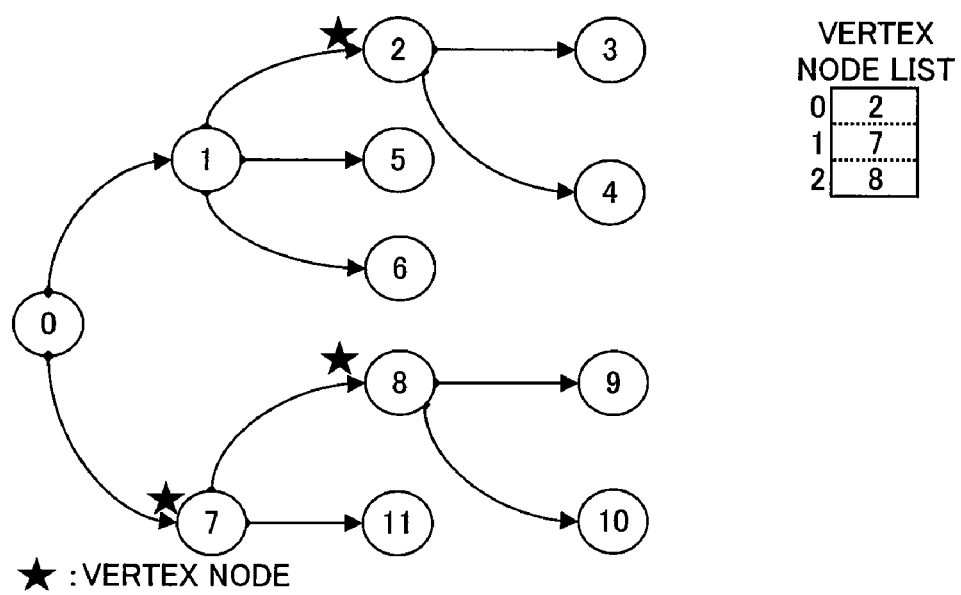
FIGS. 46A to 46E show a specific example of the topology-sort processing according to the present embodiment.
Figure 47:
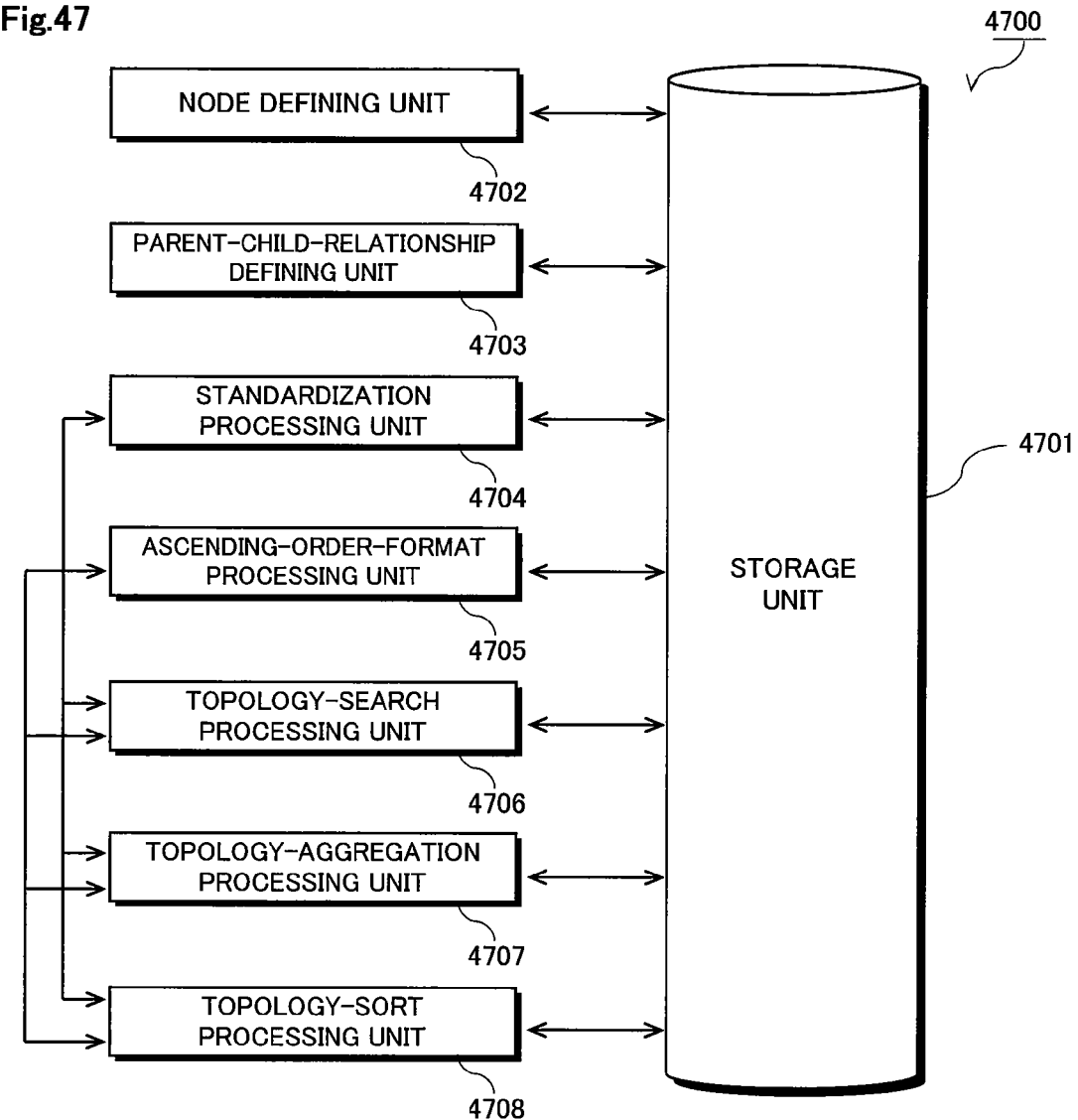
FIG. 47 is a functional block diagram showing an example of an information processing apparatus for constructing tree data structure according to the embodiment of the present invention, generating a vertex node list, generating various arrays in which the tree data structure is constructed, storing the arrays in a memory, and executing topology search, topology aggregation, and topology sort processing.
Figure 48:
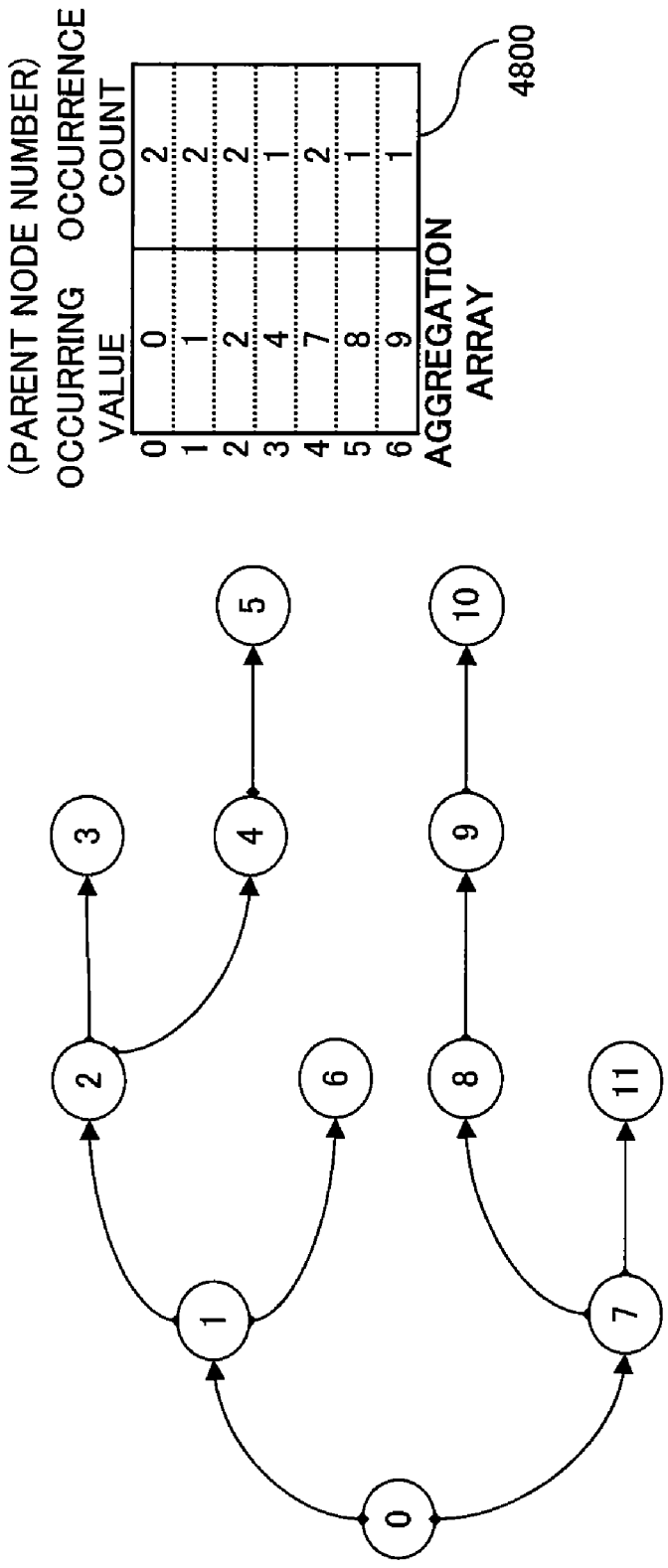
FIGS. 48A and 48B shows an example of a tree and an ascending ordered aggregation array representing the tree, respectively.
Figure 49:
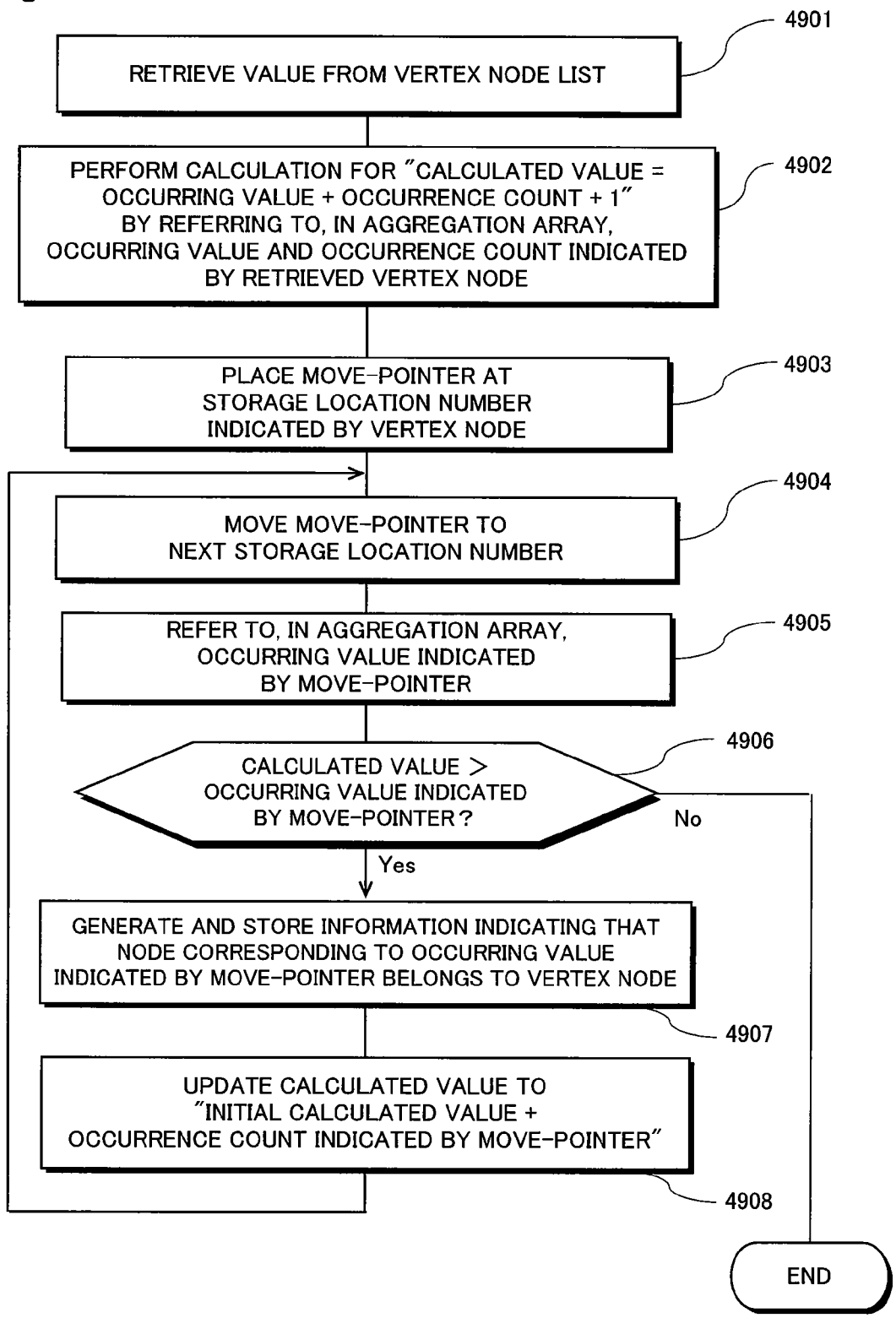
FIG. 49 is a flow chart showing processing for identifying a partial tree having a certain node based on the ascending ordered aggregation array.
Figure 50A:
FIGS. 50A to 50C show a specific example of the processing for identifying a partial tree having a vertex node.
Figure 50B:
Figure 50C:
Figure 51:
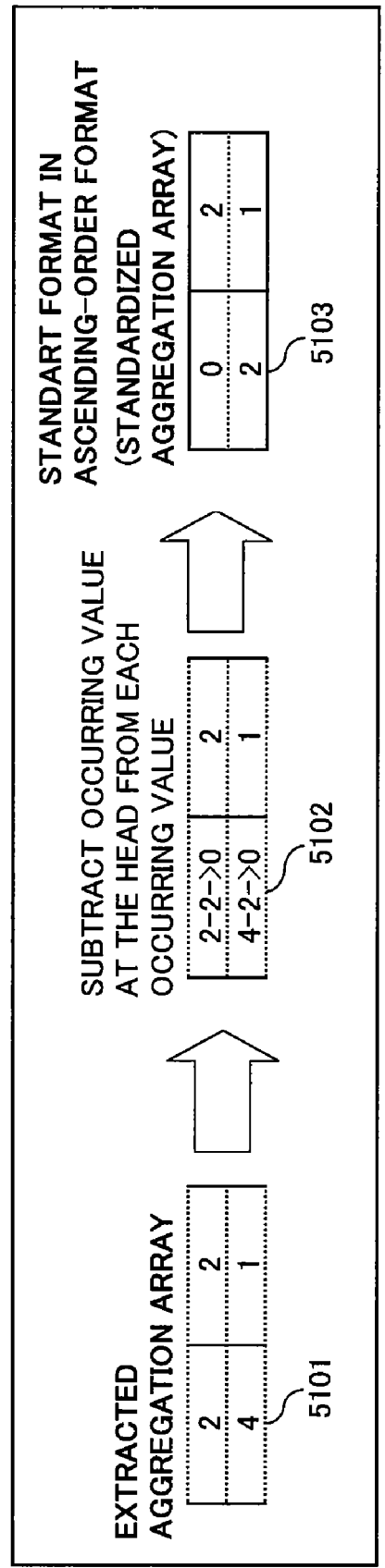
FIG. 51 shows a standard format of an ascending ordered aggregation array.
Figure 52:
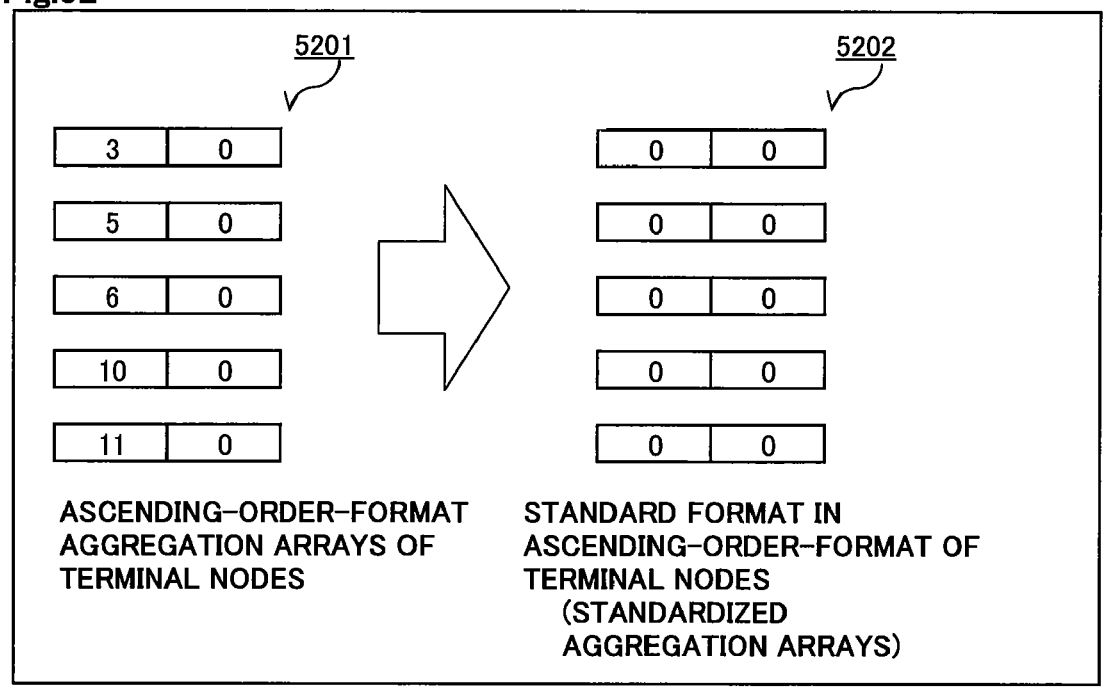
FIG. 52 shows the standard format of ascending ordered aggregation arrays.
Figure 53:
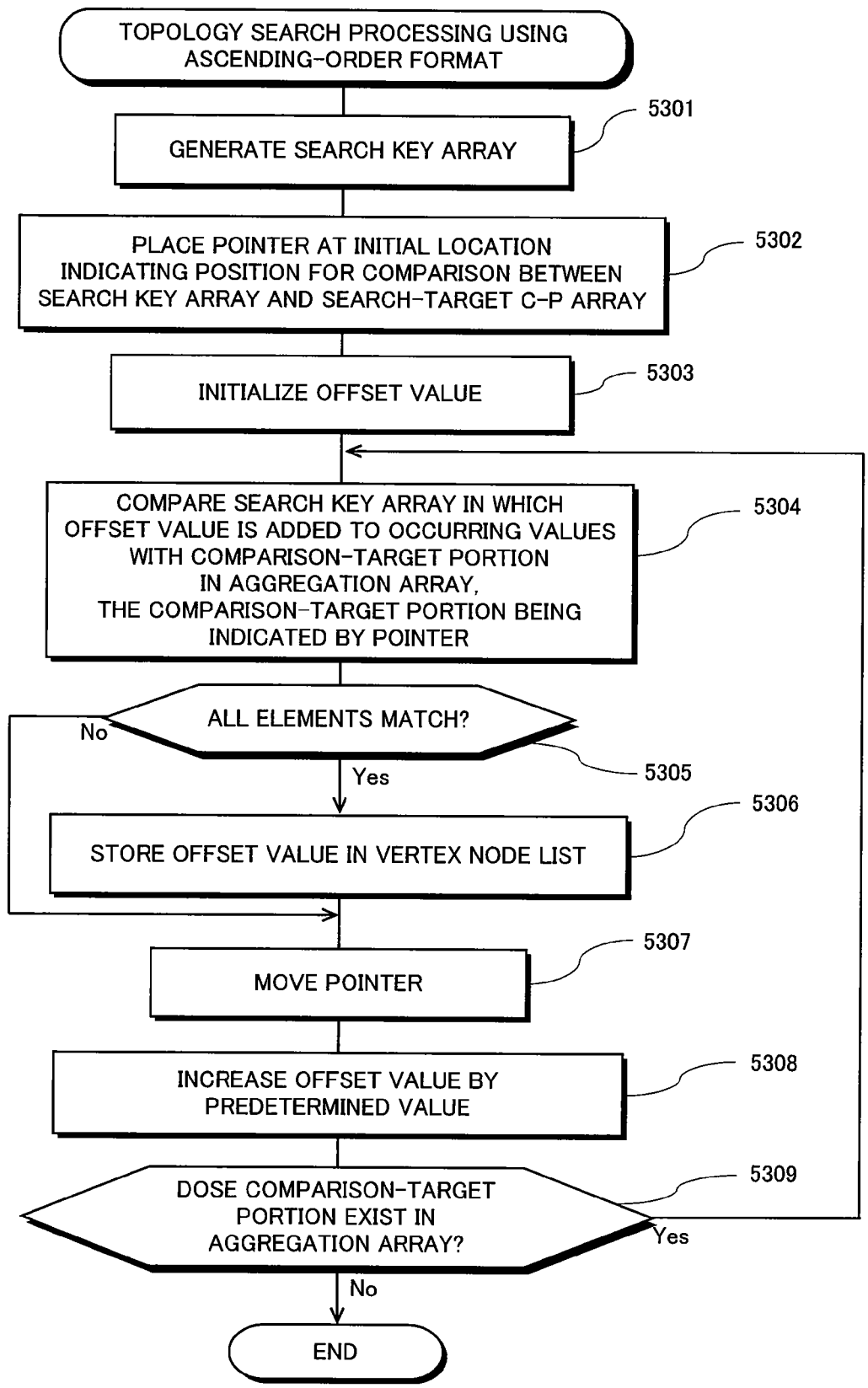
FIG. 53 is a flowchart showing topology-search processing using an ascending-order format according to the present embodiment.
Figure 54A:
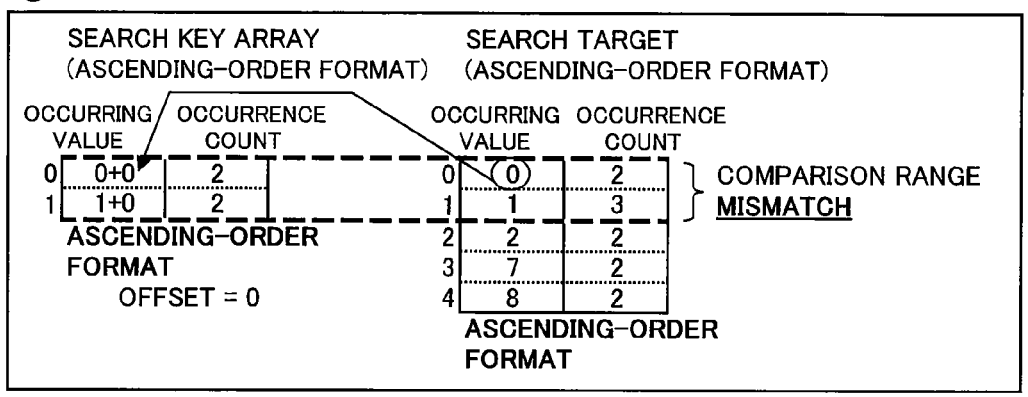
FIGS. 54A and 54B show a specific example of topology-search processing using an ascending-order format according to the present embodiment.
Figure 54B:
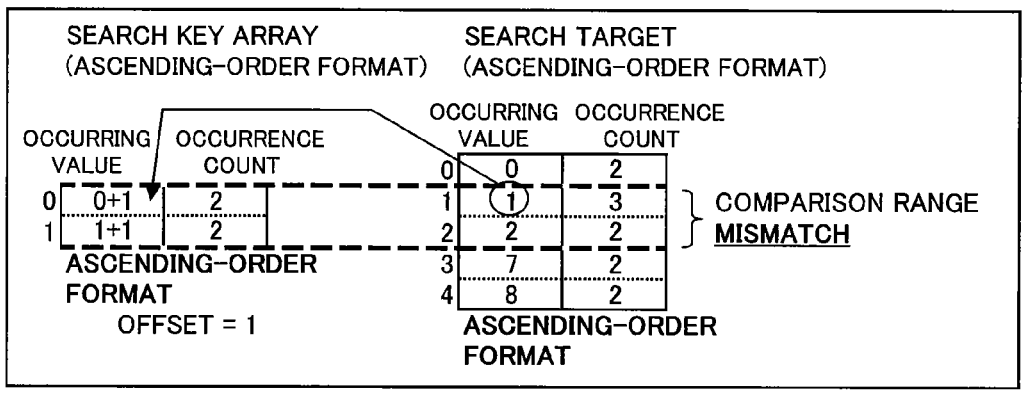
Figure 57:
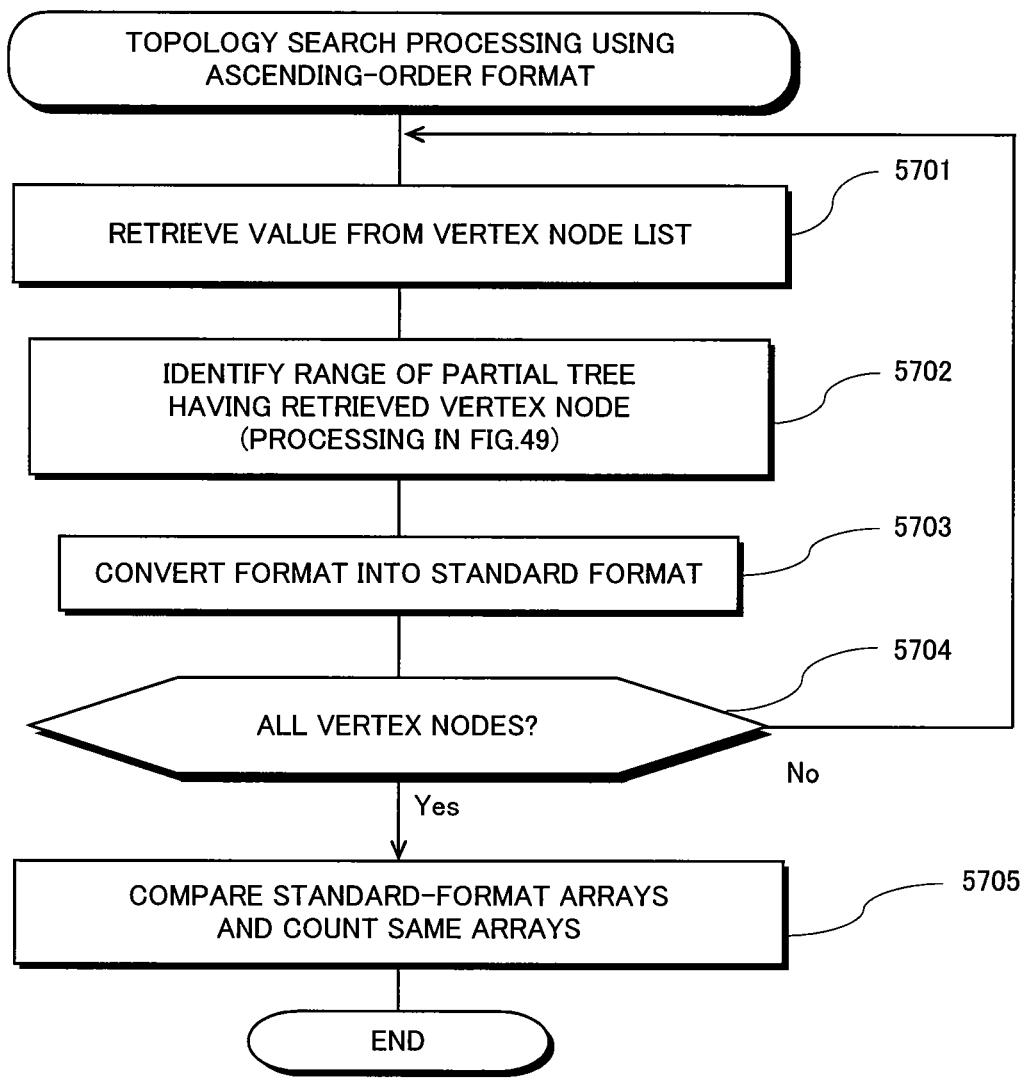
FIG. 57 is a flowchart showing topology-aggregation processing using the ascending ordered aggregation array.
Figure 58B:
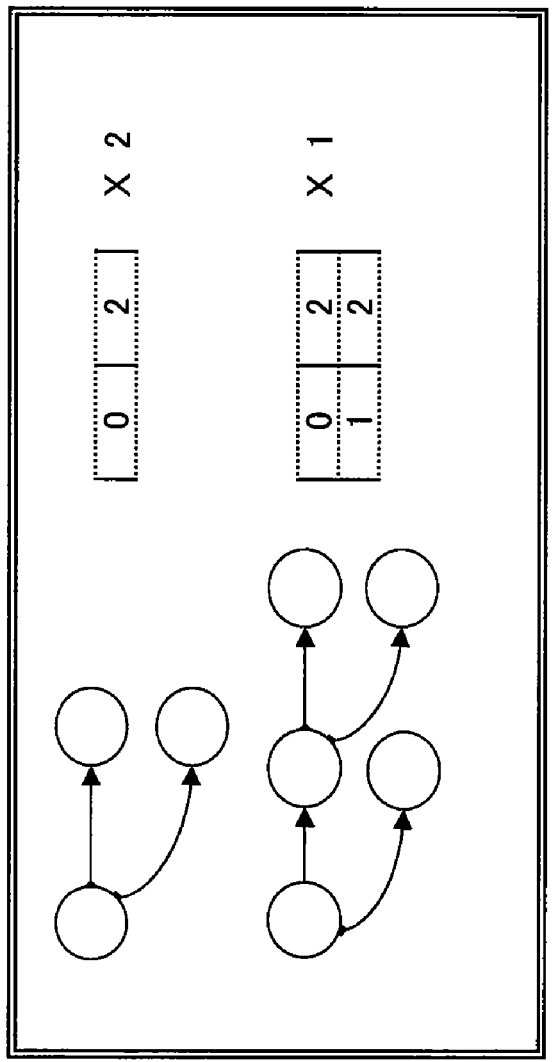
FIGS. 58A and 58B show a processing result of the topology aggregation using the ascending ordered aggregation array.
Figure 58A:
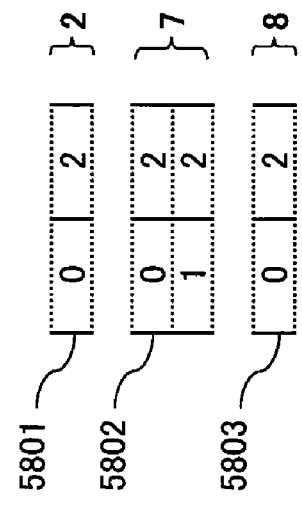

REFERENCE NUMERALS 10 computer system
12 CPU
14 RAM
16 ROM
18 fixed storage device
20 CD-ROM driver
22 I/F
24 input device
26 display device
4700 information processing apparatus
4701 storage unit
4702 node defining unit
4703 parent-child-relationship defining unit
4704 standardization processing unit
4705 ascending-order-format processing unit
4706 topology-search processing unit
4707 topology-aggregation processing unit
4708 topology-sort processing unit

The invention claimed is:

1. A method for searching a partial tree in a computer:
wherein the computer includes data having a tree data structure in which:
unique sequential integers are assigned to nodes including a root node as node identifiers in such a manner that child nodes of a certain node are assigned identifiers earlier than nodes in the same generation as the certain node;
wherein a parent-child relationship between nodes is represented by an aggregation array wherein pairs are arranged in order of node identifiers assigned to nodes having one or more child nodes, each pair consisting of the node identifier assigned to a node having one or more child nodes and an occurrence count of the one or more child nodes in which a parent node is a node having the one or more child nodes;
wherein the partial tree is a tree having the same topology as a tree serving as a search key in trees identified by a first aggregation array to be searched; and
wherein the method comprises the steps of:
(a) generating a second aggregation array as a search key array representing the tree serving as the search key in a storage device;
(b) adding an offset to node identifiers in the search key array and comparing node identifiers, to which the offset is added, with node identifiers contained in a portion in the first aggregation array, the portion being located at a region which has been shifted according to the offset; and
(c) generating a search result in the storage device, wherein the search result represents node identifiers included in the portion wherein all node identifiers matched in comparison, the portion being contained in the first aggregation array.

2. The method according to claim 1, wherein at least one piece of substantial information representing data is related to the node, and wherein the method further comprises the steps of:
(d) comparing the substantial information related to nodes identified by the node identifiers in the portion wherein all node identifiers matched in comparison with the substantial information related to nodes identified by the node identifiers in the search key array; and
(e) generating a second aggregation array as a search result in the storage device, the second aggregation array generated as a search result containing the node identifiers included in the portion in the first aggregation array and the occurrence count of the node identifiers, if the substantial information related to the nodes identified by all the node identifiers located at the portion in the first aggregation array is equal to the substantial information related to the node identified by the node identifier in the search key array.

3. A computer-readable computer program, stored on a computer-readable medium, for searching a partial tree in a computer:

wherein the computer includes data having a tree data structure in which:

unique sequential integers are assigned to nodes including a root node as node identifiers in such a manner that child nodes of a certain node are assigned identifiers earlier than nodes in the same generation as the certain node;

wherein a parent-child relationship between nodes is represented by an aggregation array wherein pairs are arranged in order of node identifiers assigned to nodes having one or more child nodes, each pair consisting of the node identifier assigned to a node having one or more child nodes and an occurrence count of the one or more child nodes in which a parent node is a node having the one or more child nodes;

wherein the partial tree is a tree having the same topology as a tree serving as a search key in trees identified by a first aggregation array to be searched; and wherein the method comprises the steps of:

(a) generating a second aggregation array as a search key array representing the tree serving as the search key in a storage device;

(b) adding an offset to node identifiers in the search key array and comparing node identifiers, to which the offset is added, with node identifiers contained in a portion in the first aggregation array, the portion being located at a region which has been shifted according to the offset; and (c) generating a search result in the storage device, wherein the search result represents node identifiers included in the portion wherein all node identifiers matched in comparison, the portion being contained in the first aggregation array.

4. The computer program according to claim 3, wherein at least one piece of substantial information representing data is related to the node, and wherein the computer program makes the computer further execute the steps of:

(d) comparing the substantial information related to nodes identified by the node identifiers in the portion wherein all node identifiers matched in comparison with the substantial information related to nodes identified by the node identifiers in the search key array; and (e) generating a second aggregation array as a search result in the storage device, the second aggregation array generated as a search result containing the node identifiers included in the portion in the first aggregation array and the occurrence count of the node identifiers, if the substantial information related to the nodes identified by all the node identifiers located at the portion in the first aggregation array is equal to the substantial information related to the node identified by the node identifier in the search key array.

* * * * *